(12) United States Patent
Kim

(10) Patent No.: US 9,497,303 B2
(45) Date of Patent: Nov. 15, 2016

(54) MOBILE TERMINAL AND CONTROLLING METHOD THEREOF

(75) Inventor: Jonghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 317 days.

(21) Appl. No.: 14/239,946

(22) PCT Filed: Feb. 3, 2012

(86) PCT No.: PCT/KR2012/000662
§ 371 (c)(1),
(2), (4) Date: Feb. 20, 2014

(87) PCT Pub. No.: WO2013/054985
PCT Pub. Date: Apr. 18, 2013

(65) Prior Publication Data
US 2014/0206418 A1 Jul. 24, 2014

(30) Foreign Application Priority Data
Oct. 12, 2011 (KR) .................. 10-2011-0103953

(51) Int. Cl.
| | |
|---|---|
| G08B 3/00 | (2006.01) |
| H04M 1/02 | (2006.01) |
| H04W 4/12 | (2009.01) |
| H04W 68/00 | (2009.01) |
| G03H 1/22 | (2006.01) |
| G03H 1/26 | (2006.01) |

(52) U.S. Cl.
CPC ......... *H04M 1/0272* (2013.01); *G03H 1/2249* (2013.01); *G03H 1/26* (2013.01); *H04M 1/0266* (2013.01); *H04W 4/12* (2013.01); *H04W 68/005* (2013.01); *G03H 2227/02* (2013.01)

(58) Field of Classification Search
None
See application file for complete search history.

(56) References Cited

U.S. PATENT DOCUMENTS

| | | | |
|---|---|---|---|
| 2006/0001596 A1 | 1/2006 | Cuffaro | |
| 2006/0098085 A1 | 5/2006 | Nichols et al. | |
| 2009/0009327 A1* | 1/2009 | Amidi | G08B 13/2462 340/568.1 |
| 2010/0097439 A1 | 4/2010 | Kroll et al. | |
| 2011/0090311 A1* | 4/2011 | Fang | H04N 7/15 348/43 |
| 2011/0184805 A1* | 7/2011 | Margalit | G06Q 30/0251 705/14.49 |
| 2012/0170089 A1* | 7/2012 | Kim | G06F 3/011 359/9 |
| 2012/0254934 A1* | 10/2012 | McBrearty | G06F 19/3481 725/118 |

FOREIGN PATENT DOCUMENTS

| | | |
|---|---|---|
| KR | 10-2003-0071238 A | 9/2003 |
| KR | 10-0800854 B1 | 2/2008 |
| KR | 10-2003-0045686 A | 5/2011 |
| WO | WO 2009/121380 A1 | 10/2009 |

* cited by examiner

*Primary Examiner* — Ojiako Nwugo
(74) *Attorney, Agent, or Firm* — Birch, Stewart, Kolasch & Birch, LLP

(57) ABSTRACT

A mobile terminal and controlling method thereof are disclosed, by which a holography user interface is provided. The present invention includes a controller, a holography storing medium configured to record an interference pattern generated by interference of light, a holography output module configured to output a 1st holography image attributed to diffraction between the light applied to the holography storing medium and the interference patter under the control of the controller, and a sensing unit configured to detect a plurality of notification signals, wherein if the sensing unit detects at least one of a plurality of the notification signals in the course of outputting the 1st holography image, the controller controls a 2nd holography image to be outputted together with the 1st holography image to indicate that the at least one notification signal is detected.

17 Claims, 87 Drawing Sheets

[Fig. 7A
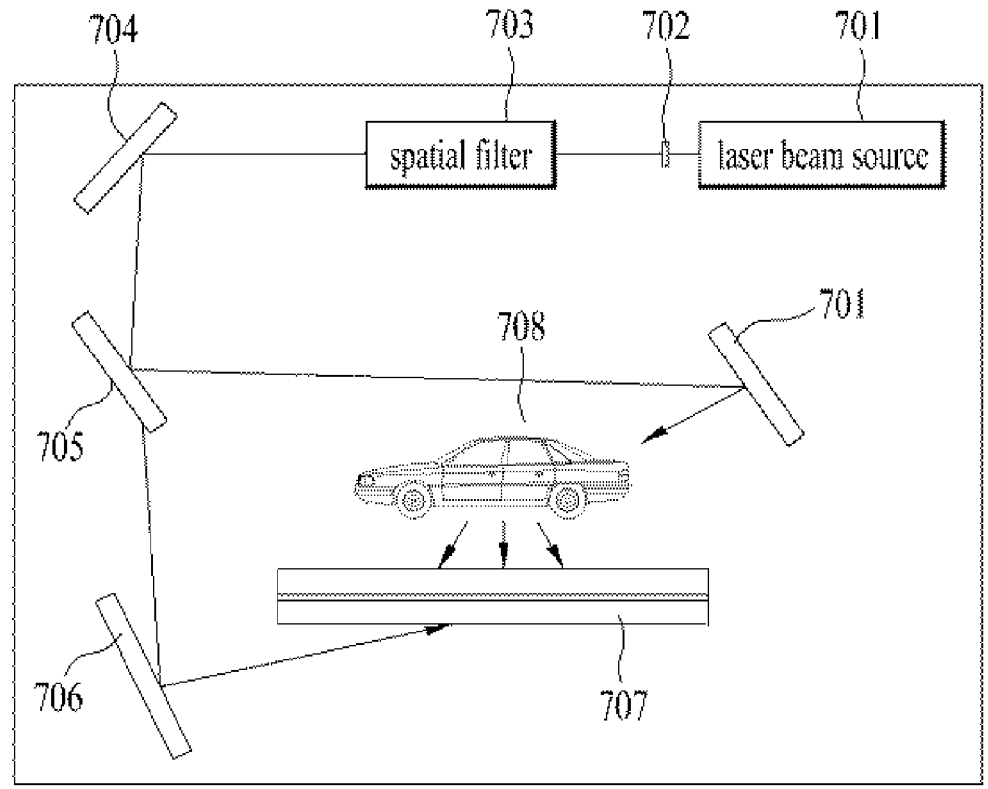
Fig. 7B
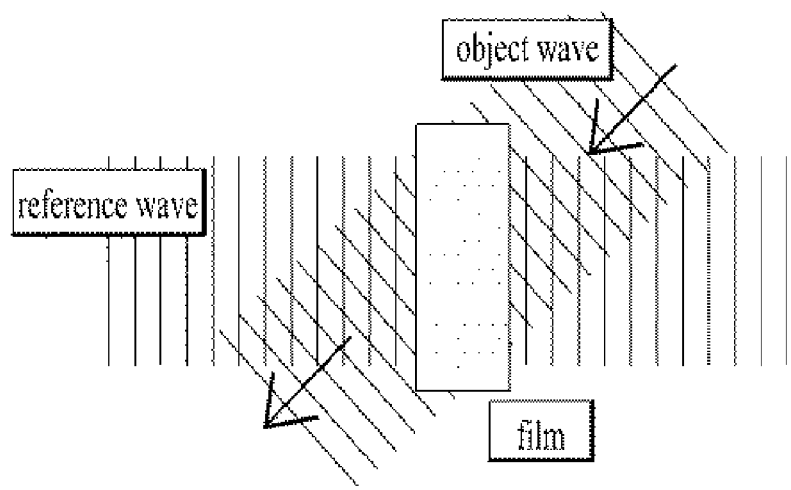

MOBILE TERMINAL AND CONTROLLING METHOD THEREOF

TECHNICAL FIELD

The present invention relates to a mobile terminal, and more particularly, to a mobile terminal and controlling method thereof. Although the present invention is suitable for a wide scope of applications, it is particularly suitable for providing a holography user interface.

BACKGROUND ART

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, as a terminal is capable of implementing a holography image, the demand for facilitating a method of manipulating a holography user interface is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a further convenient holography user interface may be provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention may include a controller, a holography storing medium configured to record an interference pattern generated by interference of light, a holography output module configured to output a 1st holography image attributed to diffraction between the light applied to the holography storing medium and the interference patter under the control of the controller, and a sensing unit configured to detect a plurality of notification signals, wherein if the sensing unit detects at least one of a plurality of the notification signals in the course of outputting the 1st holography image, the controller controls a 2nd holography image to be outputted together with the 1st holography image to indicate that the at least one notification signal is detected.

Preferably, the controller may control the 1st holography image to pause in the course of being outputted and also control the 2nd holography image to be outputted together with the pausing 1st holography image.

Preferably, a plurality of the notification signals may include a call notification signal, a message notification signal, an email notification signal, an alarm notification signal, a calendar notification signal, a reminder notification signal, and a battery notification signal.

Preferably, the controller may control the 1st holography image to be outputted in a manner of being included at least one partial region of the 2nd holography image or in a manner that the 2nd holography image is adjacent to an outline region of the 1st holography image and the 2nd holography image may include a closed curve shape implemented with a combination of at least one of a straight line, a line bent at a prescribed angle, a branch line and a curved line.

Preferably, the holography output module may include a binocular disparity generating means for changing at least one of a propagating direction and a vibrating direction of a light generated from the holography output module. In this case, the controller may give a 3D (3-dimensional) depth to the 2nd holography image and control the holography output module to output the 3D depth given 2nd holography image as a 3D holography stereoscopic image of a stereoscopic type.

Preferably, the controller may partition a whole region outputted as a holography image via the holography output module into partitioned regions at a prescribed ratio and control the 1st holography image and the 2nd holography image to be outputted to the partitioned regions, respectively.

Preferably, if at least one of a plurality of preset cancellation trigger events occurs, the controller may control the 2nd holography image not to be outputted.

Preferably, the controller may control a type information of the detected at least one notification signal and at least one partial content information of the detected at least one notification signal to be outputted by being included in the 2nd holography image.

Preferably, the controller may change and output at least one selected from the group consisting of a color, style, type, thickness, number, size and transparency of the 2nd holography image in accordance with time.

Preferably, the controller may control a type of the detected at least one notification signal to be identified in a manner of changing at least one selected from the group consisting of a color, style, type, thickness, number, size and transparency of the 2nd holography image.

Preferably, if at least two of a plurality of the notification signals are detected by the sensing unit, the controller may control at least two 2nd holography images to be outputted to correspond to the detected at least two notification signals, respectively.

In another aspect of the present invention, a mobile terminal according to one embodiment of the present invention may include a controller, a holography storing medium configured to record an interference pattern generated by interference of light, a holography output module configured to output a 1st holography image attributed to diffraction between the light applied to the holography storing medium and the interference patter under the control of the controller, and a sensing unit configured to detect a plurality of notification signals, wherein if the sensing unit detects at least one of a plurality of the notification signals, the controller controls a 2nd holography image to be outputted to indicate that the at least one notification signal is detected or controls both of the 1st holography image and the 2nd holography image to be outputted together.

Preferably, the mobile terminal may further include a display unit, and the controller may control a prescribed screen displayed on the display unit or a previously designated object to be outputted as the 1st holography image.

Preferably, the controller may control the 1st holography image to be outputted in a manner of being included at least one partial region of the 2nd holography image or in a manner that the 2nd holography image is adjacent to an outline region of the 1st holography image and the 2nd holography image may include a closed curve shape implemented with a combination of at least one of a straight line, a line bent at a prescribed angle, a branch line and a curved line.

Preferably, the holography output module may include a binocular disparity generating means for changing at least one of a propagating direction and a vibrating direction of a light generated from the holography output module, and the controller may give a 3D (3-dimensional) depth to the 2nd holography image and control the holography output module to output the 3D depth given 2nd holography image as a 3D holography stereoscopic image of a stereoscopic type.

Preferably, the controller may partition a whole region outputted as a holography image via the holography output module into partitioned regions at a prescribed ratio and control the 1st holography image and the 2nd holography image to be outputted to the partitioned regions, respectively.

Preferably, the controller may control a type of the detected at least one notification signal to be identified in a manner of changing at least one selected from the group consisting of a color, style, type, thickness, number, size and transparency of the 2nd holography image.

In another aspect of the present invention, a method of controlling a mobile terminal according to one embodiment of the present invention may include the steps of outputting a 1st holography image from a holography output module, detecting at least one of a plurality of notification signals by a sensing unit in the course of outputting the 1st holography image, and outputting a 2nd holography image together with the 1st holography image to indicate that the at least one notification signal is detected.

In a further aspect of the present invention, a method of controlling a mobile terminal according to one embodiment of the present invention may include the steps of detecting at least one of a plurality of notification signals by a sensing unit and outputting a 2nd holography image to be outputted from a holography output module to indicate that the at least one notification signal is detected or outputting both of the 1st holography image and the 2nd holography image to be outputted from the holography output module together.

Preferably, a type of the detected at least one notification signal may be identified in a manner of changing at least one selected from the group consisting of a color, style, type, thickness, number, size and transparency of the 2nd holography image.

Accordingly, the present invention provides the following effect and/or advantage.

First of all, the above-configured mobile terminal according to one embodiment of the present invention may be more conveniently manipulated using a holography user interface.

Effects and/or advantages obtainable from the present invention are non-limited the above mentioned effect. And, other unmentioned effects and/or advantages can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
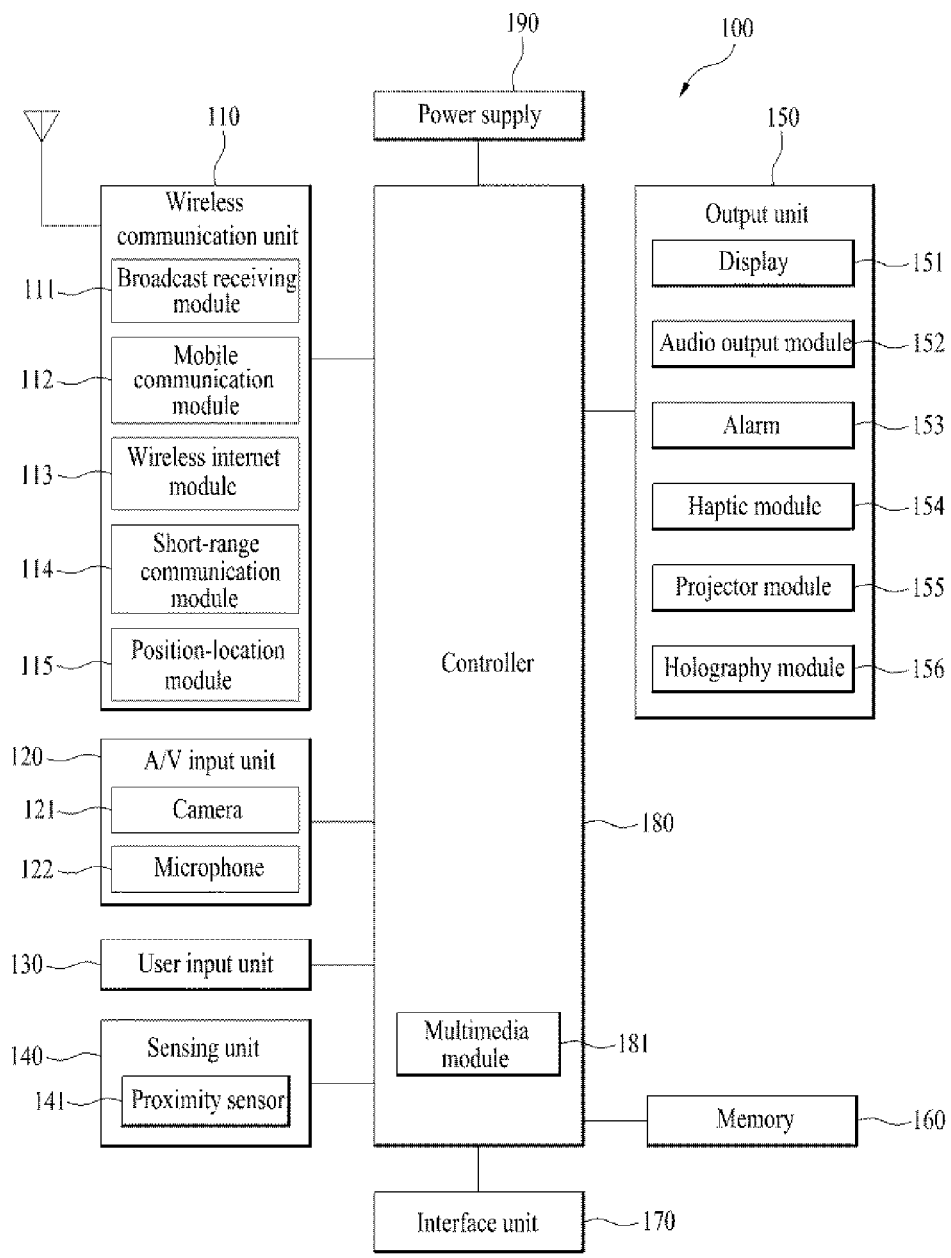
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

Therefore, the sensing unit 140 generates a sensing signal by detecting one of motions in various shapes through a location change and a direction change of the mobile terminal 100. And, at least one function can be executed to correspond to the sensing signal in accordance with each of the motions. Moreover, the relation between the motion and the function executed through the corresponding motion can be saved in the memory unit.

And, the sensing unit 140 is able to sense whether a power is supplied by the power supply unit 190, whether an external device is connected to the interface unit 170, and the like. Besides, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

Subsequently, the holography module 156 may include a holography storing medium and a holography output module. And, the holography module 156 may be able to project a holography image externally.

The holography storing medium is the storing medium for recording an interference pattern generated from interference between an applied object wave and a reference wave and may be formed of such a material reacting with light intensity as photopolymer and the like.

In this case, the holography output module applies a reconstructing wave equal to the reference wave to the holography output module and then outputs a holography image generated from the diffraction effect between the applied reconstructing wave and the interference pattern recorded in the holography storing medium, under the control of the controller 180.

A holography image projecting method shall be described in detail with reference to FIGS. 4 to 7 later.

In the above description, the holography storing medium and the holography output module are implemented in a manner of being included together in the holography module 156, which is just exemplary. Alternatively, the holography storing medium and the holography output module may be separately configured and included in the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, in order to support the holography image projection of the holography module 156, information on the holography interference pattern may be saved. In particular, user's voice, application activated result and the like can be externally outputted via the holography module 156 using the information saved in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

Meanwhile, the sensing unit 140 is able to generate a sensing signal by detecting one of motions in various shapes through the location and direction changes of the mobile terminal 100. And, at least one function can be executed to correspond to the sensing signal in accordance with each of the motions. Moreover, the relation between the motion and the function executed through the corresponding motion can be saved in the memory unit 160.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
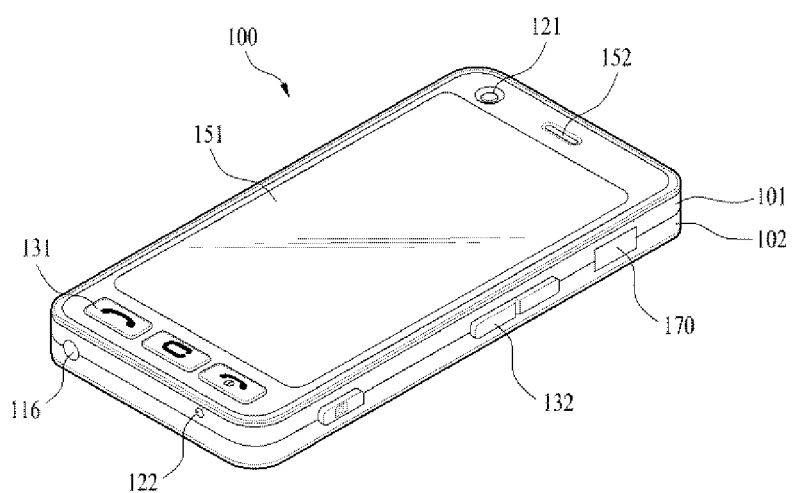
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130, a microphone 122, an interface 170 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be input to the second manipulating unit 132.

Interconnected operational mechanism between the display 151 and the touchpad 135 are explained with reference to FIG. 3 as follows.

Figure 3:
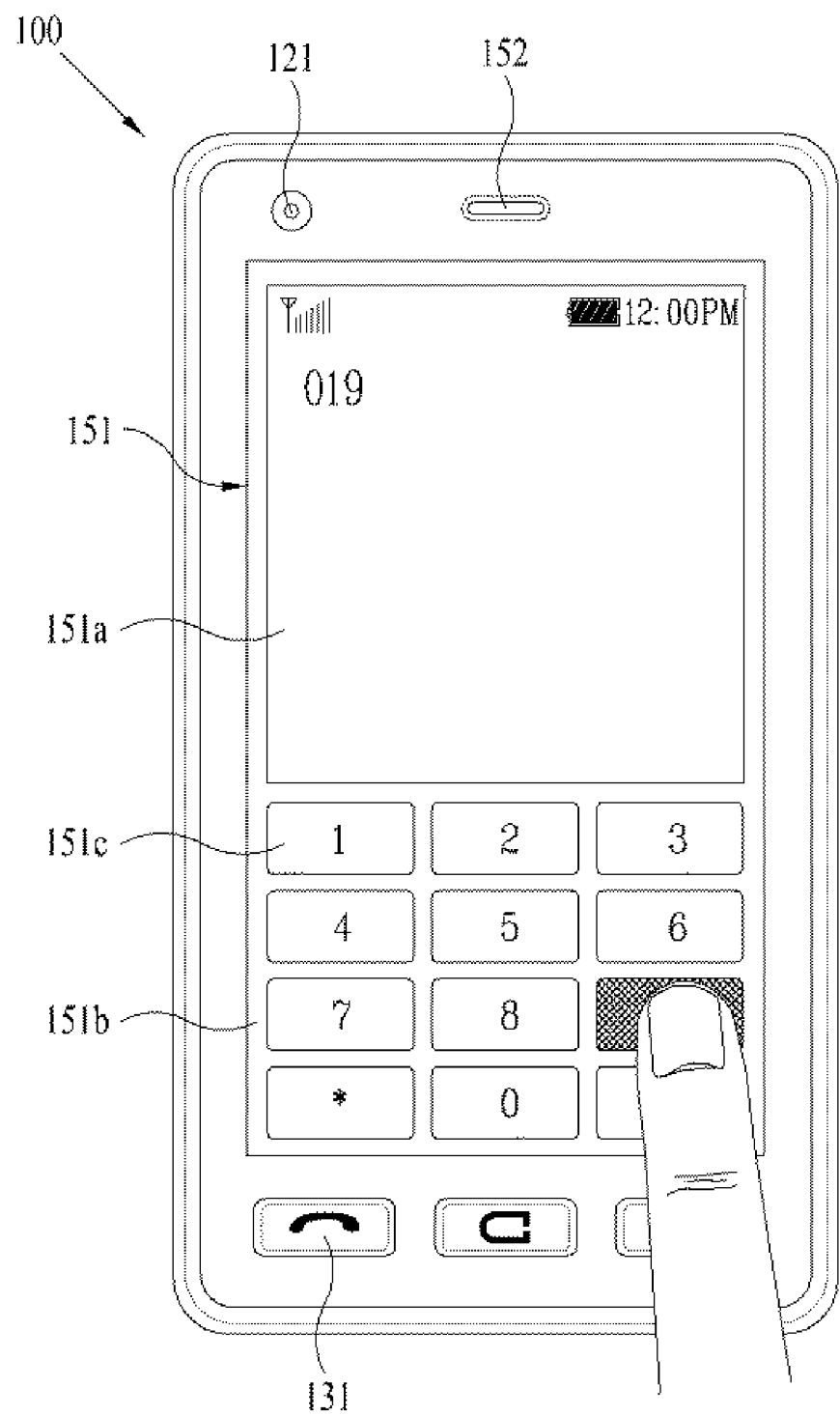
FIG. 3 is a front diagram of a mobile terminal according to one embodiment of the present invention to describe one operating status thereof.

FIG. 3 is a front-view of terminal 100 according to various embodiment of the present invention. Various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is input through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is outputted to the input window 151b. If the soft key 151c is touched, a digit corresponding to the touched soft key is output to the output window 151a. If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

In the following description, a method of representing a holography image in a mobile terminal and a structure therefor, which are applicable to embodiments of the present invention, are explained as follows.

Prior to the detailed description of holography image, a configuration of a mobile terminal including a holography module 156 is described with reference to FIG. 4.

First of all, the holography module 156 may be installed in the mobile terminal in a manner of being loaded on a front side or backside of the mobile terminal.

FIG. 4 is a diagram of a mobile terminal including a holography module according to one embodiment of the present invention.

Figure 4A:
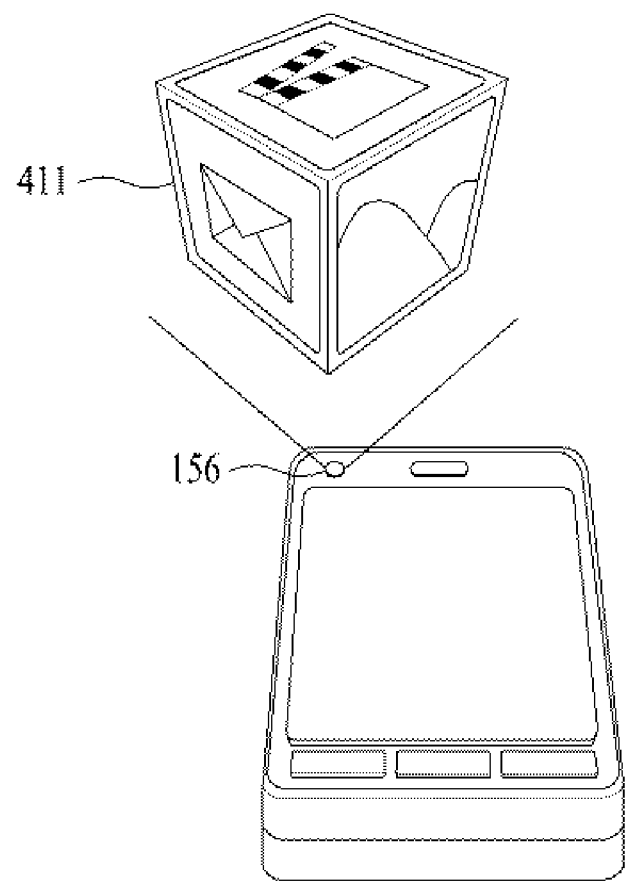
FIG. 4 is a diagram of a mobile terminal including a holography module according to one embodiment of the present invention.

Referring to FIG. 4A, the holography module 156 is provided to the front side of the mobile terminal. In particular, the holography module 156 may be provided to the front side of the mobile terminal together with the camera

121. And, the holography module 156 may be able to project and display a holography image 411 created under the control of the controller 180.

Figure 4B:
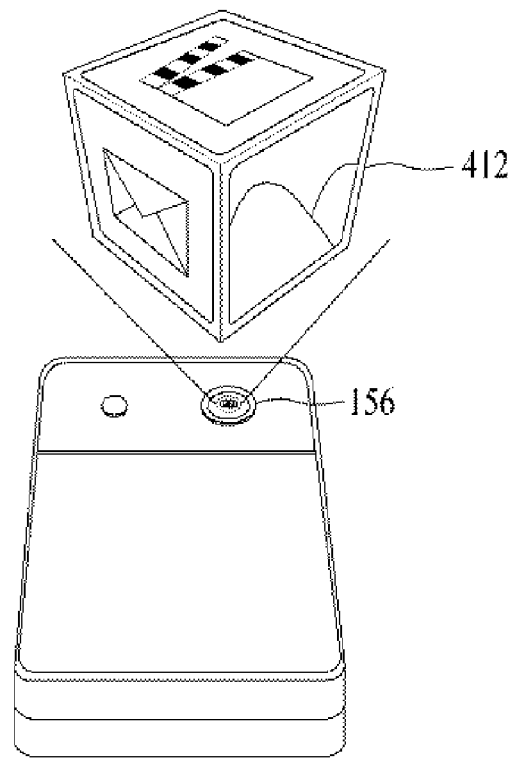

Referring to FIG. 4B, the holography module 156 may be provided to a prescribed portion of the backside of the mobile terminal. In particular, the holography module 156 may be included together with the camera 121. And, the holography module 156 may be able to project and display a holography image 412 created under the control of the controller 180.

The holography images implemented through the holography module 156 may include a planar image and a stereoscopic image both.

In particular, the stereoscopic image implemented through the holography module 156 may be mainly classified into a 2D (2-dimensional) stereoscopic image and a 3D (3-dimensional) stereoscopic image.

Substantially, a 2D stereoscopic image system is a monoscopic system that provides the same image to both eyes. In particular, according to the 2D stereoscopic image system, a polyhedron created using at least one point, at least one line, at least one plane and a combination thereof is placed in a virtual stereoscopic space and an image generated from viewing the placed polyhedron in a specific view is then displayed, under the control of the controller 180.

A 3D stereoscopic image system is a stereoscopic system that provides different images to both eyes, respectively. And, the 3D stereoscopic image system adopts the principle of sensing a 3D effect of an object viewed via bare eyes of a human. In particular, human eyes sense different planar images in viewing the same object due to a distance between both eyes. The sensed different planar images are delivered to a brain through retinas. And, the brain synthesizes the delivered different images together to sense depth and reality of the corresponding stereoscopic image. Although there is a slight difference between humans, binocular disparity attributed to a distance between both eyes enables a 3D effect. Thus, the 3D stereoscopic image system may correspond to a method of displaying an image using this binocular disparity.

Holography image created through the holography module 156 may include both of the planar image and the stereoscopic image. For clarity and convenience of the following description, assume that the holography image may be displayed by the 2D stereoscopic image system, by which the present invention may be non-limited.

In the following description, a method of representing a holography image in a mobile terminal and a structure therefor, which are applicable to embodiments of the present invention, are explained in detail as follows.

First of all, a holography image representing method may be understood as an image displaying method of simultaneously cumulating and playing all informations (i.e., amplitude and phase) on a light (i.e., wave motion), whereas a related art image is a recording of distribution of bright and dark sides of an object.

A holography image representing method is described with reference to FIG. 5 as follows.

Figure 5A:
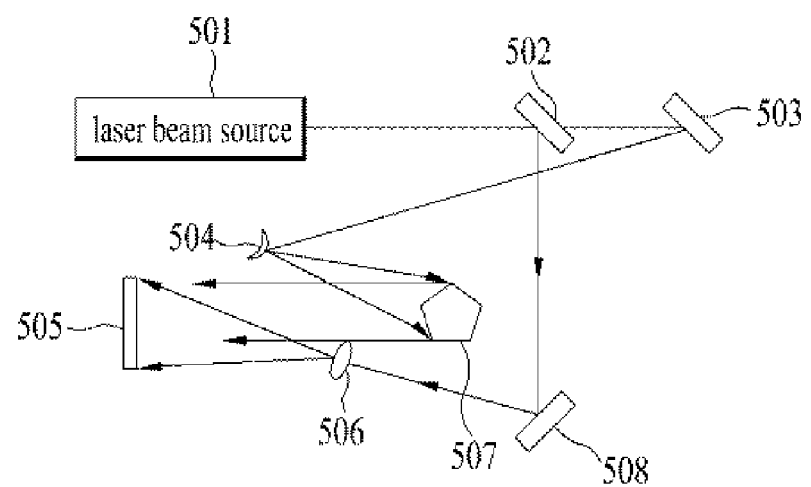
FIG. 5 is a diagram for explaining holography principle conceptionally.
Figure 5B:
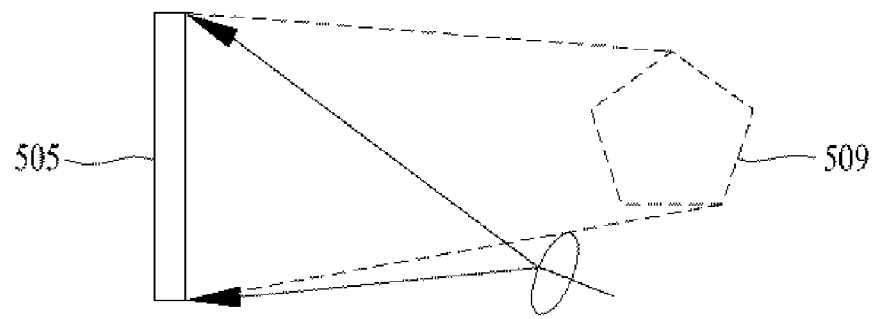

FIG. 5 is a diagram for explaining holography principle conceptionally.

Referring to FIG. 5 (*a*), a coherent light from a laser beam source 501 is slit into two beams via a splitter 502.

In particular, if one of the two beams is applied to a subject, a surface of the subject reflects the corresponding light. And, this beam will be named an object wave in the following description.

The other beam is diffused through a lens to be directly applied to a front face of a holography photosensitive material 505. And, this beam will be named a reference wave in the following description.

As the object wave and the reference wave cause an interference effect in-between, about 500~1,500 delicate and complicated interference patterns per 1 mm are generated. And, a photo of recording these interference patterns is called a hologram.

Referring to FIG. 5 (*b*), if such a beam as the generated reference wave is projected on the photosensitive material 505, a light diffracts at a position different from an incident direction of the reference wave in a manner of being affected by the interference patterns. Subsequently, the diffractive lights gather together to form the light initially reflected by the object. Hence, a holography image 509 is projected. In particular, an initial object wave is reconstructed from hologram. And, an image representing method using the reconstructed initial object wave may be named a holography image representing method.

Looking into an inside of a reconstructed wave surface, an object is initially seen as if situated inside. If a viewing point moves, a viewed position of the object changes correspondingly. Moreover, since an original wave surface of the object is reconstructed, it may interfere with a wave surface coming from a slightly modified object.

A holography image representing method may be classified into a transmittive type holography image representing system and a reflective type holography image display system.

(1) Transmittive Type Holography Image Representing System

According to the transmittive type holography image representing system, an image generated from light, which transmits a hologram if applied in rear of the hologram, is observed in front of the hologram. In the transmittive type holography image representing system, an object wave and a reference wave are applied to a photo film in the same direction to generate a holography image. And, the generated holography image is characterized in having clear and bright colors.

(2) Reflective Type Holography Image Displaying System

According to the reflective type holography image displaying system, an image generated from light, which is reflected if applied in front of the hologram, is observed in front of the hologram. In the reflective type holography image displaying system, an object wave and a reference wave are incident on a photosensitive material in directions opposite to each other, respectively. And, the holography image generated by the reflective type holography image displaying system is characterized in having an excellent 3D effect.

The transmittive type holography image representing system and the reflective type holography image displaying system are described in detail with reference to FIG. 6 and FIG. 7 as follows.

FIG. 6 is a diagram for conceptionally explaining a transmittive type holography system.

Figure 6A:
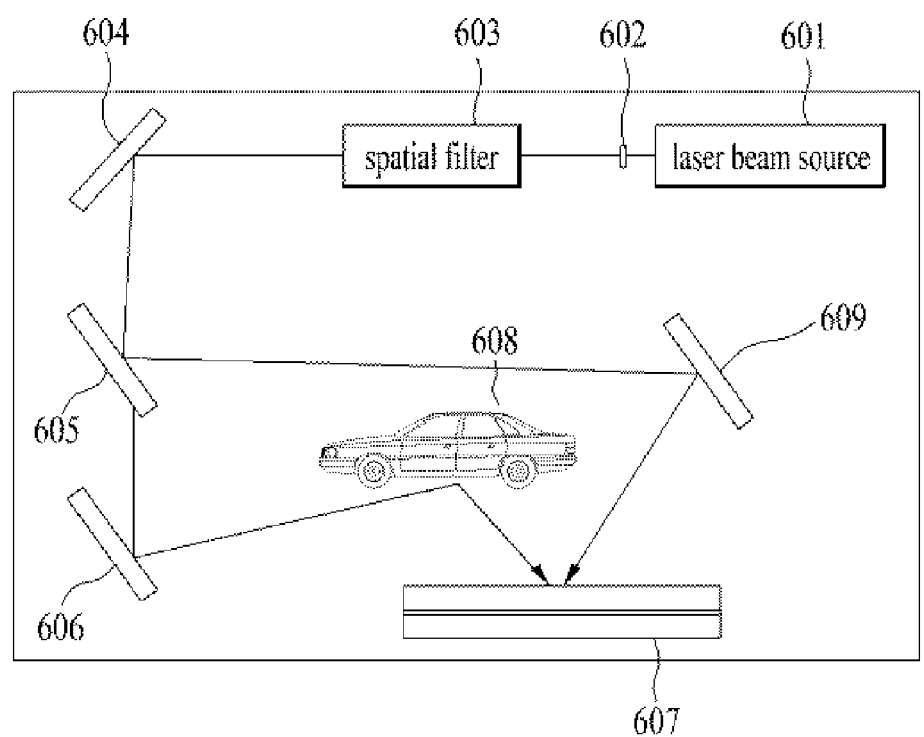
FIG. 6 is a diagram for conceptionally explaining a transmittive type holography system.

Referring to FIG. 6A, a light from a laser beam source 601 passes through a spatial filter 603 and is then spread as a smooth spherical wave. The spherical wave is split into two beams by a 50:50 beam splitter 605. One of the two beams of the spherical wave illuminates an object 608 to produce an object wave, while the other intactly illuminates a film 607 to produce a reference wave. In doing so, the object wave created from the object 608 illuminates the film 607 as well.

Subsequently, the object and reference waves having illuminated the film 607 cause an interference effect on each other to produce an interference pattern. The interference pattern is then imprinted on the film 607.

Figure 6B:
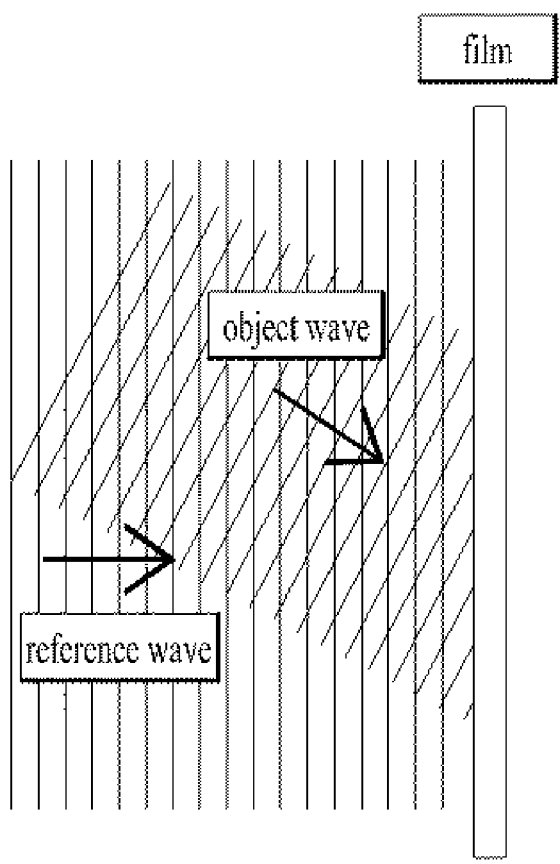
Figure 7C:
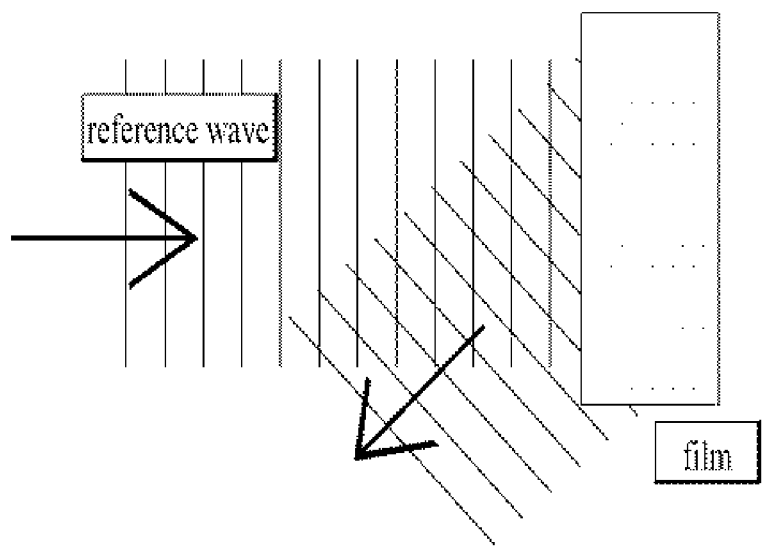
FIG. 7 is a diagram for conceptionally explaining a reflective type holography system.

In particular, referring to FIG. 6B, the object wave and the reference wave are projected on the same surface of the film 607 to produce the interference pattern.

Subsequently, referring to FIG. 6C, if the reference wave is projected on the film 607, an object wave transmits in a direction of a surface opposite to the incident surface of the previous object and reference waves, thereby creating a holography image.

FIG. 7 is a diagram for conceptionally explaining a reflective type holography system.

Referring to FIG. 7A, like FIG. 6A, a light from a laser beam source 701 passes through a spatial filter 703 and is then spread as a smooth spherical wave. The spherical wave is split into two beams by a 50:50 beam splitter 705. One of the two beams of the spherical wave illuminates an object 708 to produce an object wave, while the other intactly illuminates a film 607 to produce a reference wave.

Unlike FIG. 6A, FIG. 7A shows that the reference wave and the object wave illuminate the film 707 in directions opposite to each other, respectively.

In particular, the reference wave is projected on a left surface of the film 707 and the object wave is projected on a right top surface of the film 707. Subsequently, referring to FIG. 7C, if the reference wave is projected on the film, the object wave transmits the film in opposite direction to create a holography image.

In the above descriptions, each of the films 607 and 707 is represented as a holography storing medium and another component capable of creating a holography image by emitting a light to the film is represented as a holography output module in this specification.

As mentioned in the foregoing description, for clarity and convenience of the description of this specification, the holography storing medium and the holography output module are implemented in a manner of being included in the holography module 156, which is just exemplary. Alternatively, the holography storing medium and the holography output module may be included as separate components in the mobile terminal 100.

For clarity and convenience, assume that a mobile terminal mentioned in the following description includes at least one of the components shown in FIG. 1 and that a display unit 151 includes a touchscreen.

Generally, a graphic of an arrow or finger type to point out a specific object or select a menu on the display unit 151 is called a pointer or a cursor.

Specifically, the pointer may be frequently regarded as a finger or a stylus pen for a touch manipulation or the like.

In this specification, in order to clearly discriminate the pointer and the cursor from each other, a graphic displayed on the display unit 151 may be named a cursor, while such a physical means for performing a touch, a proximity touch, a gesture and the like as a finger, a stylus pen and the like may be named a pointer.

As mentioned in the foregoing description, a holography image may include a planar image and a stereoscopic image both. For clarity and convenience of the following description, assume that a holography image is displayed by 2D stereoscopic image system.

Meanwhile, a holography image according to one embodiment of the present invention may be displayed in accordance with a set holography pattern.

In this case, the holography pattern may mean that a holography image projected via the holography module 156 is changed into a preset pattern in accordance with a time so as to be provided to a user.

The holography pattern may be set in various ways as follows.

First of all, it may be able to set a holography pattern in a manner of varying a distance difference between a holography output module and a holography image in accordance with time.

In particular, as the distance difference between the holography output module 156 and the holography image is changed in accordance with time, the holography image projected via the holography module 156 may be shifted upward and downward, thereby enabling a setting of a prescribed holography pattern.

It may be able to set a holography pattern in a manner of varying a shape of a holography image projected by the holography module 156.

For instance, the controller 180 controls a holography image projected by the holography module 156 to have a circular shape in the first time and then controls the pattern of the holography image to be changed into a rectangular shape. Thus, as the shape of the holography image is changed into various forms in accordance with time, a setting of the holography pattern is enabled.

It may be able to apply a method of shifting or rotating a holography image projected by the holography module 156 in right or left direction.

In particular, while a distance difference between a holography module and a holography image is constantly maintained, it may be able to set a holography pattern in a manner of moving or rotating the projected holography image in right and left directions in accordance with time or rotating the projected holography image by moving it in right and left directions.

It may be able to set a holography pattern in a manner of modifying a color or size of a projected holography image in accordance with time or controlling a holography image to flicker. And, it may be able to set a holography pattern in a manner of controlling at least one of projection brightness, play frequency, illumination, vibration feedback, sound insertion, image insertion, repetitive projection and the like.

Although the above description is based on the assumption that a holography pattern is set by an individual factor, it may be able to set a holography pattern by a plurality of factors.

For instance, it may be able to set a holography pattern in a manner of moving an rotating a projected holography image in left and right directions by changing a distance difference between the holography module 156 and a holography image in accordance with time.

The above description is made on the assumption that a holography pattern is set for a whole holography image, which is just exemplary. Optionally, it may be able to apply a holography pattern to a prescribed portion of the holography image.

In the following description, a holography pattern set for a holography image is explained in detail with reference to FIGS. 8 to 10.

First of all, a holography pattern may be set in a manner of adjusting a distance difference between a holography image and a terminal.

In particular, a holography pattern may be controlled to display a pattern of moving a projected holography image upward and downward by increasing or decreasing a distance difference between a holography image and a terminal in accordance with time.

This is described with reference to FIG. 8 as follows.

FIG. 8 is a diagram for one example of setting a holography pattern by adjusting a distance difference between a holography image and a terminal according to one embodiment of the present invention.

Figure 8A:
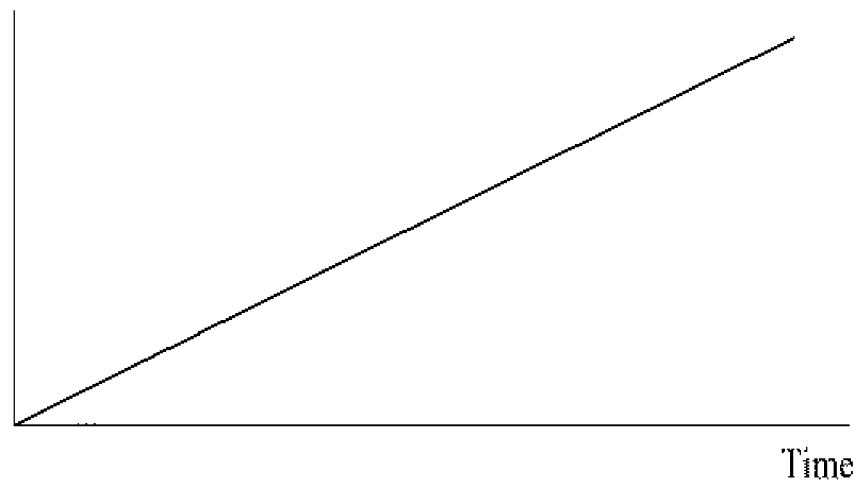
FIG. 8 is a diagram for one example of setting a holography pattern by adjusting a distance difference between a holography image and a terminal according to one embodiment of the present invention.

Referring to FIG. 8A, a distance difference between a holography image and a terminal is set to increase in proportion to time.

Figure 8B:
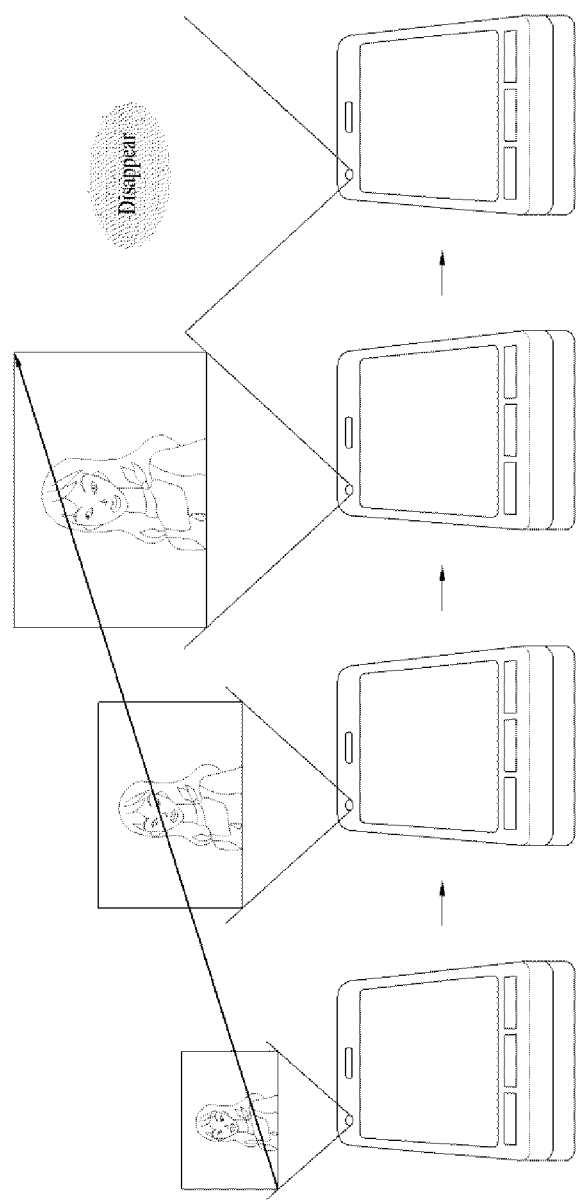

Referring to FIG. 8B, a holography image projected from a terminal moves upward by getting distant from the terminal as time goes by. If the total time set in FIG. 8A expires, the projected holography image disappears.

Hence, by adjusting a distance difference between a holography image and a terminal, it may be able to form a pattern of moving a projected holography image upward and downward.

It may be able to control a holography pattern to be set by changing a projected shape of a holography image.

In particular, by moving an image projected by the holography module 156 in right and left directions, rotating the projected image, or changing a size of the projected image, it may be able to change a shape of a projected holography image.

In the above description, a holography pattern may be formed by moving or rotating an image, which is exemplary. Alternatively, it may be able to form a holography pattern in a manner of changing a displayed shape by maintaining a same distance difference between a terminal and a projected holography image.

This is described with reference to FIG. 9 as follows.

FIG. 9 is a diagram for one example of setting a holography pattern by modifying a holography projected shape according to one embodiment of the present invention.

Figure 9A:
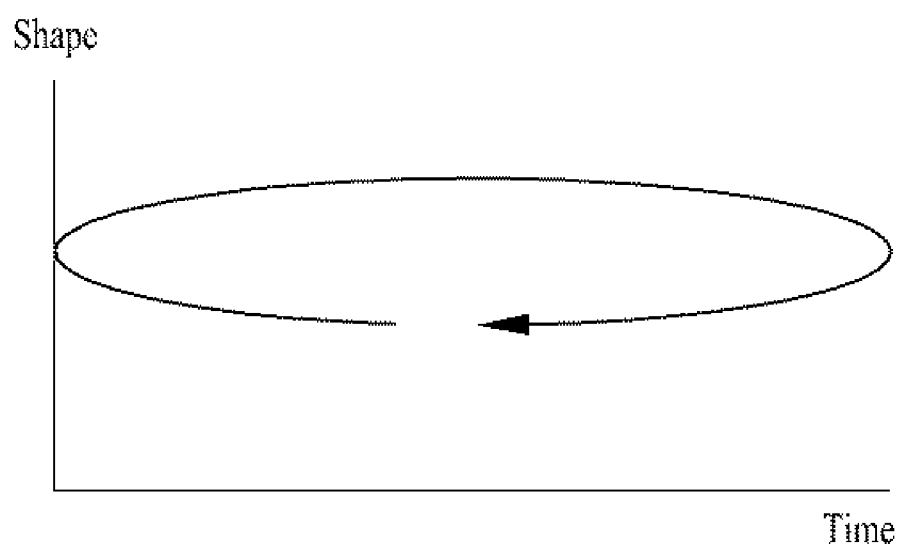
FIG. 9 is a diagram for one example of setting a holography pattern by modifying a holography projected shape according to one embodiment of the present invention.

Referring to FIG. 9A, a projected holography image is set to rotate by maintaining the same distance from a terminal.

Figure 9B:
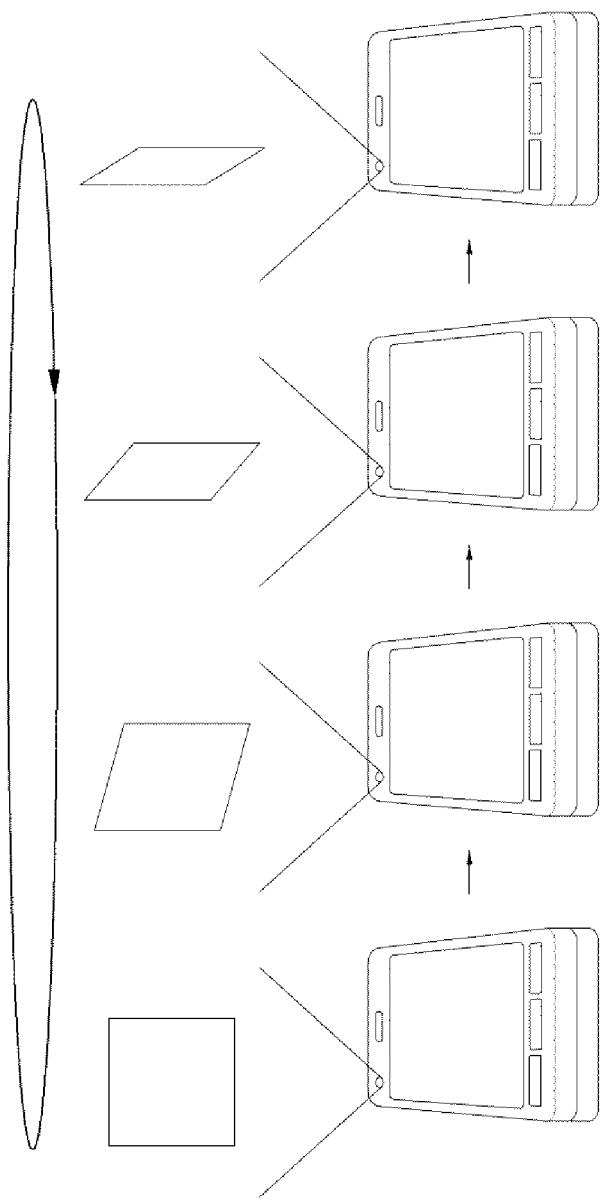

Accordingly, referring to FIG. 9B, the image projected from the terminal rotates in accordance with elapse of time by maintaining the same distance difference from the terminal.

Moreover, it may be able to set a holography pattern by changing a distance difference between a holography image and a terminal and a shape of a projected holography image together.

In particular, it may be able various kinds of holography patterns by changing a distance difference between a holography image and a terminal in accordance with time and also changing a shape of the holography image.

This is described with reference to FIG. 10 as follows.

FIG. 10 is a diagram for one example of setting a holography pattern by adjusting a distance difference and a holography projected shape according to one embodiment of the present invention.

Figure 10A:
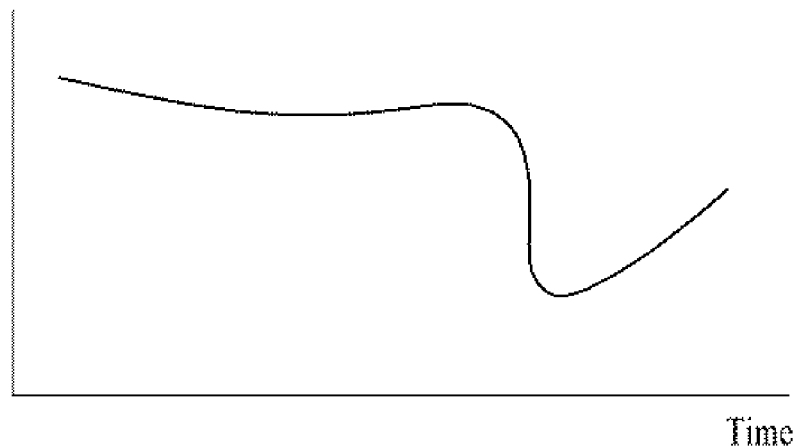
FIG. 10 is a diagram for one example of setting a holography pattern by adjusting a distance difference and a holography projected shape according to one embodiment of the present invention.
Figure 10A:
Figure 10A:
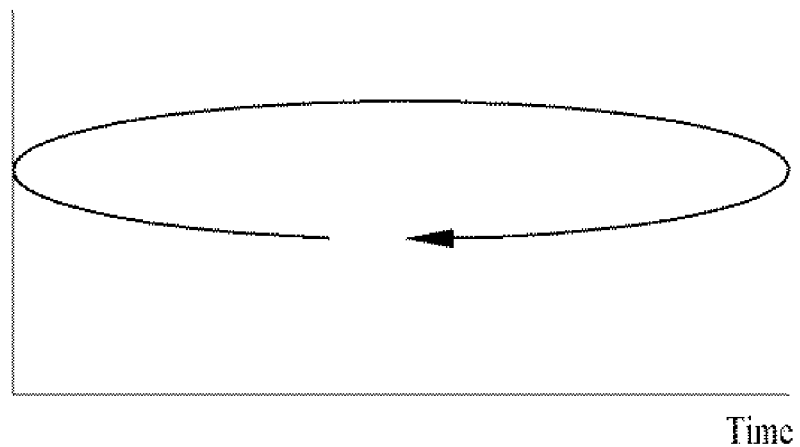

Referring to FIG. 10A, a distance difference between a holography image and a terminal is set to be maintained constantly, decreased and then increased in accordance with time. And, assume that the holography image is projected by rotating.

Figure 10B:
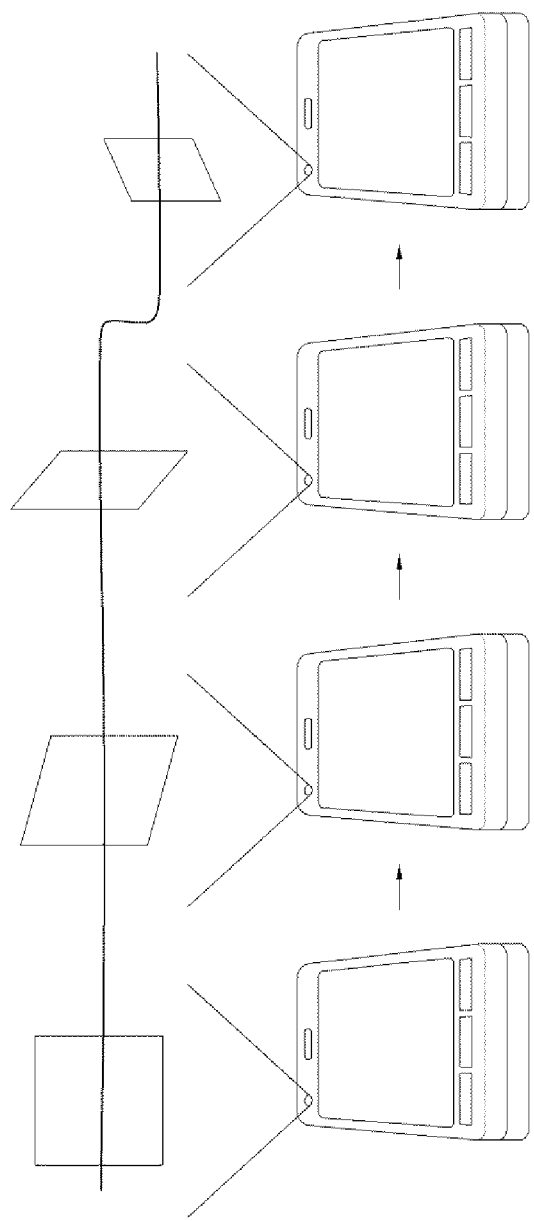

Accordingly, referring to FIG. 10B, a holography image projected by the holography module 156 is displayed by maintaining a distance difference from a terminal, a distance difference between the holography image and the terminal is decreased and then increased, while the holography image keeps being rotated and projected.

Therefore, as the holography image is moving and rotating simultaneously, it may be able to provide a user with various effects.

Meanwhile, a holography image may be projected in a manner of being included in a prescribed region of a previously designated holography background image.

A holography background image may include a closed curve implemented into a combination of at least one of a straight line, a line bent at a prescribed angle, a branch line, a curved line and the like. For instance, the closed curve shape may include one of a circle, a triangle, a quadrangle, a pentagon, a diamond shape and the like and may be implemented in various ways in accordance with user manipulations.

A holography background image, like a holography image, may be implemented by 2D stereoscopic image system or 3D stereoscopic image system. In particular, the 3D stereoscopic image system follows a stereoscopic method of providing different images to both eyes, respectively.

A content of a holography image may be displayed on a whole region or a partial region of a holography background. Moreover, a holography background is partitioned into a plurality of regions by a user manipulation to display contents of a plurality of holography images thereon.

For instance, after a holography background of a television shape has been partitioned into 4 sections, 4 different image contents may be projected as a holography image on the 4 sections, respectively.

FIG. 11 is a diagram for one example of setting a holography background according to one embodiment of the present invention.

In FIG. 11, assume that a prescribed shape is recognized via the touchscreen and that a holography background corresponding to the recognized shape is set. Yet, this assumption is just exemplary. Alternatively, it may be able to set a holography background by such a different method as a menu manipulation and the like.

Figure 11A:
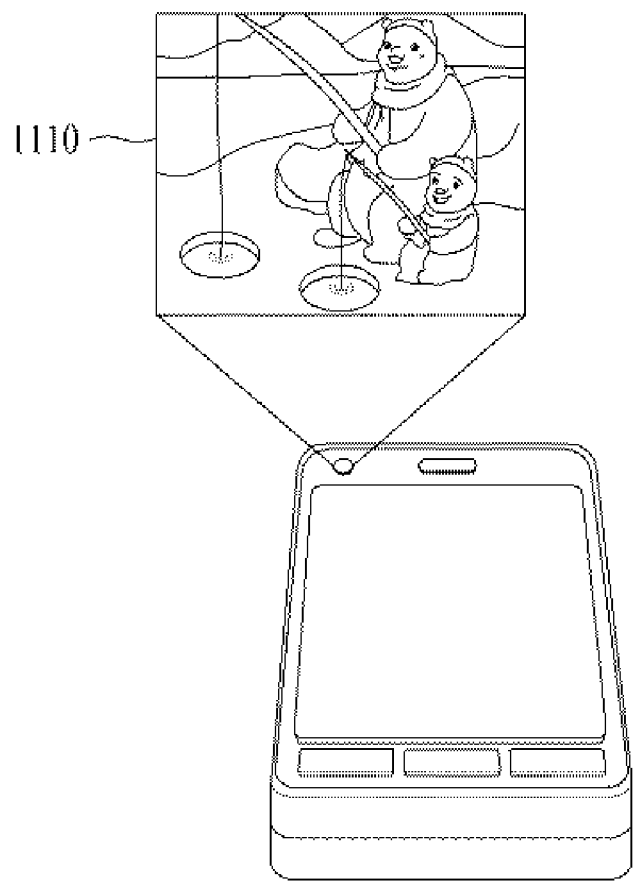
FIG. 11 is a diagram for one example of setting a holography background according to one embodiment of the present invention.

Referring to FIG. 11A, an image content 1110 is projected as a holography image.

Figure 11B:
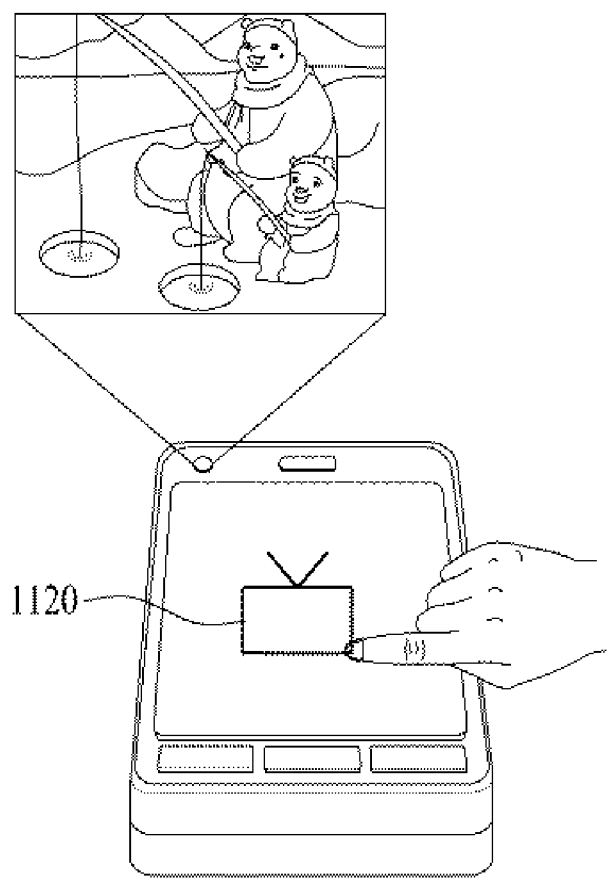

In doing so, referring to FIG. 11B, a user may input a 1st shape 1120 via the touchscreen. If the 1st shape 1120 is inputted, the controller 180 determines a holography background corresponding to the 1st shape 1120 and may control a holography image to be projected in a manner that the image content 1110 is included within the determined holography background.

The controller 180 may control the touchscreen to display a list of candidates for a plurality of holography backgrounds applicable in association with the 1st shape 1120.

Figure 11C:
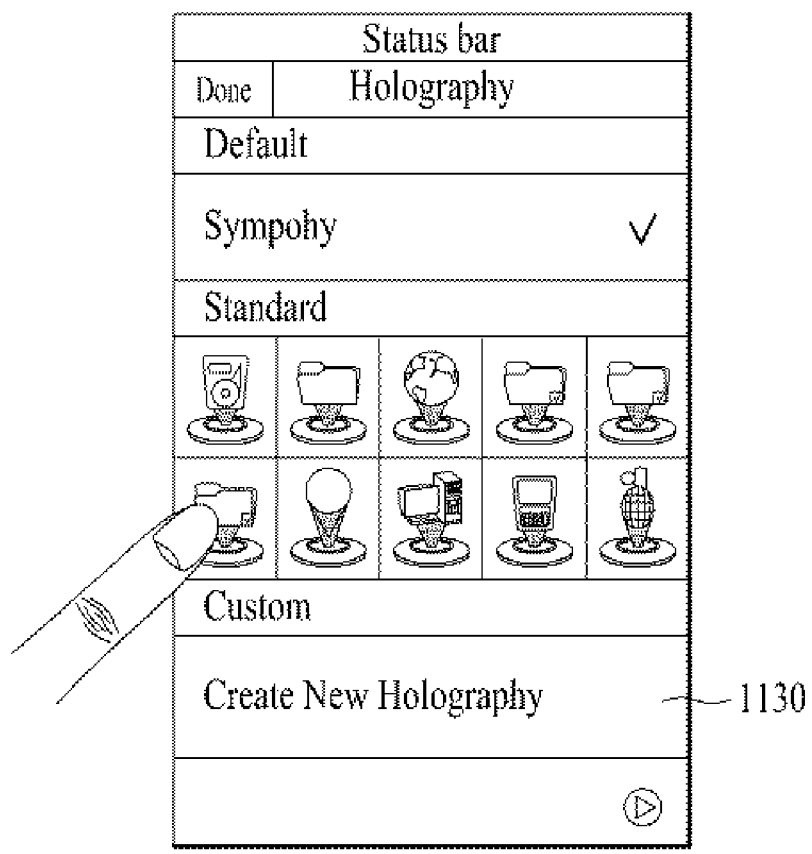

In doing so, the list may be displayed as thumbnails, which is shown in FIG. 11C.

Referring to FIG. 11C, a candidate list 1130 of holography backgrounds settable to correspond to the 1st shape 1120 may be displayed as thumbnails. A user may be able to select a prescribed holography background from the displayed holography background candidate list 1130.

Figure 11D:
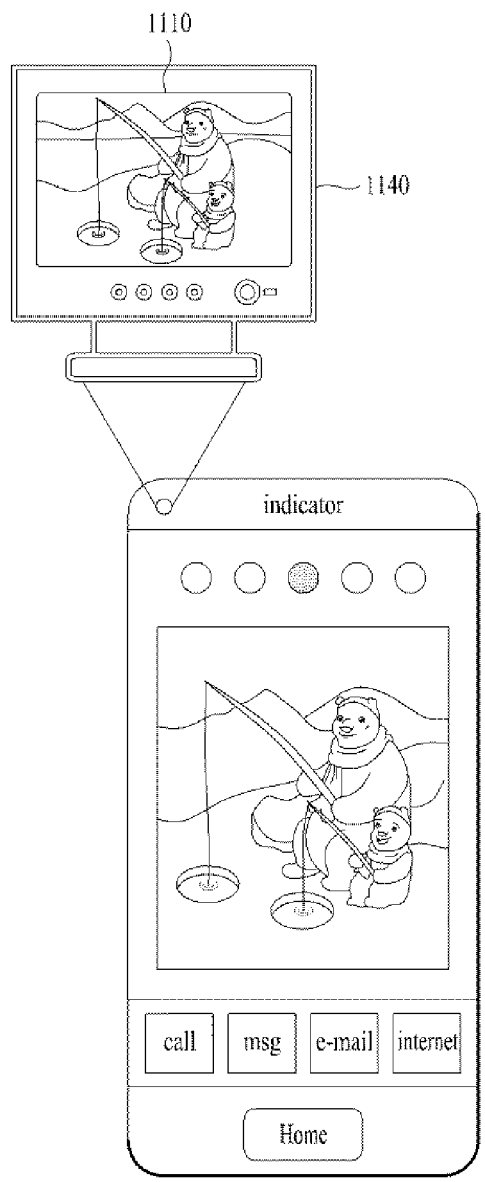

Referring to FIG. 11D, the controller 180 controls the holography module to output a holography image in a manner that the image content 1110 is displayed on a prescribed region within the selected holography background 1140.

FIG. 12 is a diagram for one example of displaying a plurality of image contents on a predetermined region within a holography background according to one embodiment of the present invention.

In FIG. 12, assume that a content projected as a holography image includes an image content.

In FIG. 11, assume that a prescribed shape is recognized via the touchscreen and that a holography background corresponding to the recognized shape is set. Yet, this assumption is just exemplary. Alternatively, it may be able to set a holography background by such a different method as a menu manipulation and the like.

As mentioned in the foregoing description, an image content may be displayed on a whole or partial region of a holography background and a ratio of this region may be randomly modified by a user. Moreover, a holography background is partitioned into a plurality of regions and a plurality of image contents may be displayed on a plurality of the regions, respectively.

Figure 12A:
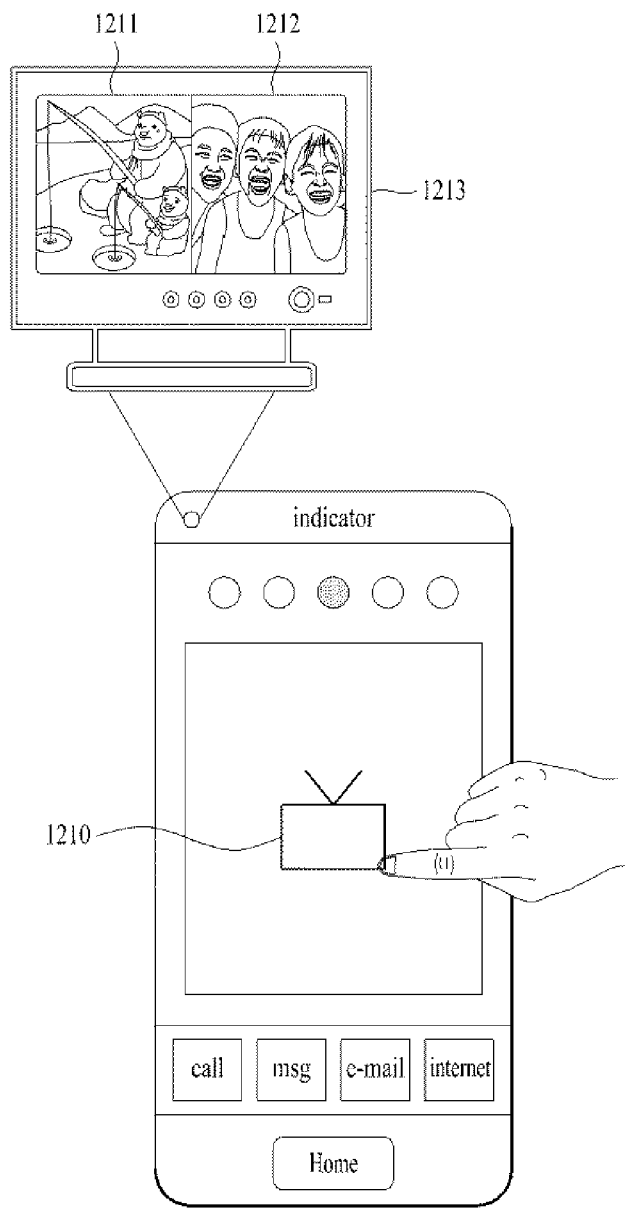
FIG. 12 is a diagram for one example of displaying a plurality of image contents on a predetermined region within a holography background according to one embodiment of the present invention.

Referring to FIG. 12A, a user may input a 1st shape 1210 via the touchscreen. If the 1st shape 1210 is inputted, the controller 180 determines a holography background 1213 corresponding to the 1st shape 1210 and may control a holography image to be projected in a manner that an image content is included within the determined holography background 1213.

In FIG. 12A, the image content is designated to be displayed on a region amounting to 80% of the holography background 1213. The region amounting to 80% of the holography background 1213 is divided into two regions 1211 and 1212. And, two image contents are displayed on the two regions 1211 and 1212 as a holography image, respectively.

Figure 12B:
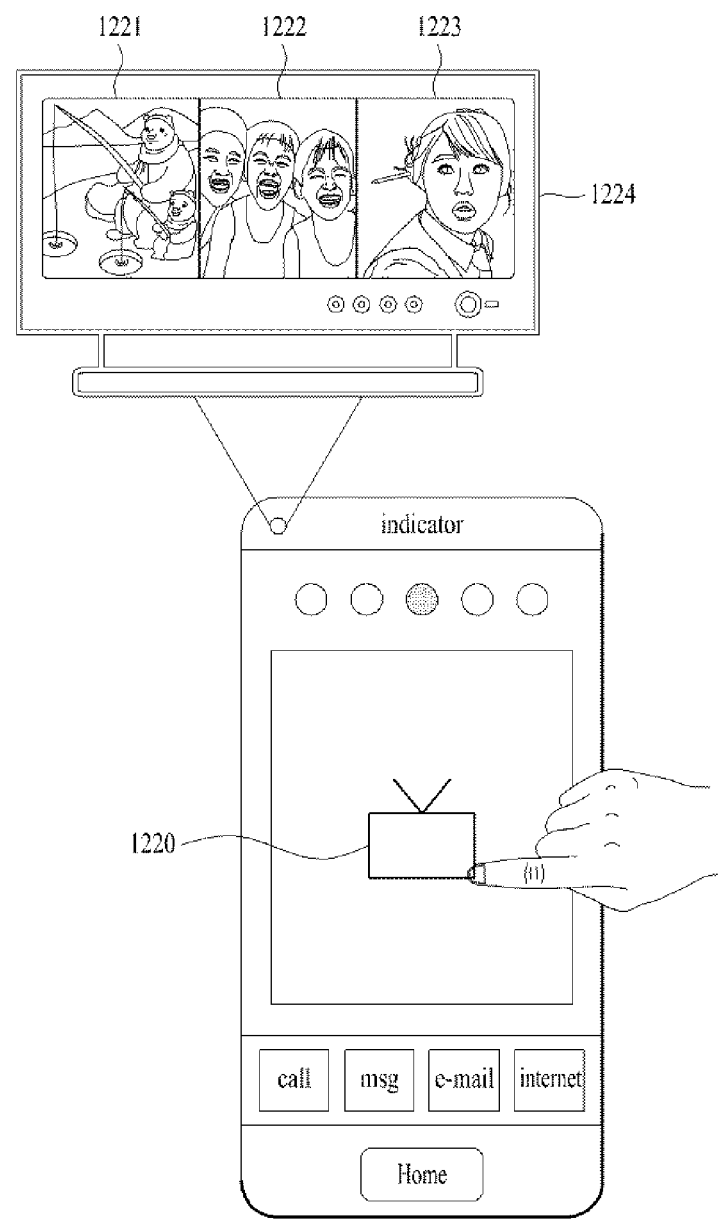

Referring to FIG. 12B, a user may input a 2nd shape 1220 via the touchscreen. If the 2nd shape 1220 is inputted, the controller 180 determines a holography background 1224 corresponding to the 2nd shape 1220 and may control a holography image to be projected in a manner that an image content is included within the determined holography background 1213.

In FIG. 12B, the image content is designated to be displayed on a region amounting to 85% of the holography background 1224. The region amounting to 85% of the holography background 1224 is divided into 3 regions 1221, 1222 and 1223. And, 3 image contents are displayed on the 3 regions 1221, 1222 and 1223 as a holography image, respectively.

FIG. 13 is a diagram for a detailed example of a holography background according to one embodiment of the present invention.

Figure 13A:
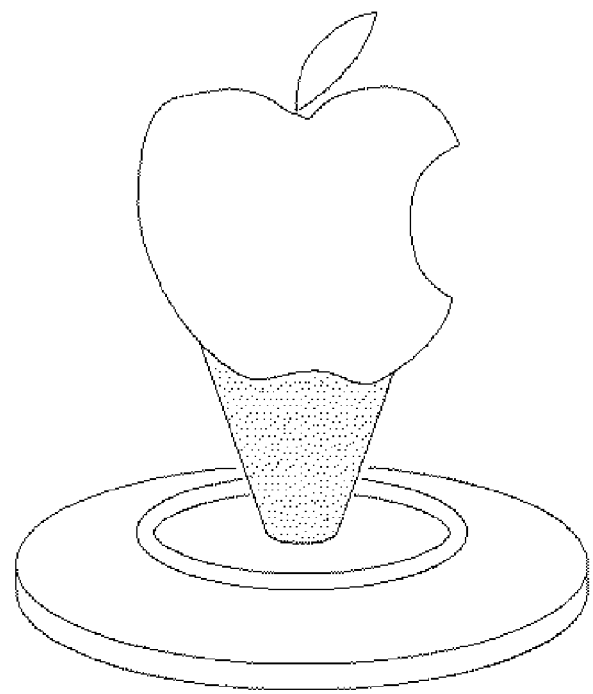
FIG. 13 is a diagram for one detailed example of a holography background according to one embodiment of the present invention.

In particular, FIG. 13A shows one example of implementing a holography background of an apple shape.

Figure 13B:
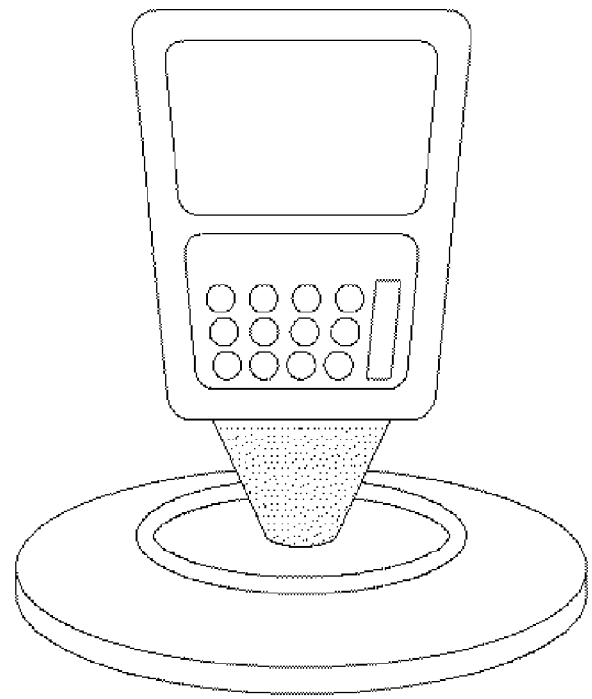

FIG. 13B shows one example of implementing a holography background of a calculator shape.

Figure 13C:
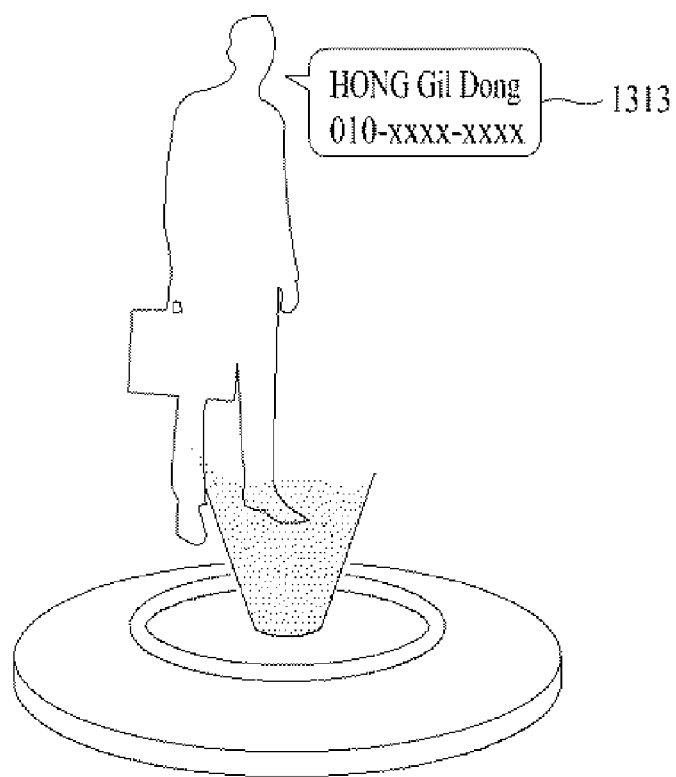

FIG. 13C shows one example of implementing a holography background of a character shape. In doing so, a detailed information 1313 on an object may be displayed on a prescribed region of the holography background as well.

Figure 13D:
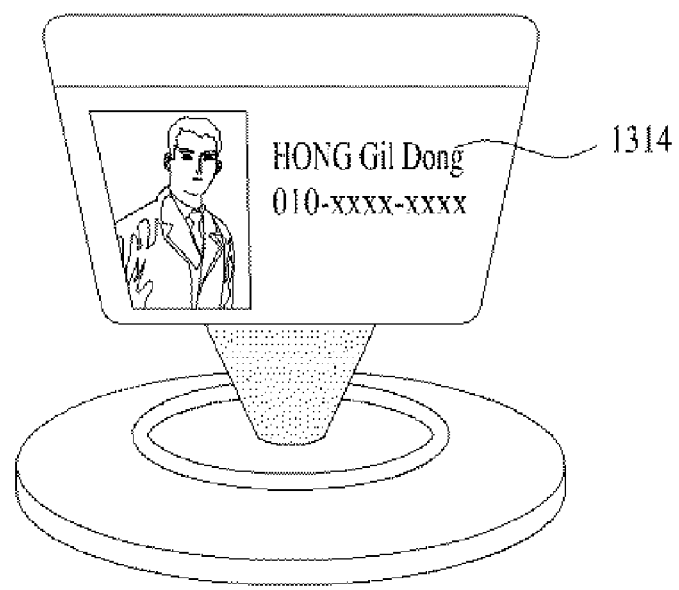

FIG. 13D shows one example of implementing a holography background of a business card shape. In doing so, a detailed information 1314 on an object may be displayed on a prescribed region of the holography background as well.

Figure 13E:
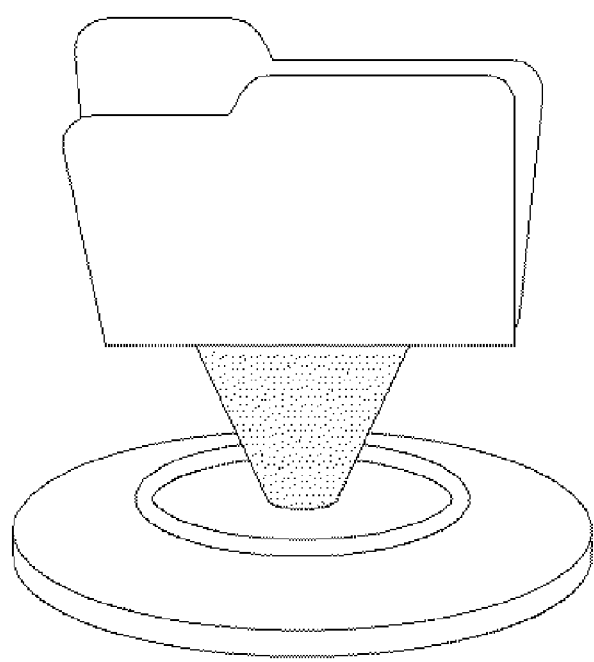

FIG. 13E shows one example of implementing a holography background of a folder shape.

Figure 13F:
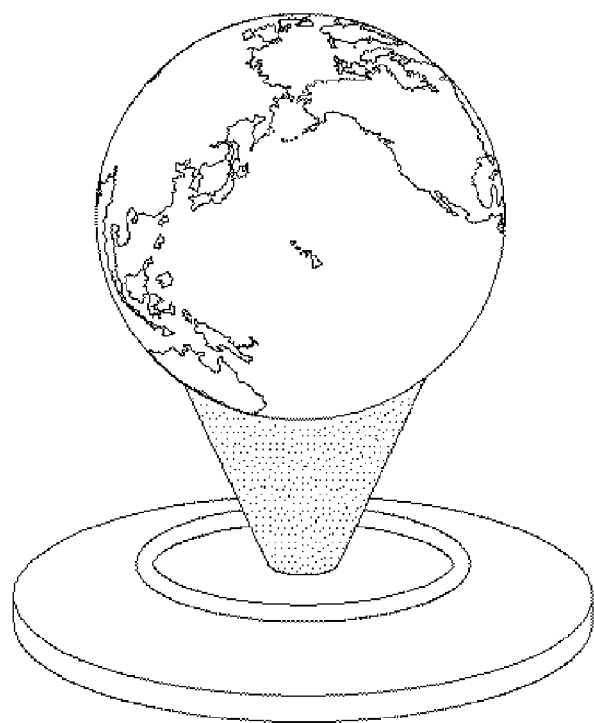

FIG. 13F shows one example of implementing a holography background of a globe shape.

Figure 13G:
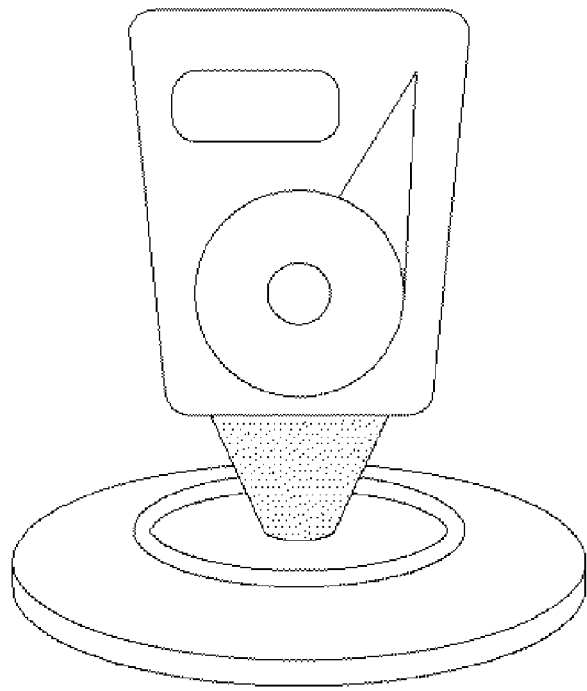

FIG. 13G shows one example of implementing a holography background of a video image shape.

Figure 13H:
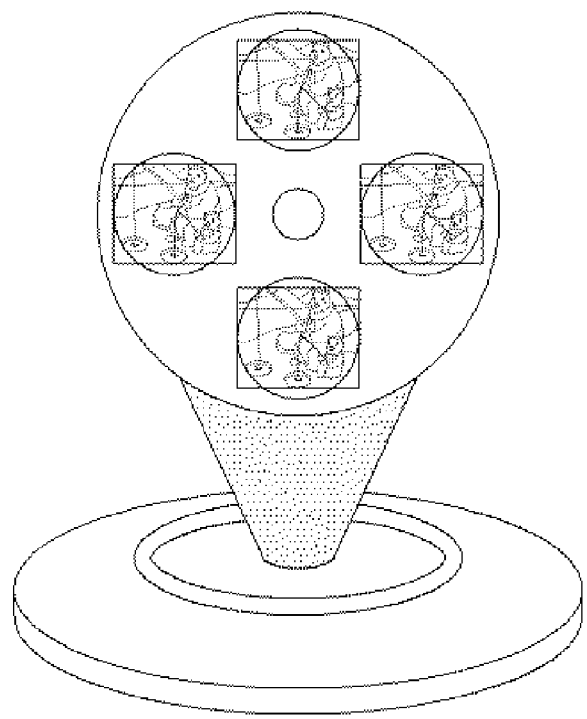

FIG. 13H shows one example of implementing a holography background of a gallery shape. In doing so, a plurality of image contents may be projected as a gallery shape together with the holography background.

Figure 13I:
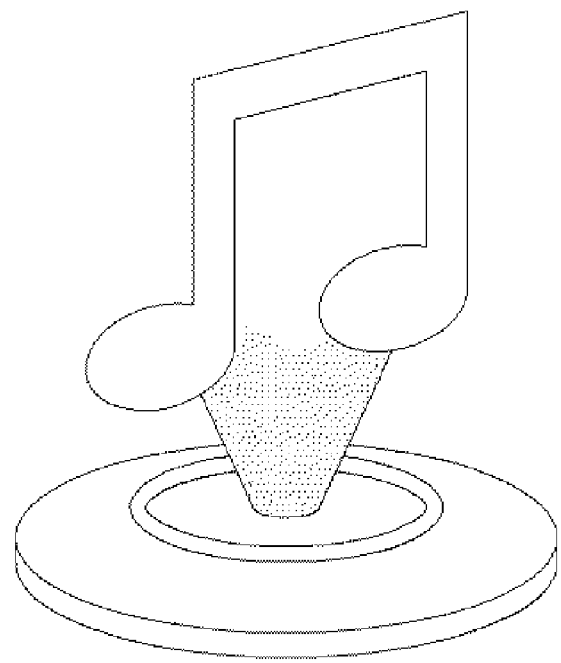

FIG. 13I shows one example of implementing a holography background of a music image shape.

Figure 13J:
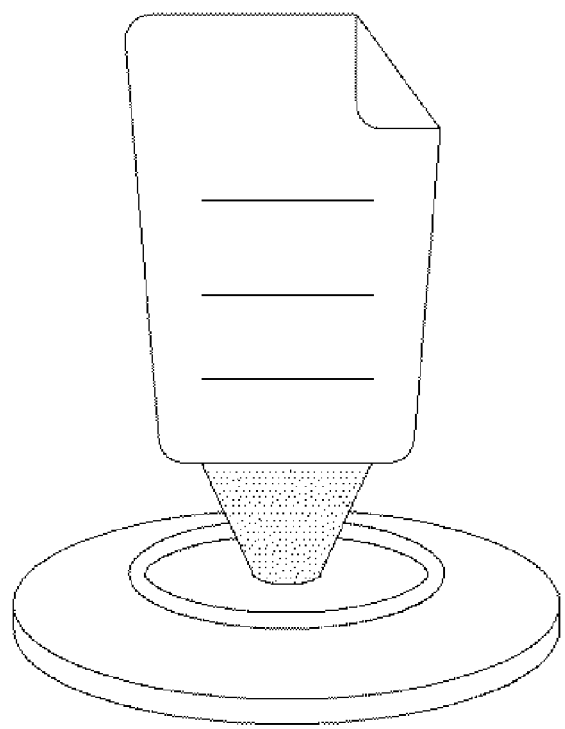

FIG. 13J shows one example of implementing a holography background of a memo shape.

Figure 13K:
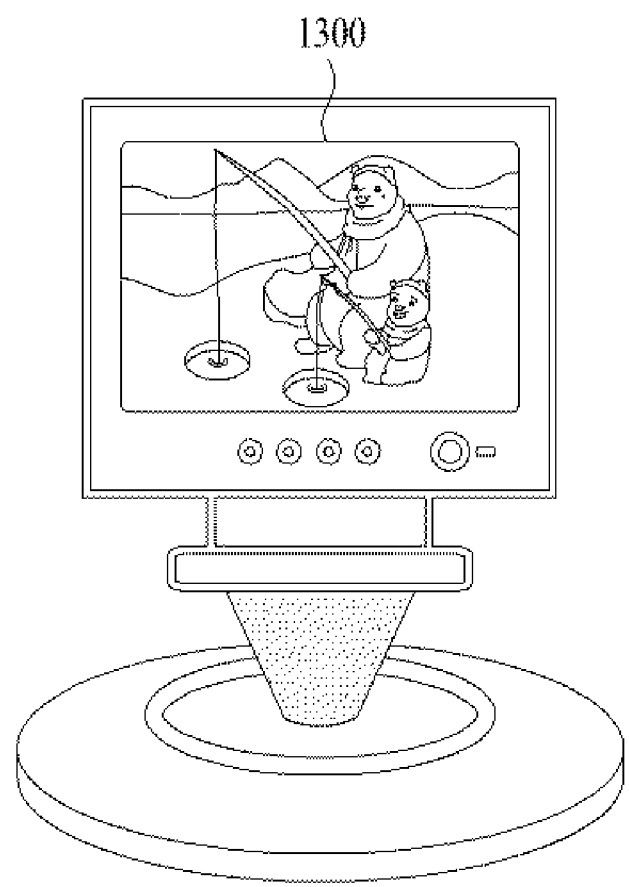

FIG. 13K shows one example of implementing a holography background of a TV image shape.

Yet, the above-mentioned holography backgrounds are just exemplary. More holography backgrounds may be implemented in various ways using the closed curve shape including a closed curve implemented into a combination of at least one of a straight line, a line bent at a prescribed angle, a branch line, a curved line and the like.

Meanwhile, a user may be able to set a specific object or screen, which is to be projected as a holography image, according to one embodiment of the present invention.

First of all, an object, which can be projected as a holography image, may include one of an address book, a plurality of applications, a name of a specific object, a plurality of contents and the like. In particular one of an address book, a plurality of applications and a plurality of contents may be displayed as a holography image or a name of a specific object may be displayed as a holography image. Yet, the above description is just exemplary. Optionally, a user may be able to randomly designate a new target or change a target.

Moreover, a screen, which can be projected as a holography image, may include a whole or partial region displayed on the display unit.

In particular, a part, which will be projected as a holography image, may be set on a whole screen of the display unit. For instance, a screen amounting to 70% of the display unit may be set to be projected as a holography image.

This is described in detail with reference to FIG. 15 and FIG. 15 as follows.

FIG. 14 is a diagram for one example of an object, which can be projected as a holography image, according to one embodiment of the present invention.

Figure 14A:
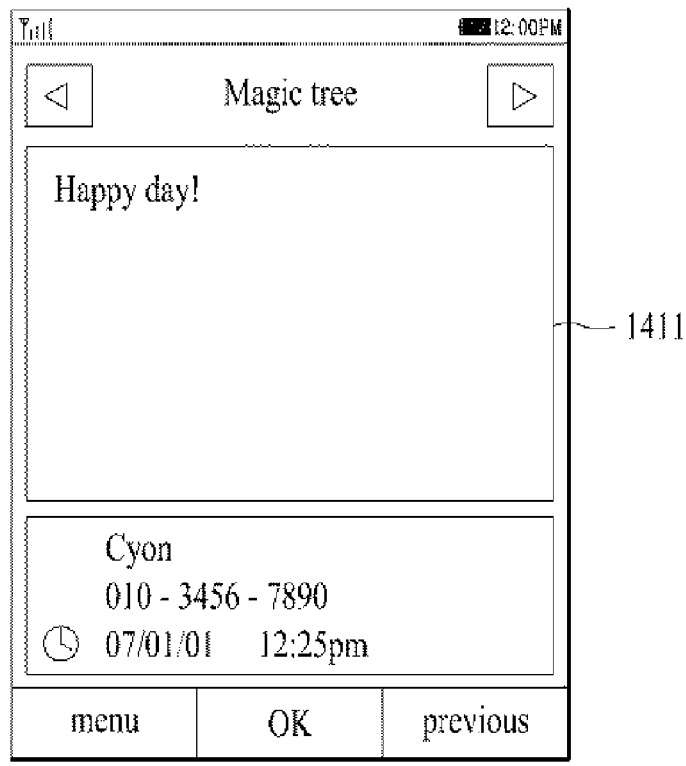
FIG. 14 is a diagram for one example of an object to be projected as a holography image according to one embodiment of the present invention.

Referring to FIG. 14a, a text 1411 included in a message may be to be projected as a holography image.

Figure 14B:
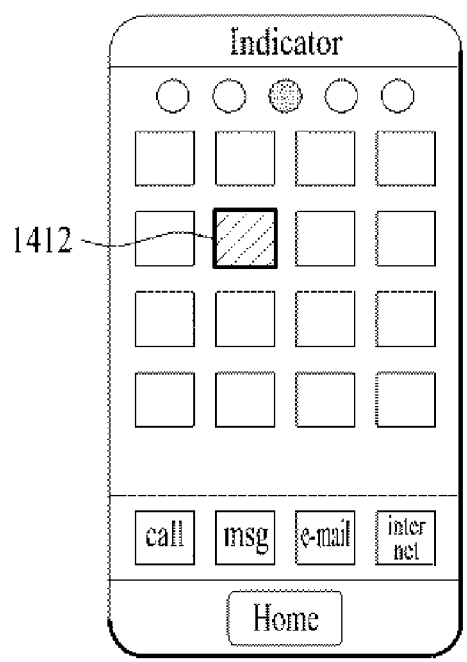

Referring to FIG. 14B, a specific icon 1412 among a plurality of icons may be projected as a holography image. In this case, the example is related to icons. Alternatively, a widget, an emoticon or the like may become a holography image settable target as well.

Figure 14C:
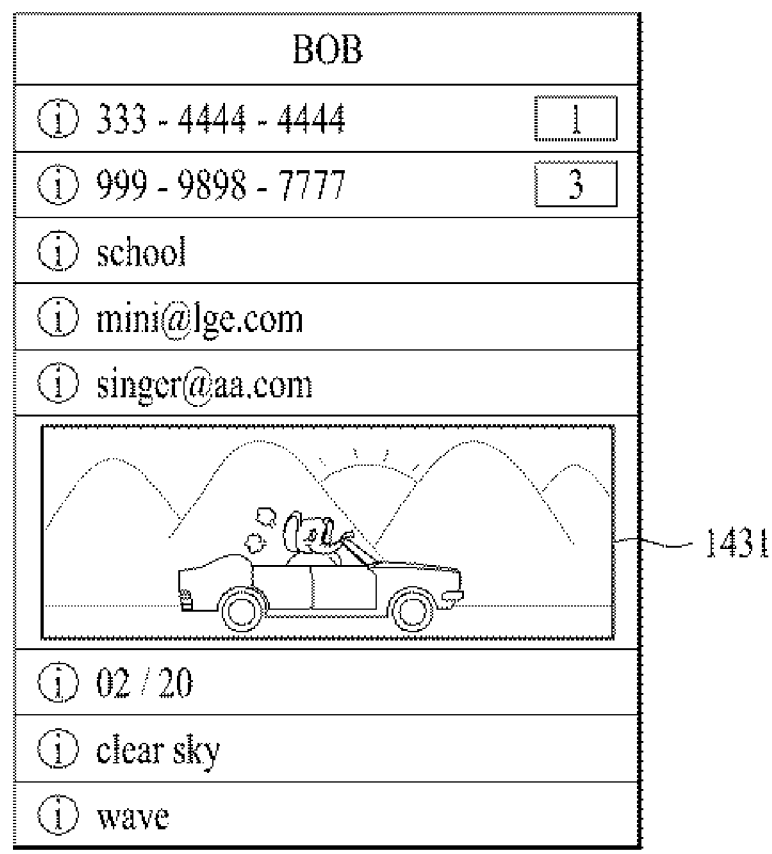

Referring to FIG. 14C, an image 1431 among informations saved in a phonebook may be set as a target to which a holography image will be applied.

FIG. 15 is a diagram for one example of a screen projected as a holography image according to one embodiment of the present invention.

Figure 15A:
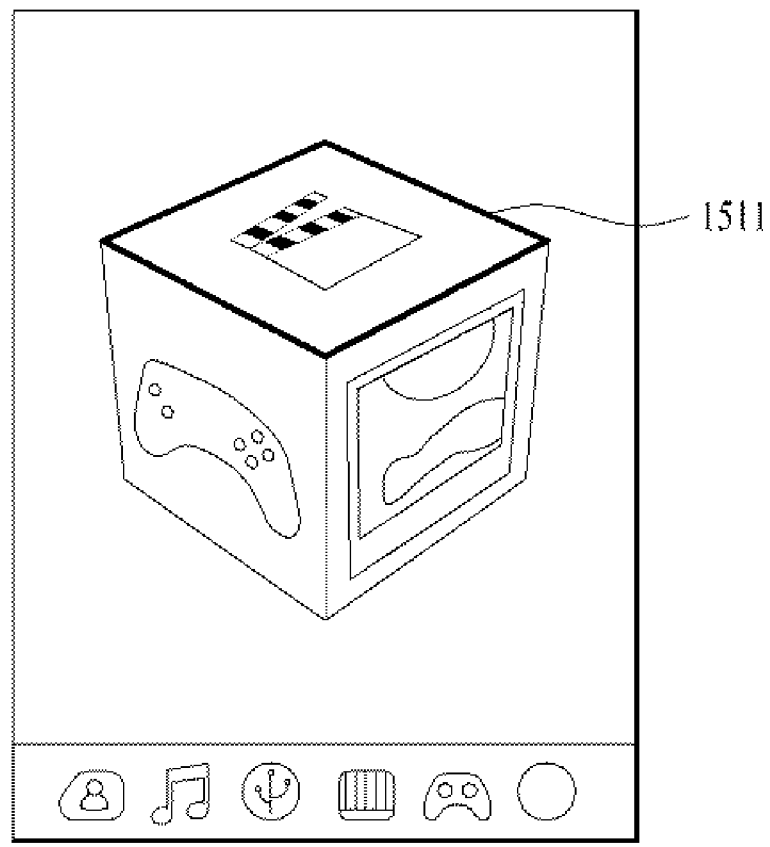
FIG. 15 is a diagram for one example of a screen to be projected as a holography image according to one embodiment of the present invention.

Referring to FIG. 15A, a plurality of informations are displayed as a cube on a display unit.

If a user designates a specific face 1511 among a plurality of faces of the cube, on which a plurality of the informations are displayed, respectively, the designated specific face 1411 may be projected as a holography image.

In particular, a partial region displayed on a screen may be controlled to be displayed as a holography image in accordance with a holography pattern.

Figure 15B:
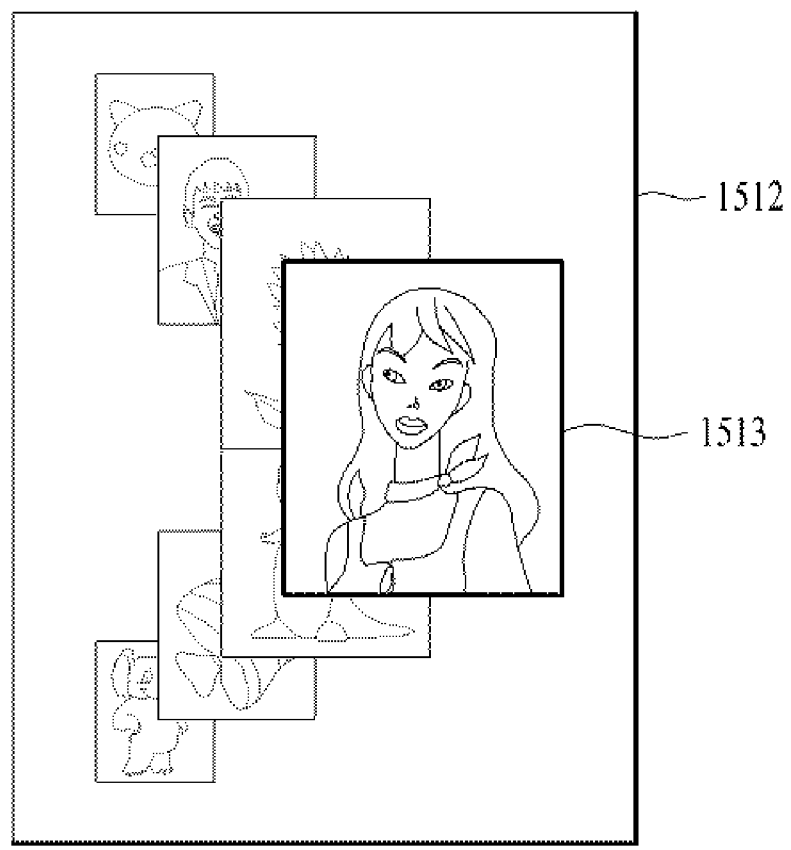

Referring to FIG. 15B, depths are given to a plurality of images, respectively. And a whole screen region 1512 may be controlled to be projected as a holography image.

A region corresponding to a partial image 1513 among a plurality of the images may be controlled to be projected as a holography image only.

Meanwhile, according to one embodiment of the present invention, an object, to which a holography pattern will be applied, may include a specific target or a specific group designated by a user.

This is described in detail with reference to FIG. 16 as follows.

FIG. 16 is a diagram for one example of setting a specific target or a specific group, which is projected as a holography image, according to one embodiment of the present invention.

Figure 16A:
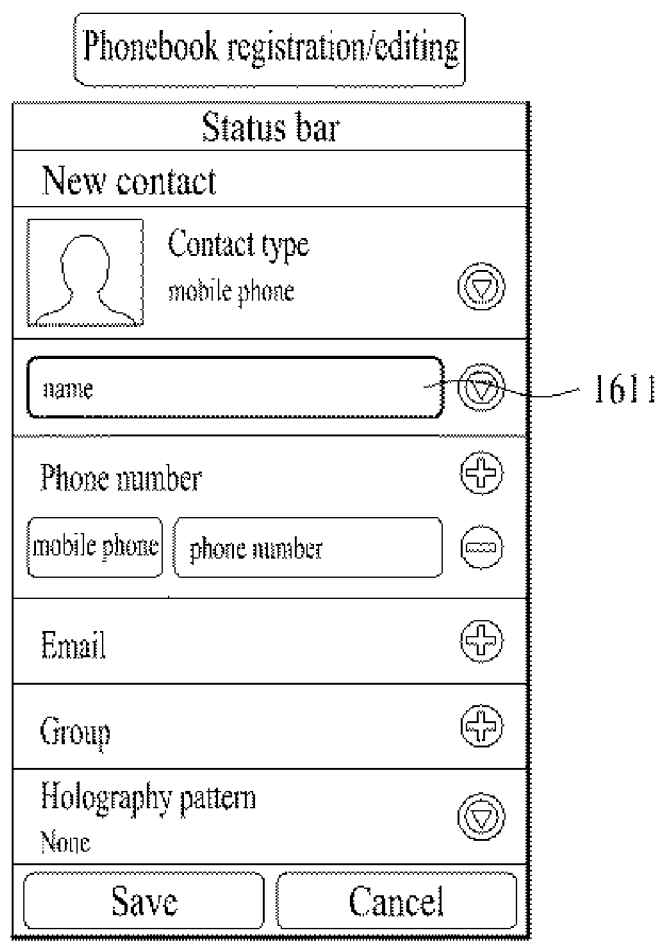
FIG. 16 is a diagram for one example of setting a specific target or a specific group to be projected as a holography image according to one embodiment of the present invention.

Referring to FIG. 16A, a specific target added via an editing menu 1611 of a phonebook may be set to be projected as a holography image only.

Figure 16B:
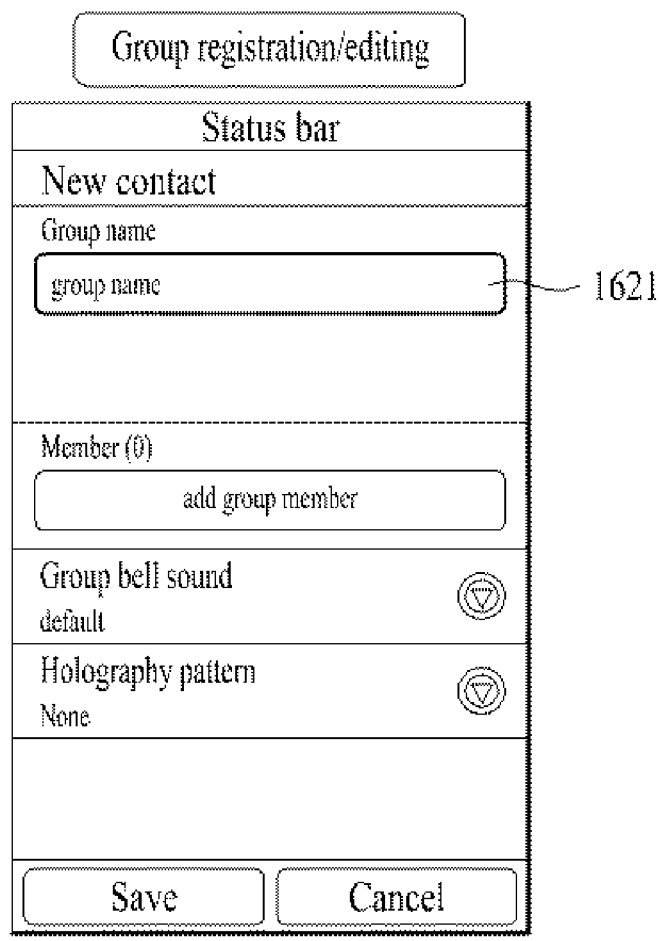

Referring to FIG. 16B, a target sorted as a specific group via a group menu 1621 of a phonebook may be projected as a holography image only.

Therefore, it may be able to conveniently manage a specific target or group, which will be projected as a holography image, by a specific target or group unit.

Meanwhile, according to one embodiment of the present invention, a notification holography image for notifying a prescribed information may be externally outputted together with a general holography image.

In particular, a notification holography image may include a closed curve implemented with a combination of at least one of a straight line, a line bent at a prescribed angle, a branch line, a curved line and the like. For instance, the closed curve shape may include one of a circle, a triangle, a quadrangle, a pentagon, a diamond shape and the like and may be implemented in various ways in accordance with user manipulations.

A notification holography image, like a general holography image, may be implemented by 2D stereoscopic image system or 3D stereoscopic image system. In particular, the 3D stereoscopic image system follows a stereoscopic method of providing different images to both eyes, respectively.

A notification holography image is outputted together with a general holography image, which similar to a holography background image.

Yet, a notification holography image may differ from a general holography image in being used to notify prescribed information to a user. Moreover, a notification holography image may be outputted in a manner of being included in or superimposed on a general holography image, whereas a holography background image is outputted in a manner of including a general holography image.

Representatively, a notification holography image may include one of a band notification holography image, a transparent layer notification holography image and a partitioned region notification holography image.

First of all, a band notification holography image may mean an image outputted in a manner of reducing a size of a general holography image and banding an outline of the reduced general holography image.

Secondly, a transparent layer notification holography image may mean a holography image outputted through a transparent layer in a manner of giving a depth to a holography image and superimposing the transparent layer on a general holography image.

Thirdly, a partitioned region notification holography image may mean a holography image outputted in a manner of partitioning a whole region of a general holography image by reducing a size of the general holography image and then outputting the holography image to a remaining portion of the partitioned whole region.

Yet, the above-mentioned band notification holography image, transparent layer notification holography image and partitioned region notification holography image are just examples of a notification holography image, by which the present invention may be non-limited. And, a notification holography image may be implemented into another form using a closed curve implemented with a combination of at least one of a straight line, a line bent at a prescribed angle, a branch line, a curved line and the like.

Figure 17A:
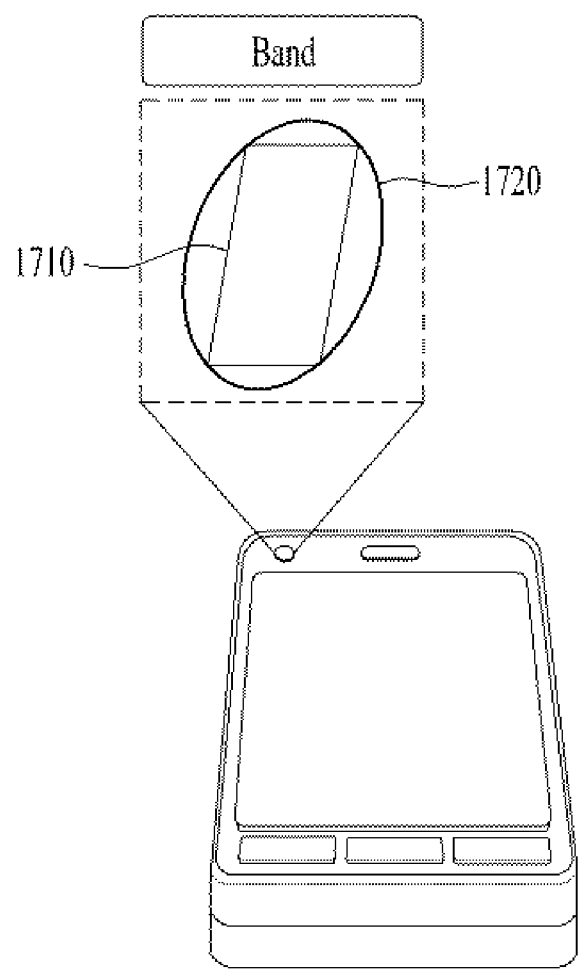
FIG. 17 is a diagram for one example of a notification holography image according to one embodiment of the present invention.
Figure 17B:
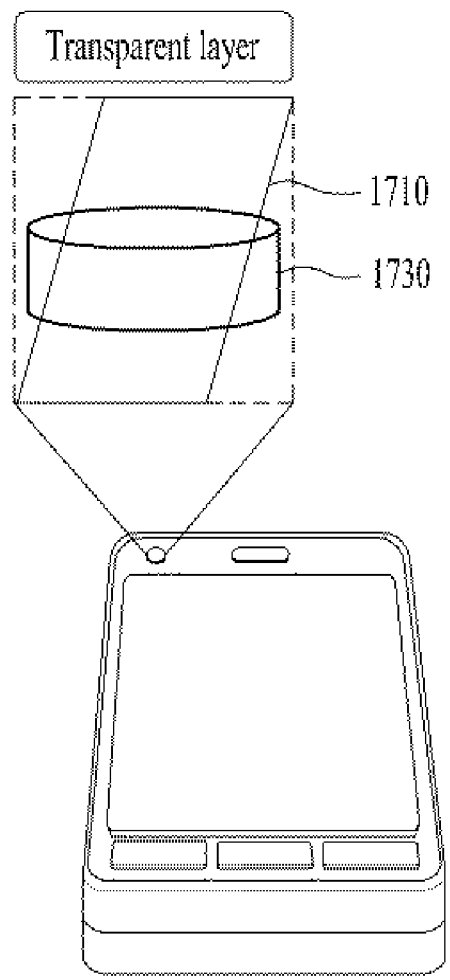
Figure 17C:
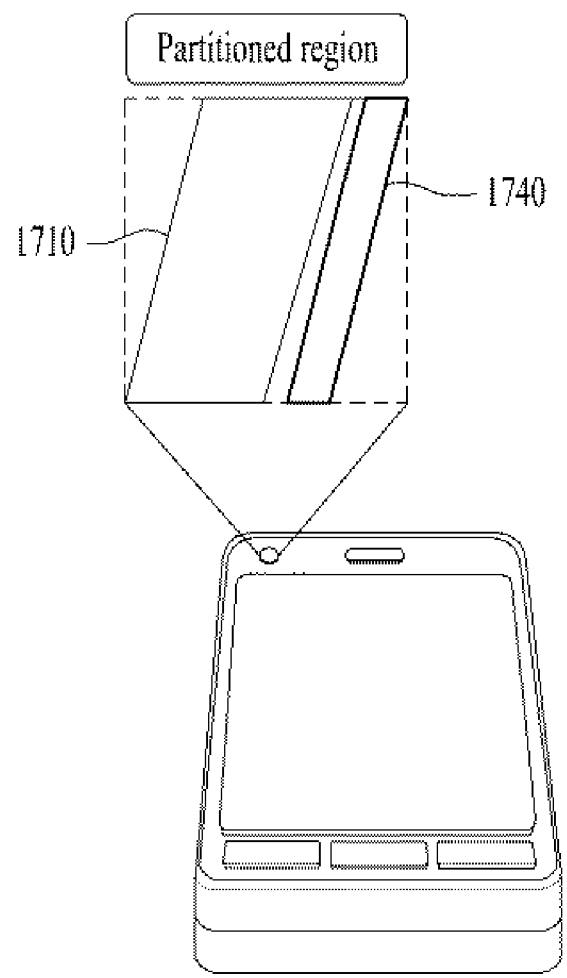

FIGS. 17A to 17C are diagrams for one example of a notification holography image according to one embodiment of the present invention.

FIG. 17A shows one example of outputting a band notification holography image. Referring to FIG. 17A, a size of a general holography image 1710 is reduced at a prescribed ratio. And, a band notification holography image 1720 is outputted together with the reduced general holography image in a manner of banding an outline of the reduced general holography image.

FIG. 17B shows one example of outputting a transparent layer notification holography image. Referring to FIG. 17B, a depth is given to a general holography image 1710. A transparent layer is superimposed on the general holography image. And, a transparent layer notification holography image 1730 is then outputted through the transparent layer together with the general holography image.

FIG. 17C shows one example of outputting a partitioned region notification holography image. Referring to FIG. 17C, a whole region is partitioned by reducing a size of general holography image 1710. A partitioned region notification holography image 1740 is then outputted to a remaining portion of the partitioned whole region together with the reduced general holography image. In the description with reference to FIG. 17C, the partitioned region notification holography image is assumed as having a quadrangular shape. Alternatively, it is apparent that the partitioned region notification holography image 1740 may be included in the partitioned region by taking various forms.

Meanwhile, according to one embodiment of the present invention, in case that a terminal receives a previously designated notification signal, a function of outputting the above-mentioned notification holography image may be provided. In particular, a user may be able to conveniently check a type, content and the like of a notification signal through a notification holography image outputted before checking the notification signal separately.

In this case, a notification signal previously designated by a user may include one of a call notification signal, a message notification signal, an email notification signal, an alarm notification signal, a calendar notification signal, a reminder notification signal, a battery notification signal and the like.

A call notification signal is a signal for notifying a case of transmitting/receiving a call signal to/from an external terminal. The call notification signal may be applied for each specific object, which will be described in detail later.

A message notification signal is a signal for notifying a case of transmitting/receiving a message to/from an external terminal. The message notification signal may be applied for each specific object.

An email notification signal is a signal for notifying a case of transmitting/receiving an email to/from an external terminal. The email notification signal may be applied for each specific object.

An alarm notification signal is a signal for notifying an alarm designated by a user.

A calendar notification signal is a signal for notifying a user of a date. The calendar notification signal may be used to notify a specific date designated by a user only.

A reminder notification signal is a signal for notifying a user's schedule. A plurality of reminder notification signals are prioritized by a user and may be applicable in a manner of being sorted by priority.

A battery notification signal is a signal for notifying a user of a remaining battery level of a terminal. And, the battery notification signal may be receivable only if the remaining battery level is equal to or lower than a preset threshold remaining level.

The above-mentioned call, message, email, alarm, calendar, reminder and battery notification signals are just examples of the notification signal. Optionally, a user may be able to arbitrarily designate other notification signals.

If a notification occurs in the course of outputting a general holography image, the output of the general holography image may temporarily pause and a notification holography image may be then outputted together with the pausing general holography image.

The present invention may vary in accordance with whether a terminal is in the course of projecting or non-projecting a holography image at a timing point of relieving a preset notification signal.

In the following description, the present invention shall be separately explained in detail regarding a case of receiving a preset notification signal in the course of projecting a holography image and a case of receiving a preset notification signal in the course of non-projecting a holography image.

First of all, a case of receiving a preset notification signal in the course of projecting a holography image is described in detail with reference to FIGS. 18 to 31C as follows.

Figure 18:
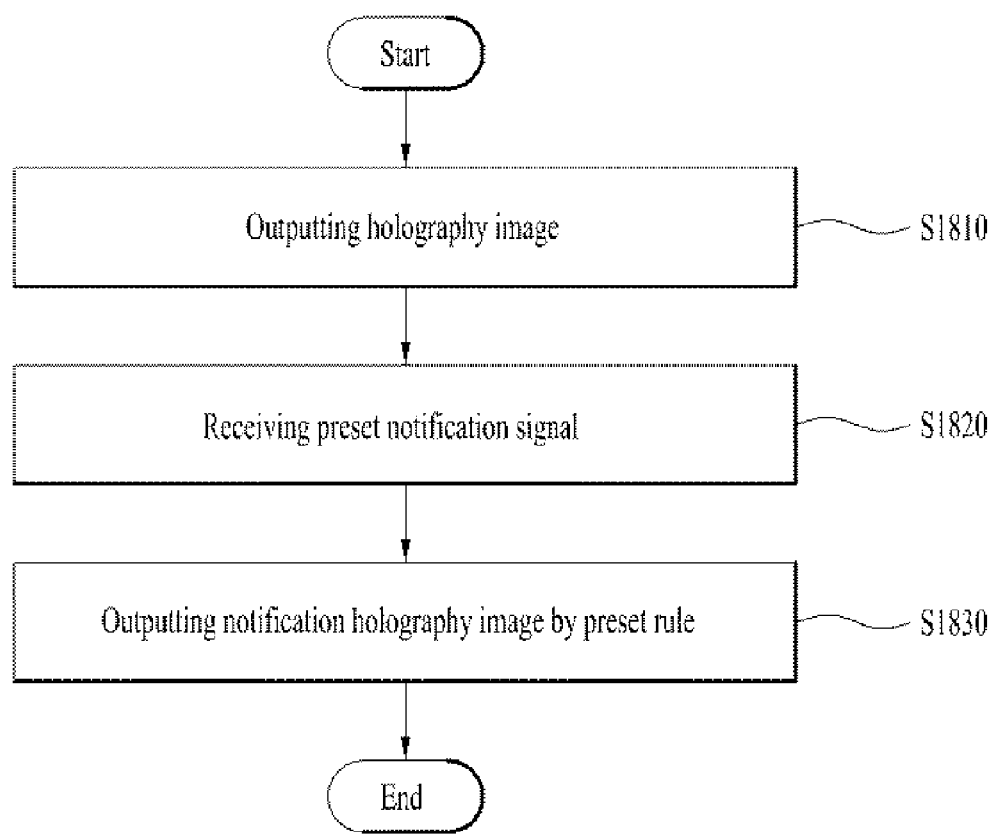
FIG. 18 is a flowchart for one example of projecting a notification holography image in case of receiving a preset notification signal in the course of projecting a holography image according to one embodiment of the present invention.

FIG. 18 is a flowchart for one example of projecting a notification holography image in case of receiving a preset notification signal in the course of projecting a holography image according to one embodiment of the present invention.

Referring to FIG. 18, a general holography image may be outputted via the holography module 156 of the mobile terminal [S1810].

Thereafter, the mobile terminal 100 may receive a preset notification signal [S1820]. In this case, the notification signal may include one of a call notification signal, a message notification signal, an email notification signal, an alarm notification signal, a calendar notification signal, a reminder notification signal, a battery notification signal and the like.

Once the preset notification signal is received, a notification holography image may be outputted to notify a user of the notification signal reception by applying a preset rule under the control of the controller 180 [S1830].

In particular, a received notification signal type information may be displayed via the notification holography image, a received notification signal content information may be displayed via the notification holography image, or both type information and content information may be displayed via the notification holography image.

Meanwhile, it may be able to provide a method of identifying the received notification signal type information in a manner of changing color, style, type, thickness, size, transparency and/or the like of the notification holography image.

More various kinds of informations may be provided to a user in a manner that a displayed notification holography image is changed in accordance with time.

After a notification holography image has been outputted, if at least one of a plurality of preset cancellation trigger events occurs, the controller 180 stops outputting the notification holography image and may control a general holography image to be outputted only.

In this case, a plurality of the preset cancellation trigger events may include a specific key input event, a touch input event of a specific pattern (e.g., double touch, long touch, proximity touch, etc.), an event in which a distance difference between an outputted notification holography image and a user's pointer comes within a threshold distance, a motion event inputted via a gyro-sensor and the like. The above-enumerated events are just examples of a plurality of the preset cancellation trigger events. And, a user may be able to arbitrarily change or add cancellation trigger events.

In the following description, a method of outputting a notification holography image is explained in detail with reference to FIGS. 19A to 28.

First of all, a received notification signal type information may be displayed through a notification holography image. In particular, a text, icon and image (e.g., a photo of an object having transmitted a call notification signal when the call notification signal is received) of a received notification signal may be displayed through a notification holography image.

In doing so, the outputted notification holography image may experience such an effect as moving or flickering in accordance with time. Moreover, if a time designated by a user expires, the outputted notification holography image may disappear automatically.

Figure 19A:
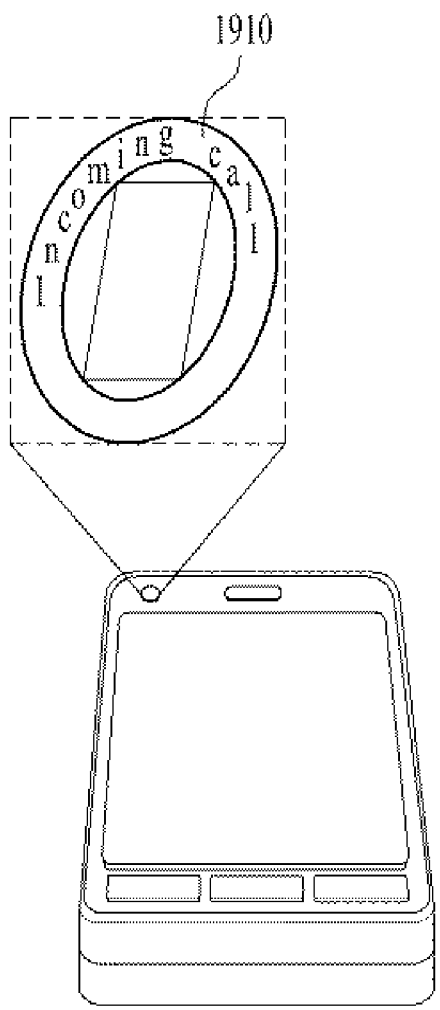
FIG. 19 is a diagram for one example of displaying a received notification signal type information via a notification holography image according to one embodiment of the present invention.
Figure 19B:
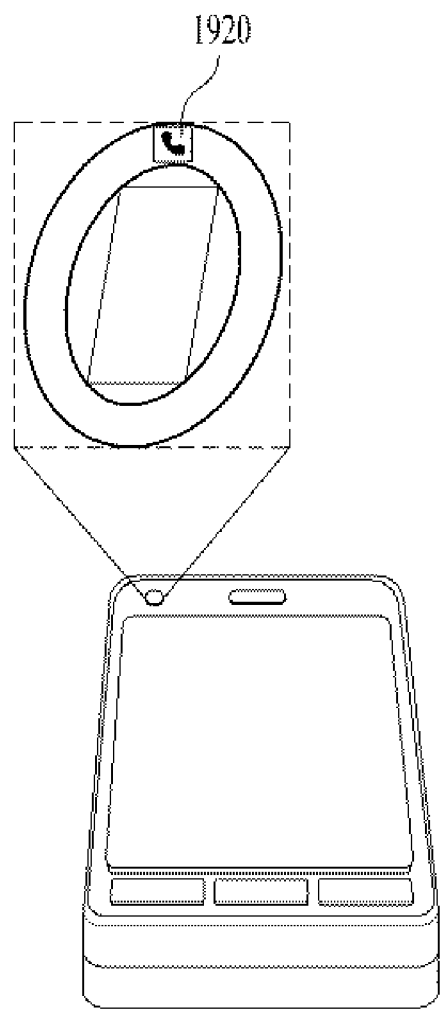

FIG. 19A and FIG. 19B are diagrams for one example of displaying a received notification signal type information via a notification holography image according to one embodiment of the present invention.

Referring to FIG. 19A, if a call notification signal is received, a text 'incoming call' 1910 indicating a type of the received call notification signal may be outputted in a manner of being included in a band notification holography image.

Referring to FIG. 19B, an icon 1920 indicating a type of the received call notification signal may be outputted in a manner of being included in a band notification holography image.

Therefore, a user may be able to easily recognize type information on the received notification signal through a text, icon, image and the like included in the notification holography image.

And, a received notification signal content information may be displayed through a notification holography image. In particular, it may be able to output a notification holography image including at least one partial information required to obtain a content of a received notification signal. Moreover, type information on a received notification signal and content information on the received notification signal may be displayed together through a notification holography image.

In doing so, the outputted notification holography image may experience such an effect as moving or flickering in accordance with time. Moreover, if a time designated by a user expires, the outputted notification holography image may disappear automatically.

This is described with reference to FIGS. 20A to 20D as follows.

FIG. 20 is a diagram for one example of displaying a received notification signal content information via a notification holography image according to one embodiment of the present invention.

Figure 20A:
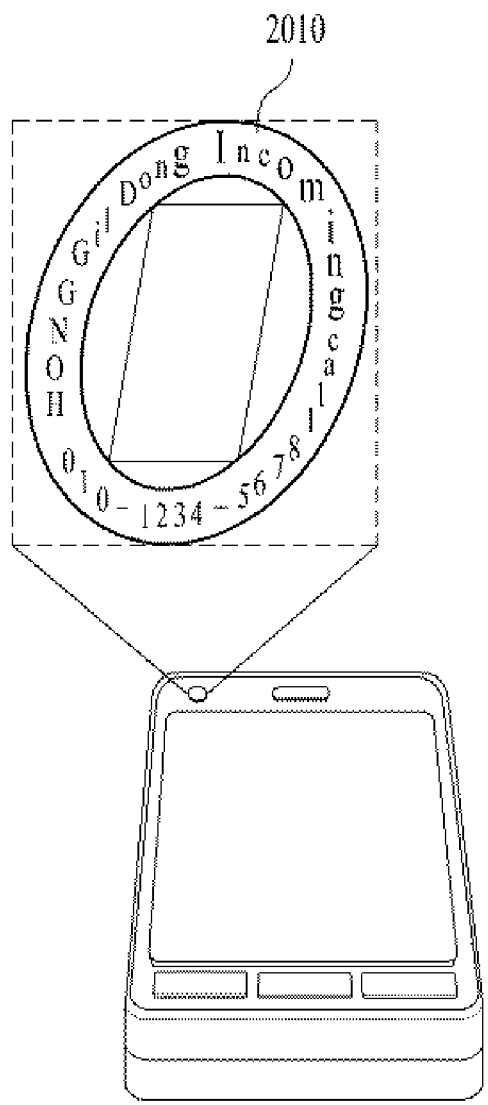
FIG. 20 is a diagram for one example of displaying a received notification signal content information via a notification holography image according to one embodiment of the present invention.

Referring to FIG. 20A, if a call notification signal is received, a text 'HONG Gil Dong 010-1234-5678' 2010, which is content information of the received call notification signal, may be outputted in a manner of being included in a band notification holography image. Through the outputted band notification holography image, a user may be able to check the content information of the received call notification signal easily and conveniently.

Figure 20B:
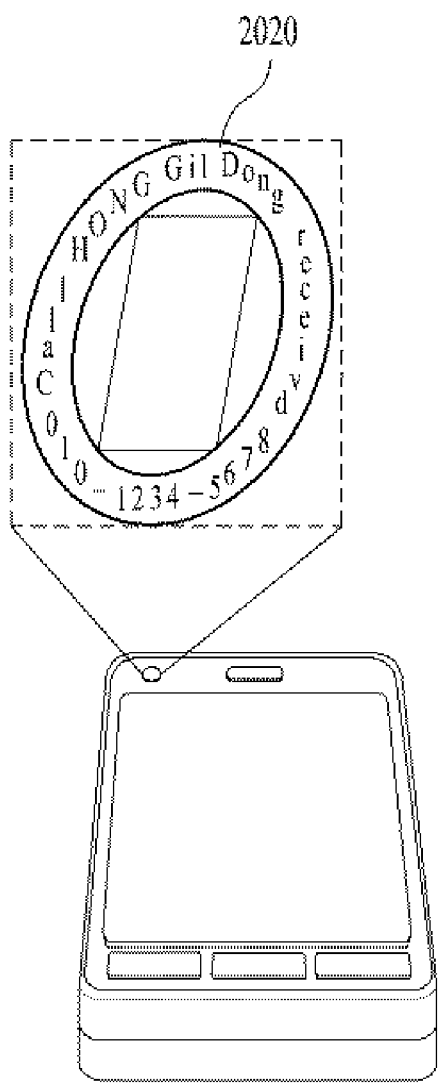
Figure 20C:
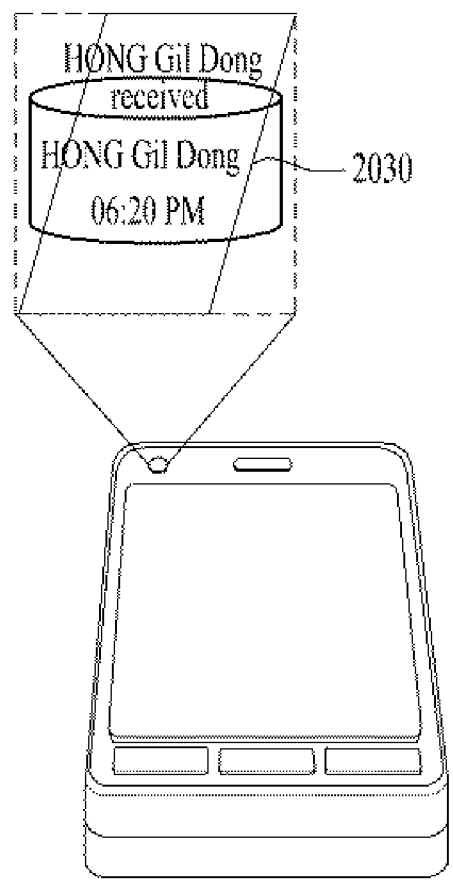
Figure 20D:
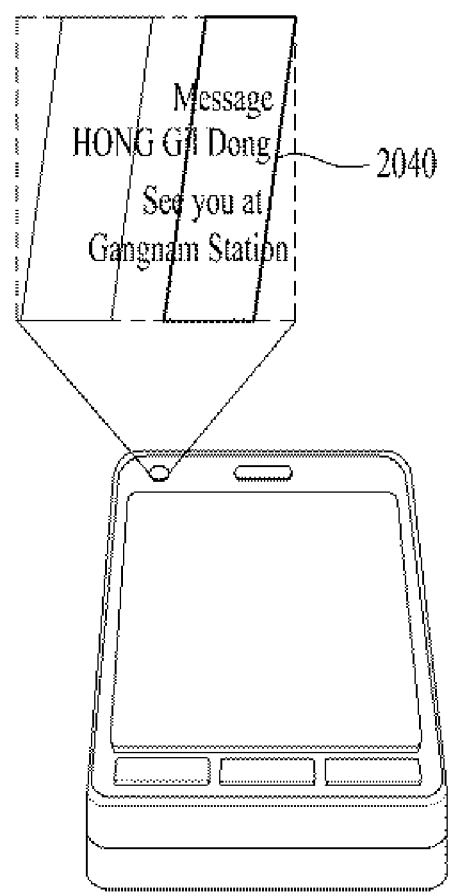

FIGS. 20B to 20D show that type information on a received notification signal and content information on the received notification signal may be displayed together through a notification holography image.

Referring to FIG. 20B, if a call notification signal is received, a text 'incoming call' indicating a type of the received call notification signal and a text 'HONG Gil Dong 010-1234-5678', which is content information of the received call notification signal, are outputted together as a band notification holography image 2020.

Referring to FIG. 20C, if a message notification signal is received, a text 'received message' indicating a type of the received message notification signal and a text 'HONG Gil Dong 06:20 PM', which is content information of the received call notification signal, are outputted together as a transparent layer notification holography image 2030.

Referring to FIG. 20D, if a message notification signal is received, a text 'received message' indicating a type of the received message notification signal and a text 'HONG Gil Dong, See you at Gangnam Station', which is content information of the received message notification signal, are outputted together as a partitioned region notification holography image 2040.

Meanwhile, it may be able to provide a method of identifying a received notification signal type information by changing color, style, type, thickness, size, transparent and/ or the like of an outputted notification holography image, First of all, when a plurality of notification holography images are displayed, they may be displayed in a manner of corresponding to their notification signals, respectively.

This is described with reference to FIG. 21 as follows.

FIG. 21 is a diagram for one example of displaying a received notification signal type information via a notification holography image according to one embodiment of the present invention.

In FIG. 21, assume that a call notification signal corresponds to a band notification holography image, that a message notification signal corresponds to a transparent layer notification holography image, and that an alarm notification signal corresponds to a partitioned region notification holography image.

Figure 21A:
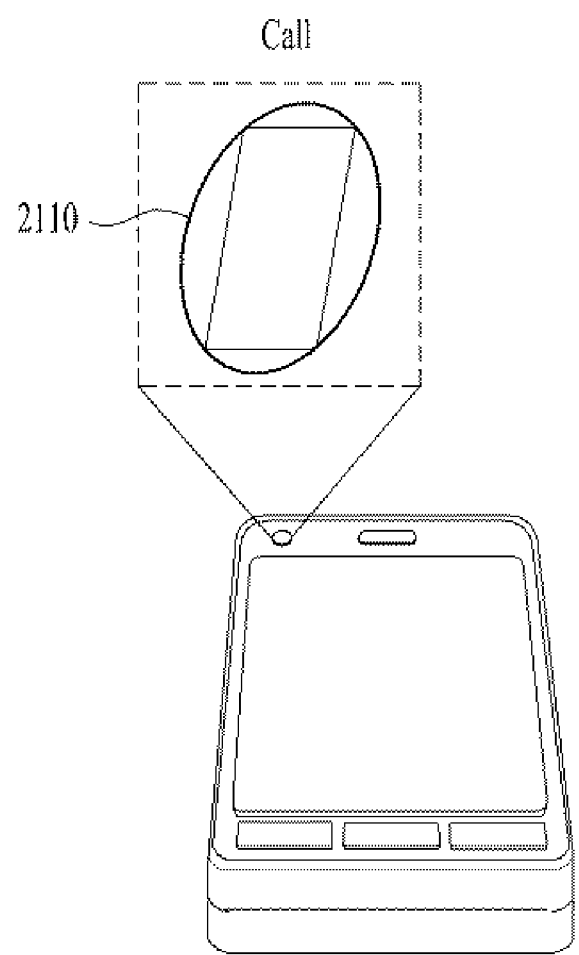
FIG. 21 is a diagram for one example of displaying a received notification signal type information via a notification holography image according to one embodiment of the present invention.

Referring to FIG. 21A, if a call notification signal is received, a band notification holography image 2110 is outputted. Hence, a user may be able to easily recognize that the call notification signal is received through the outputted band notification holography image 2110.

Figure 21B:
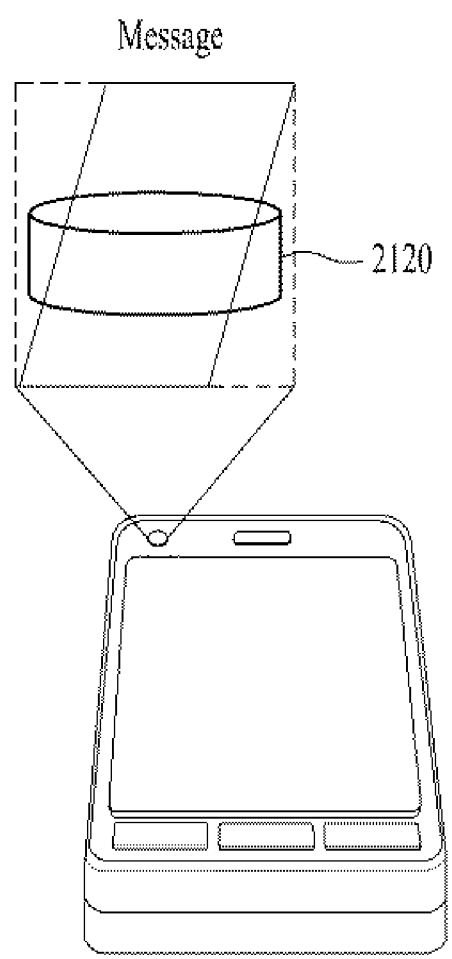

Referring to FIG. 21B, if a message notification signal is received, a transparent layer notification holography image 2120 is outputted. Hence, a user may be able to easily recognize that the message notification signal is received through the outputted transparent layer notification holography image 2120.

Figure 21C:
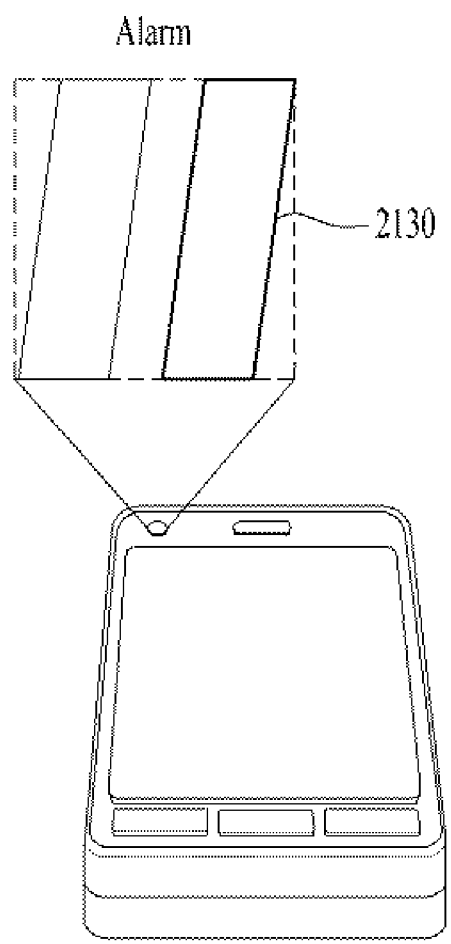

Referring to FIG. 21C, if an alarm notification signal is received, a partitioned region notification holography image 2130 is outputted. Hence, a user may be able to easily recognize that the alarm notification signal is received through the outputted partitioned region notification holography image 2130.

Meanwhile, it may be able to provide a method of identifying a received notification signal type information in a manner of changing a color of the same notification holography image.

For instance, a red band notification holography image may be designated to correspond to a call notification signal, an orange band notification holography image may be designated to correspond to a message notification signal, a yellow band notification holography image may be designated to correspond to an email notification signal, a green band notification holography image may be designated to correspond to an alarm notification signal, a blue band notification holography image may be designated to correspond to a calendar notification signal, and an indigo band notification holography image may be designated to correspond to a battery notification signal.

And, it may be able to provide a method of identifying a received notification signal type information in a manner of changing an outputted color of a transparent layer notification holography image or a partitioned region notification holography image.

Moreover, it may be able to provide a method of identifying a received notification signal type information in a manner of changing a type of the same notification holography image.

In particular, it may be able to identify a received notification signal type information in a manner of implementing a notification holography image of a type changed using a straight line, a curved line, a dotted line and the like.

This is described with reference to FIGS. 22A to 22F as follows.

FIGS. 22A to 22F are diagrams for examples of displaying a received notification signal type information via a type change of a notification holography image according to one embodiment of the present invention.

First of all, FIGS. 22A to 22D show examples of various types of a band notification holography image, respectively. Despite the same band notification holography image, a 1st type band notification holography image 2210 shown in FIG. 22A indicates that a call notification signal is received, a 2nd type band notification holography image 2220 shown in FIG. 22B indicates that a message notification signal is received, a 3rd type band notification holography image 2230 shown in FIG. 22C indicates that an email notification signal is received, and a 4th type band notification holography image 2240 shown in FIG. 22D indicates that an alarm notification signal is received.

Figure 22A:
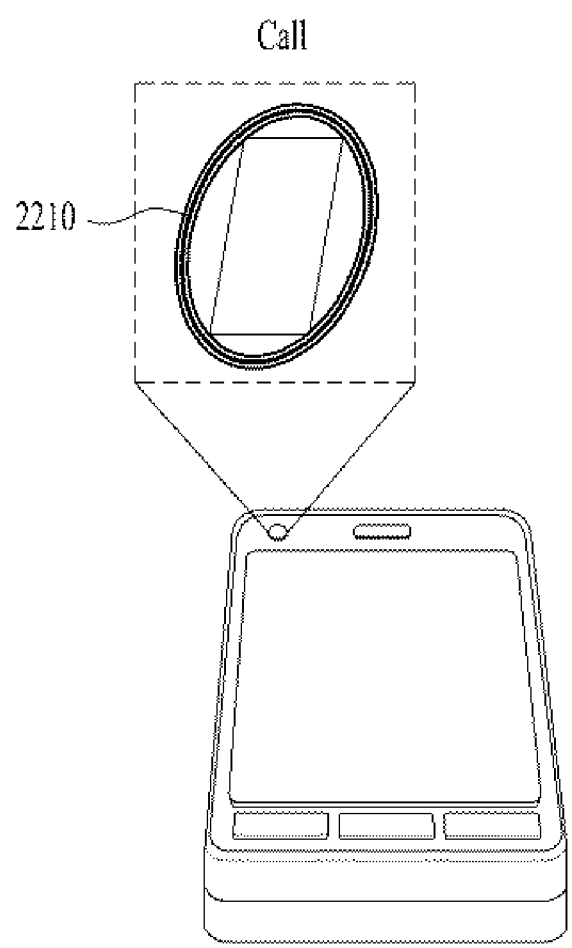
FIG. 22 is a diagram for one example of displaying a received notification signal type information via a type change of a notification holography image according to one embodiment of the present invention.
Figure 22B:
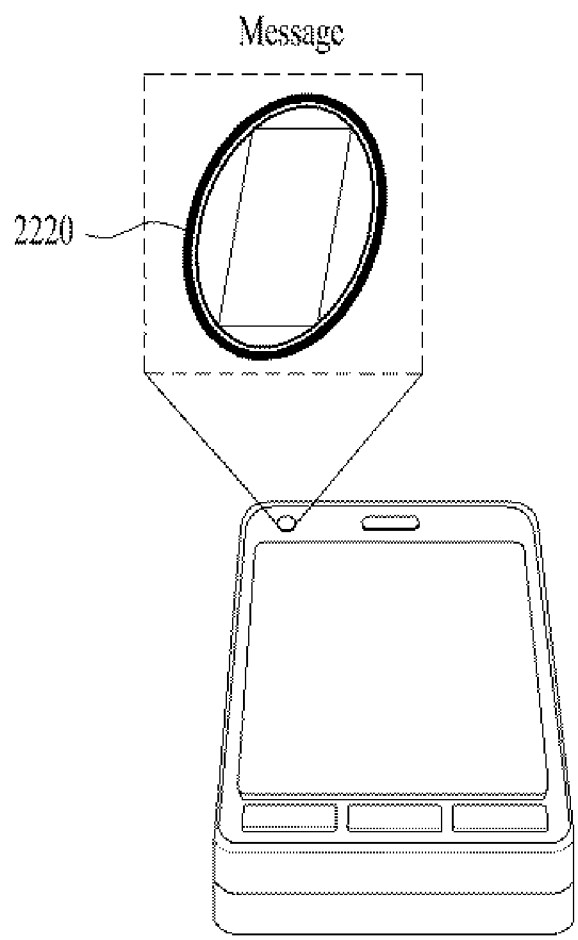
Figure 22C:
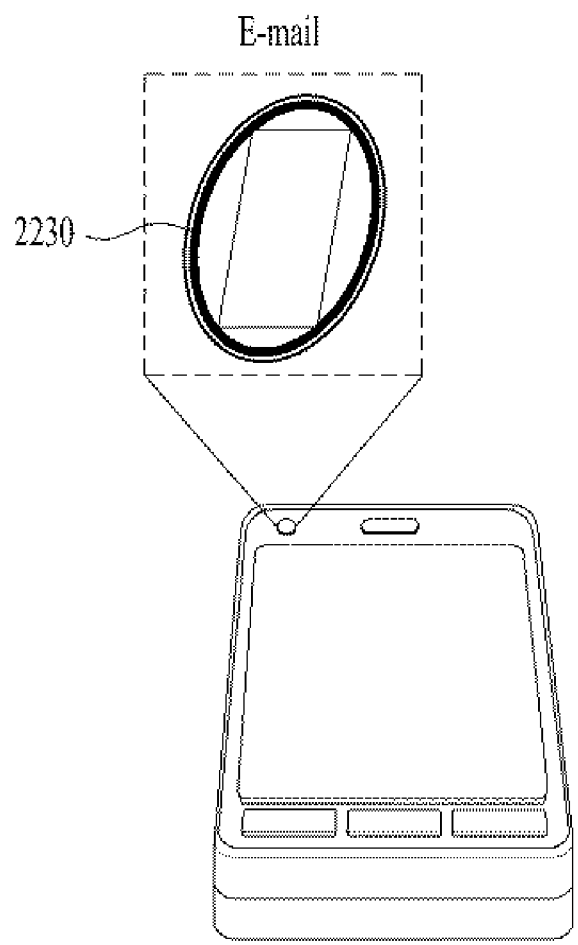
Figure 22D:
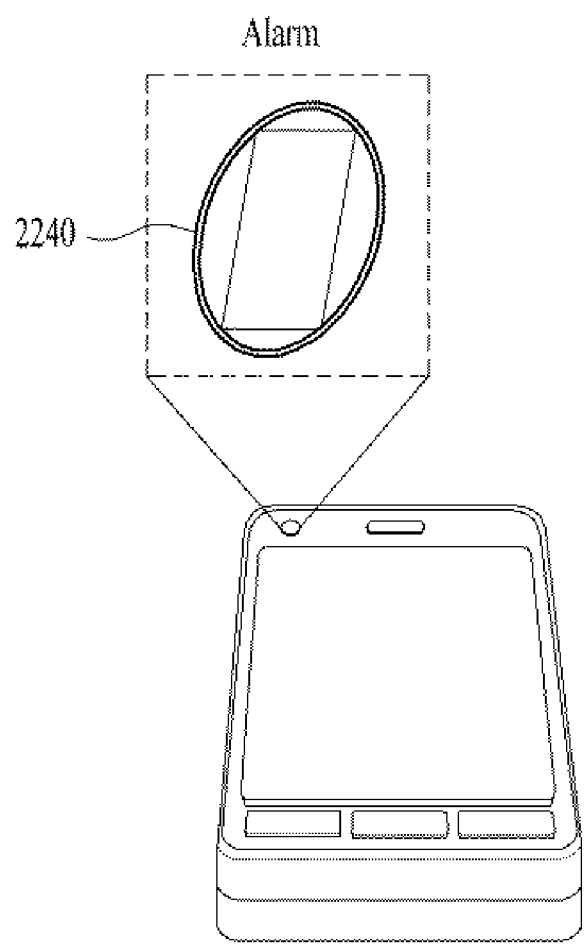
Figure 22E:
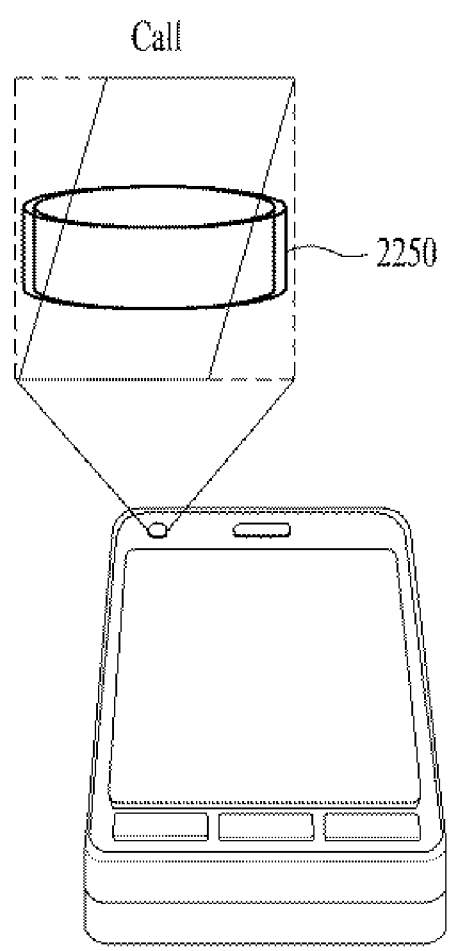

Referring to FIG. 22E, a 1st type transparent layer notification holography image 2240 indicates that a call notification signal is received.

Figure 22F:
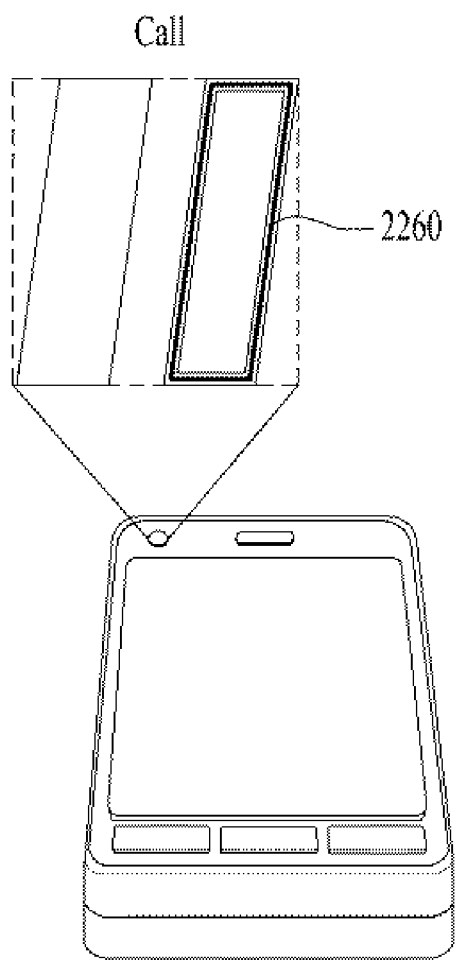

Referring to FIG. 22F, a 1st type partitioned region notification holography image 2250 indicates that a call notification signal is received.

Meanwhile, it may be able to provide a method of identifying a received notification signal type information in a manner of changing a style of the same notification holography image. In particular, a received notification signal type information may be identified in a manner of changing a line (e.g., doted line, straight line, curved line, etc.) that represents each notification holography image.

This is described with reference to FIGS. 23A to 23E as follows.

FIGS. 23A to 23E are diagrams for examples of displaying a received notification signal type information via a style change of a notification holography image according to one embodiment of the present invention.

Figure 23A:
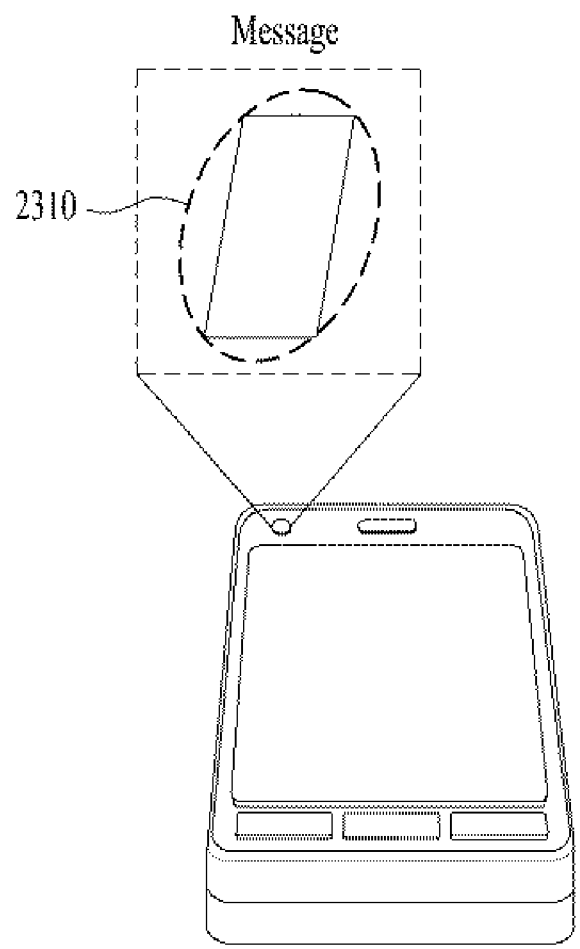
FIG. 23 is a diagram for one example of displaying a received notification signal type information via a style change of a notification holography image according to one embodiment of the present invention.
Figure 23B:
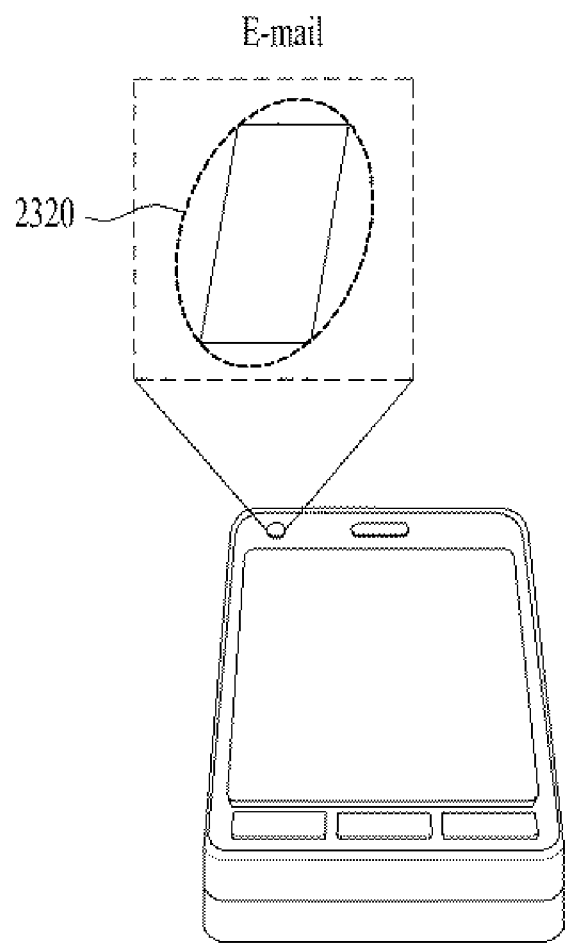
Figure 23C:
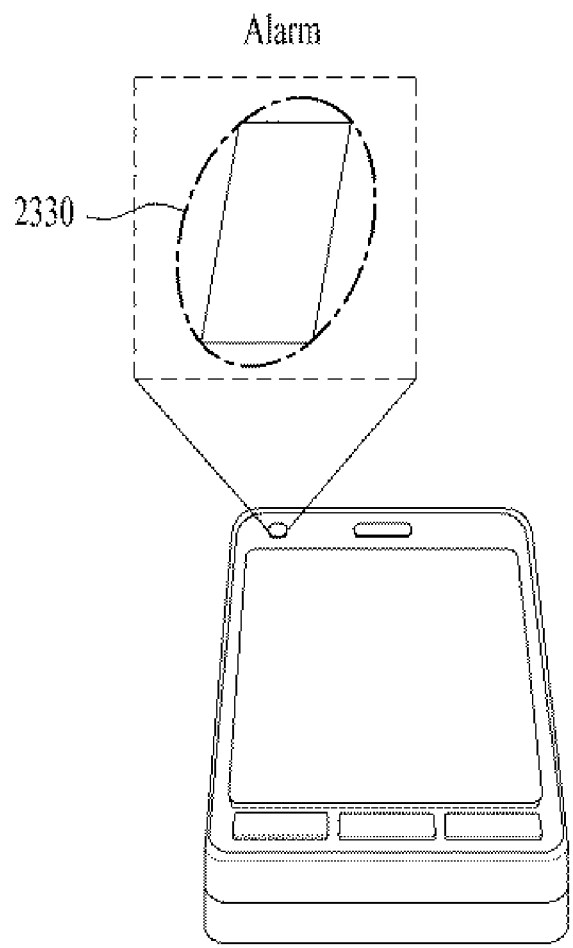

First of all, FIGS. 23A to 23C show examples of various styles of a band notification holography image, respectively. Despite the same band notification holography image, a 1st style band notification holography image 2310 shown in FIG. 23A indicates that a message notification signal is received, a 2nd style band notification holography image 2320 shown in FIG. 23B indicates that an email notification signal is received, and a 3rd style band notification holography image 2330 shown in FIG. 23C indicates that an alarm notification signal is received.

Figure 23D:
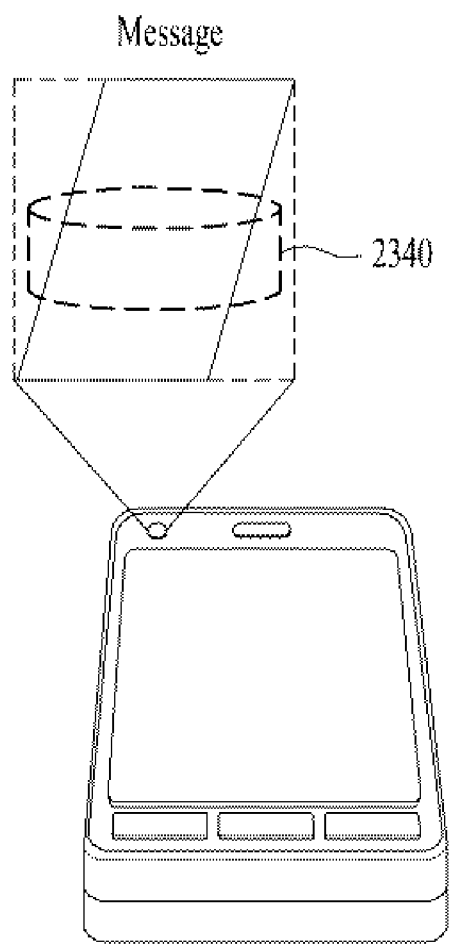

Referring to FIG. 23D, a 1st style transparent layer notification holography image 2340 indicates that a message notification signal is received.

Figure 23E:
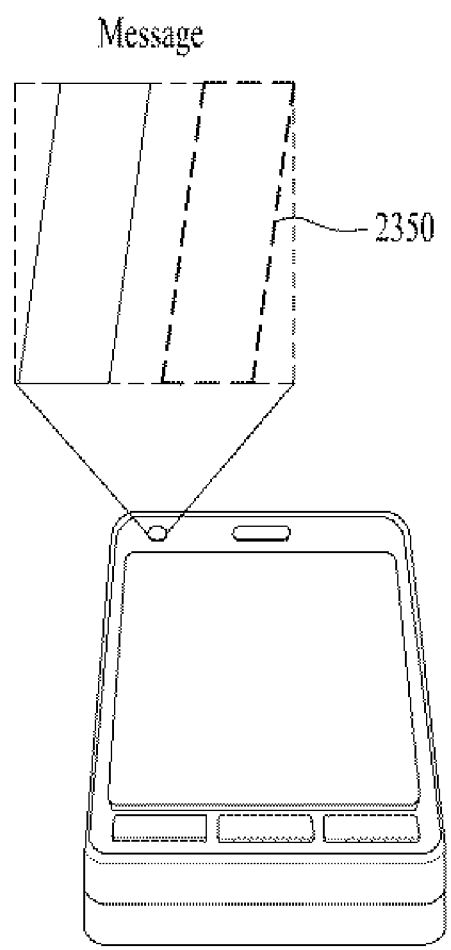

Referring to FIG. 23E, a 1st style partitioned region notification holography image 2350 indicates that a message notification signal is received.

Meanwhile, it may be able to provide a method of identifying a received notification signal type information in a manner of changing a thickness of the same notification holography image.

This is described with reference to FIGS. 24A to 24F as follows.

FIGS. 24A to 24F are diagrams for examples of displaying a received notification signal type information via a thickness change of a notification holography image according to one embodiment of the present invention.

Figure 24A:
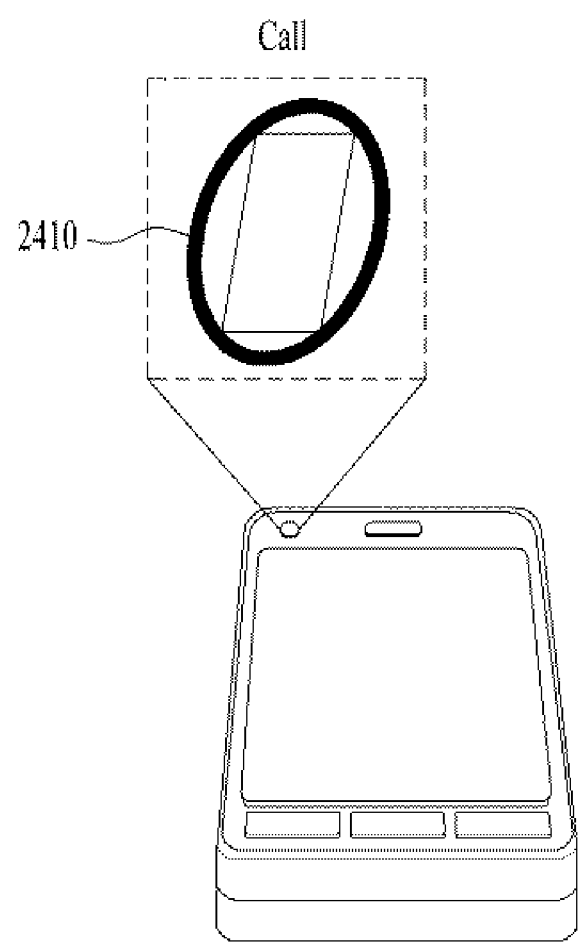
FIG. 24 is a diagram for one example of displaying a received notification signal type information via a thickness change of a notification holography image according to one embodiment of the present invention.
Figure 24B:
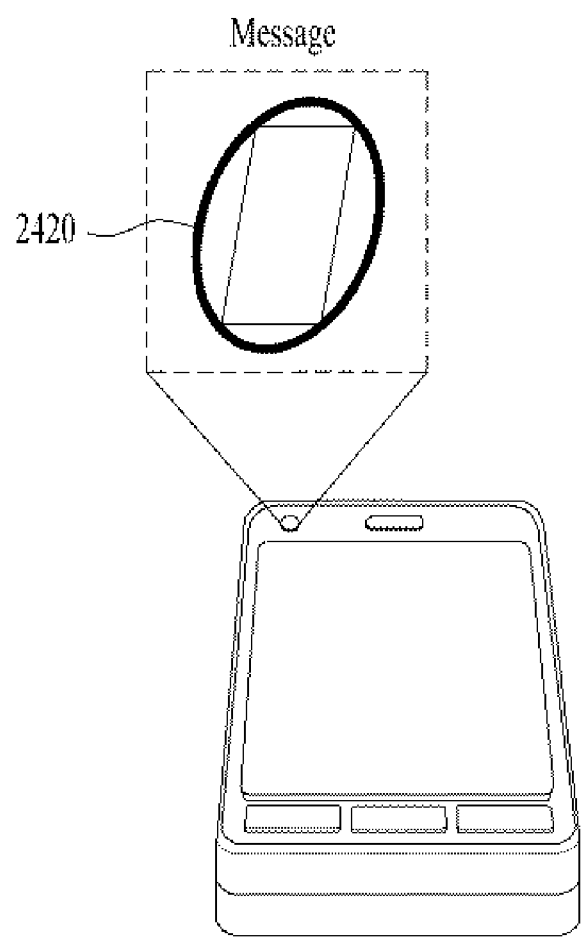

First of all, FIG. 24A and FIG. 24B show examples of various thickness of a band notification holography image, respectively. Despite the same band notification holography image, a 1st thickness band notification holography image 2410 shown in FIG. 24A indicates that a call notification signal is received and a 2nd thickness band notification holography image 2420 shown in FIG. 24B indicates that a message notification signal is received.

Figure 24C:
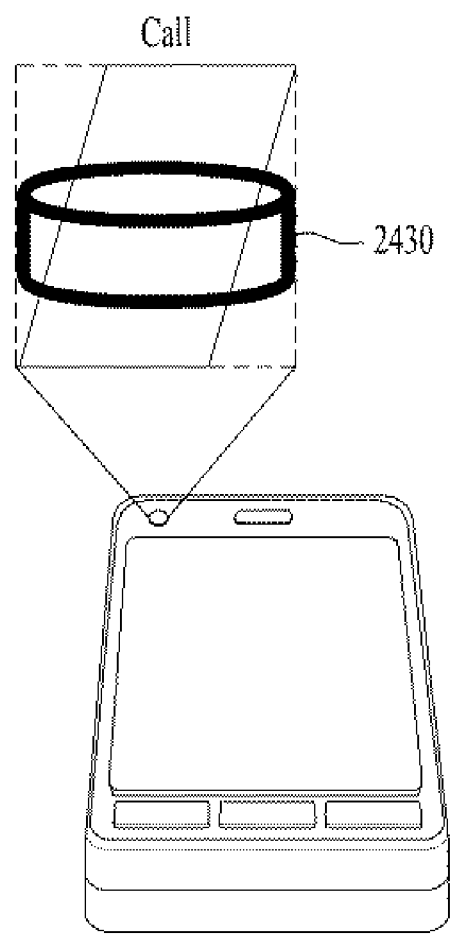
Figure 24D:
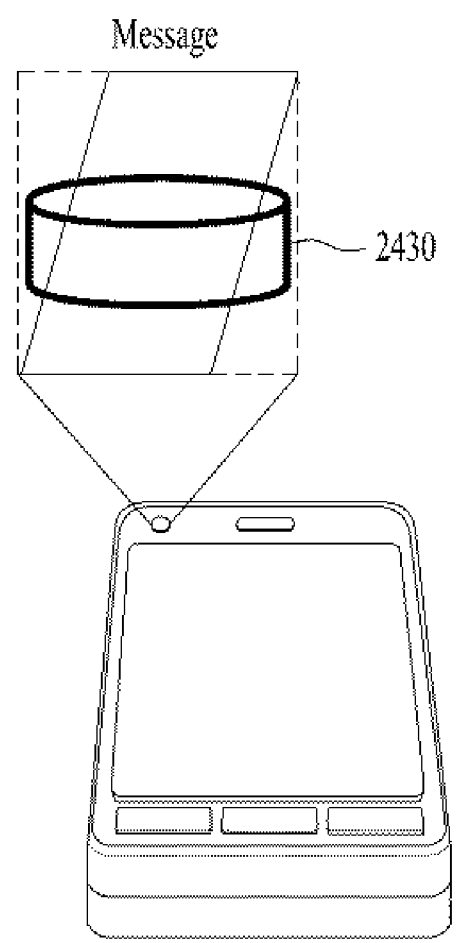

Secondly, FIG. 24C and FIG. 24D show examples of various thickness of a transparent layer notification holography image, respectively. Despite the same transparent layer notification holography image, a 1st thickness transparent layer notification holography image 2430 shown in FIG. 24C indicates that a call notification signal is received and a 2nd thickness transparent layer notification holography image 2440 shown in FIG. 24D indicates that a message notification signal is received.

Figure 24E:
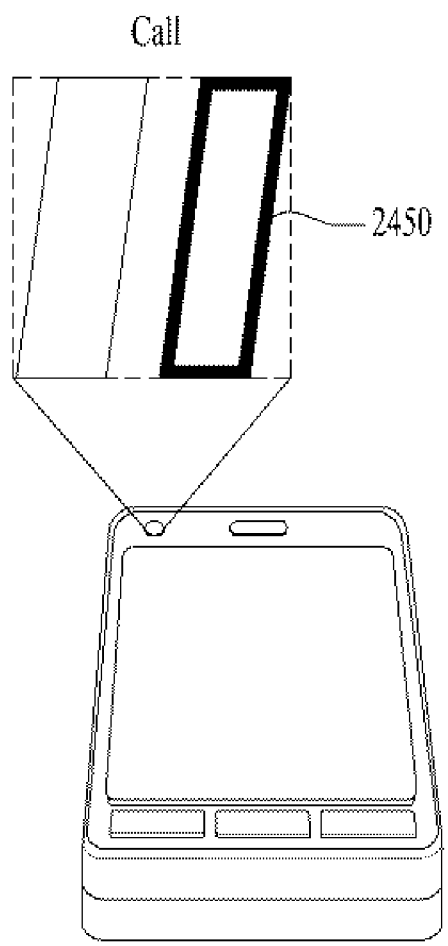
Figure 24F:
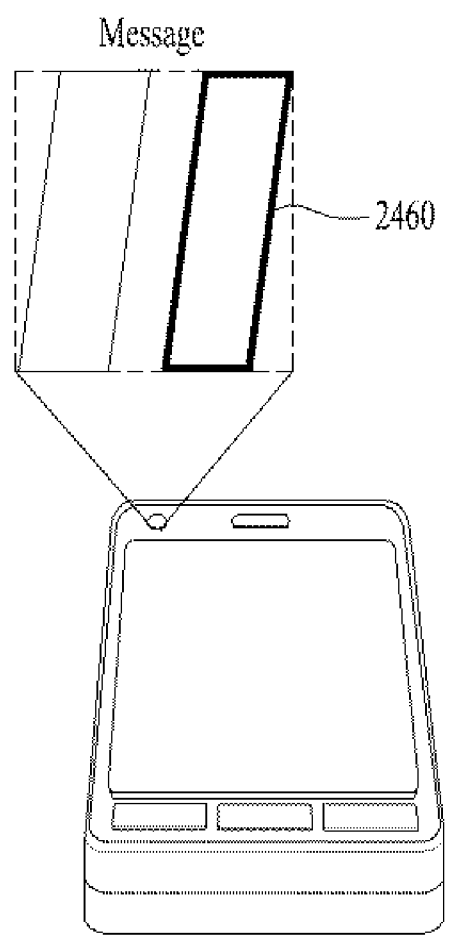

Thirdly, FIG. 24E and FIG. 24F show examples of various thickness of a partitioned region notification holography image, respectively. Despite the same partitioned region notification holography image, a 1st thickness partitioned region notification holography image 2450 shown in FIG. 24E indicates that a call notification signal is received and a 2nd thickness partitioned region notification holography image 2460 shown in FIG. 24F indicates that a message notification signal is received.

Meanwhile, it may be able to provide a method of identifying a received notification signal type information in a manner of changing the number of displayed notification holography image(s).

This is described with reference to FIGS. 25A to 25F as follows.

FIGS. 25A to 25F are diagrams for examples of displaying a received notification signal type information via a number change of notification holography image(s) according to one embodiment of the present invention.

Figure 25A:
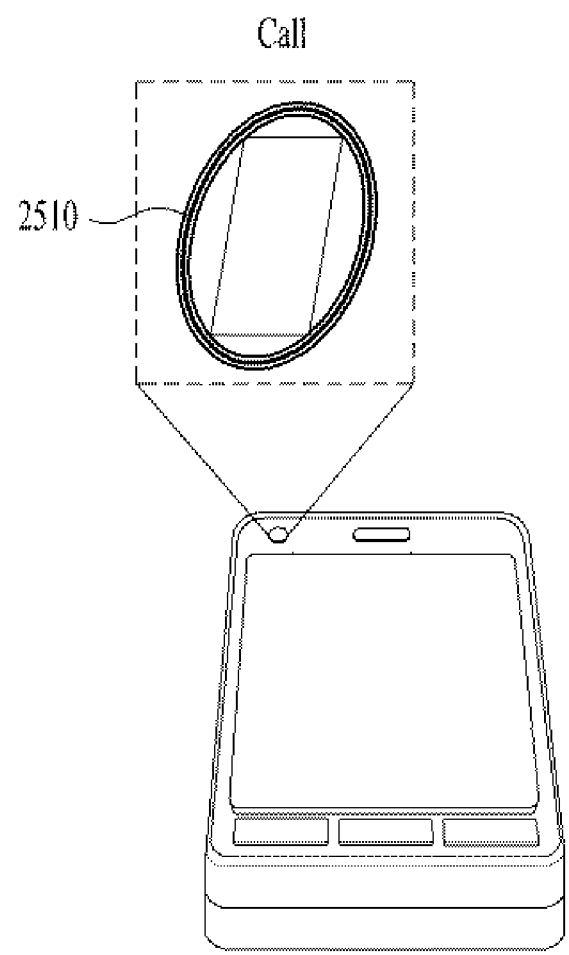
FIG. 25 is a diagram for one example of displaying a received notification signal type information via a number change of notification holography image(s) according to one embodiment of the present invention.
Figure 25B:
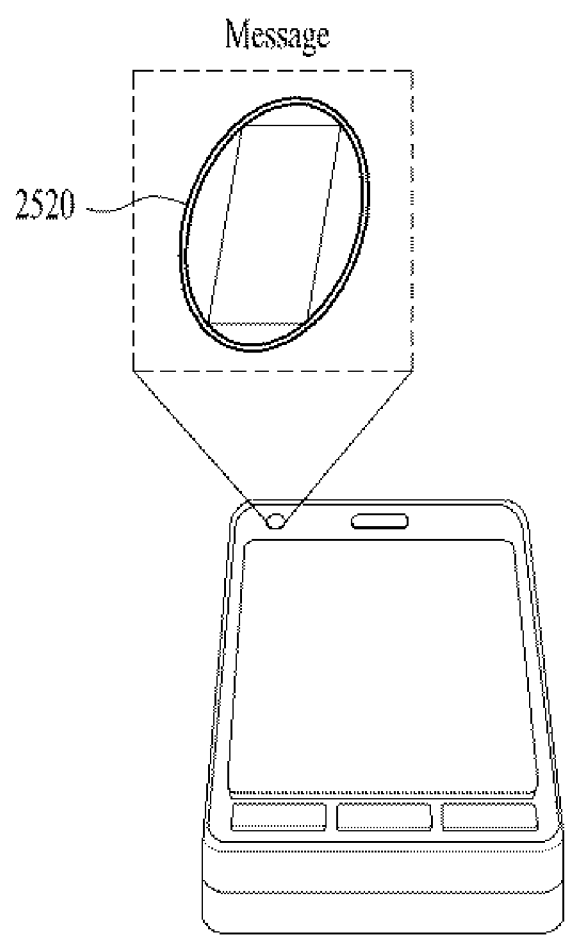
Figure 25C:
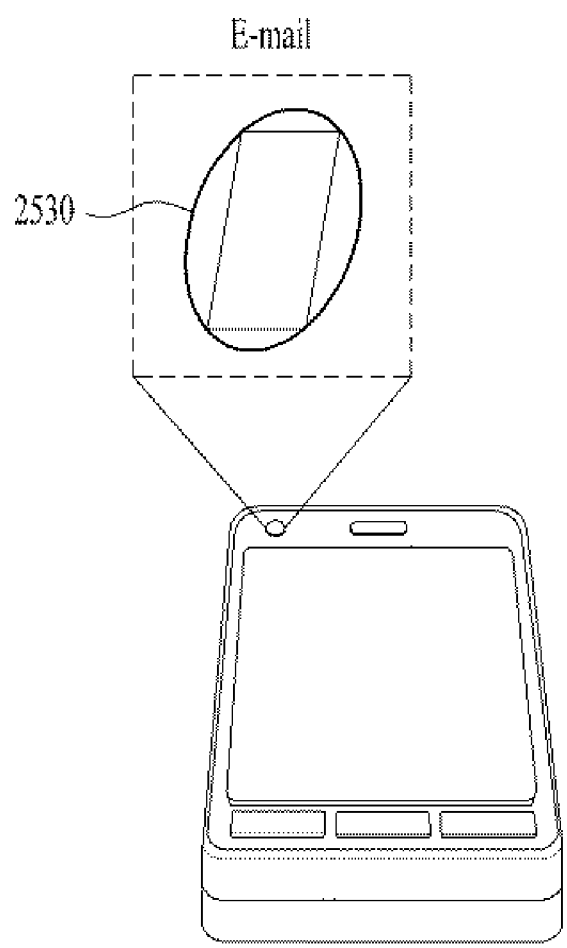

First of all, FIGS. 25A to 25C show examples of identifying a received notification signal in accordance with the number of band notification holography image(s), respectively. Despite the same band notification holography image, 3-band notification holography image 2510 shown in FIG. 25A indicates that a call notification signal is received, 2-band notification holography image 2520 shown in FIG. 25B indicates that a message notification signal is received, and 1-band notification holography image 2530 shown in FIG. 25C indicates that an email notification signal is received.

Figure 25D:
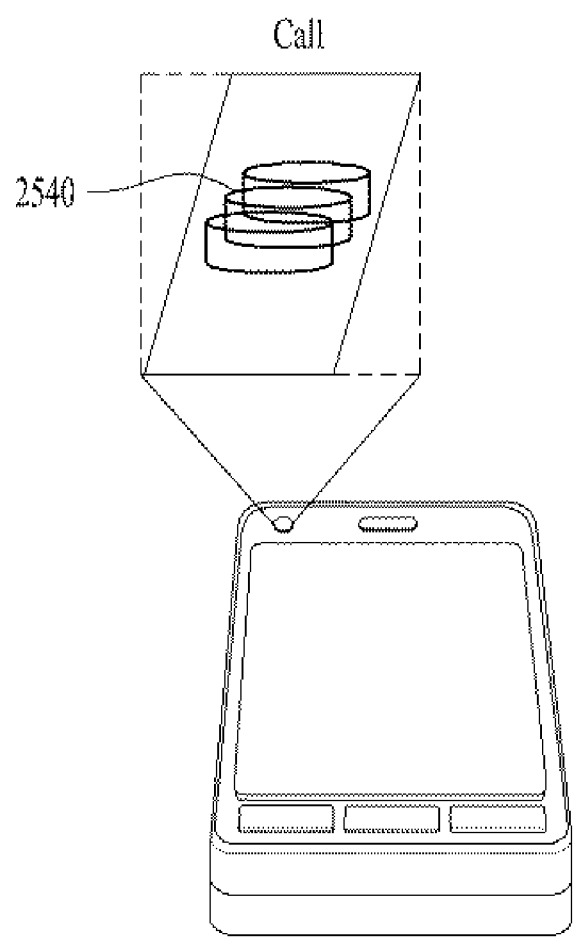
Figure 25E:
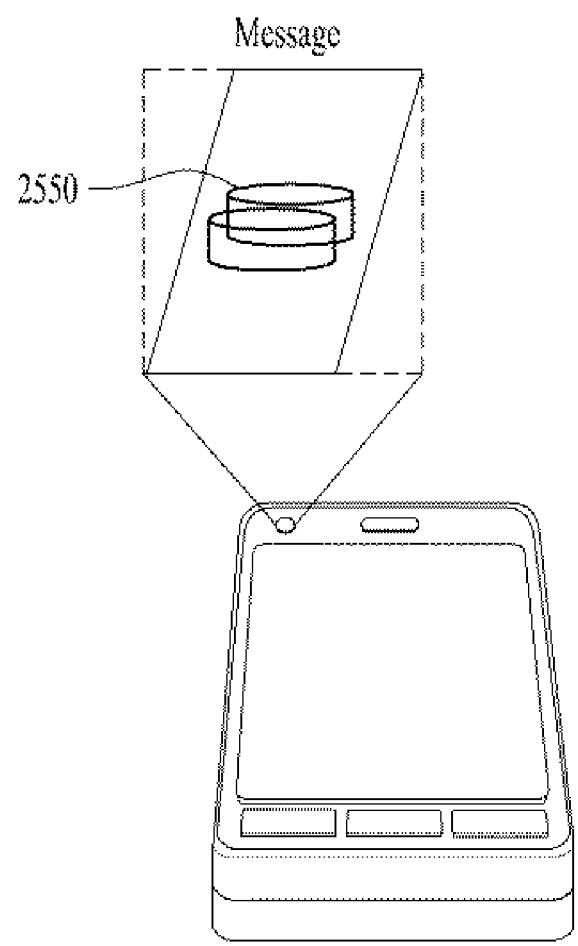
Figure 25F:
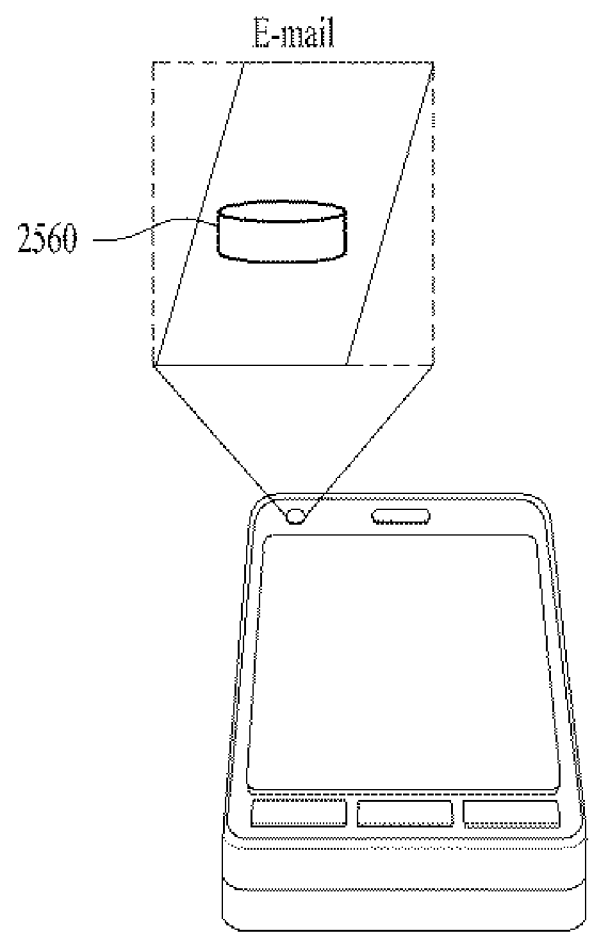

Secondly, FIGS. 25D to 25F show examples of identifying a received notification signal in accordance with the number of transparent layer notification holography image(s), respectively. Despite the same transparent layer notification holography image, 3-transparent layer notification holography image 2540 shown in FIG. 25D indicates that a call notification signal is received, 2-transparent layer notification holography image 2550 shown in FIG. 25E indicates that a message notification signal is received, and 1-transparent layer notification holography image 2560 shown in FIG. 25F indicates that an email notification signal is received.

Meanwhile, it may be able to provide a method of identifying a received notification signal type information in a manner of changing a size of a displayed notification holography image.

This is described with reference to FIGS. 26A to 26C as follows.

Figure 26A:
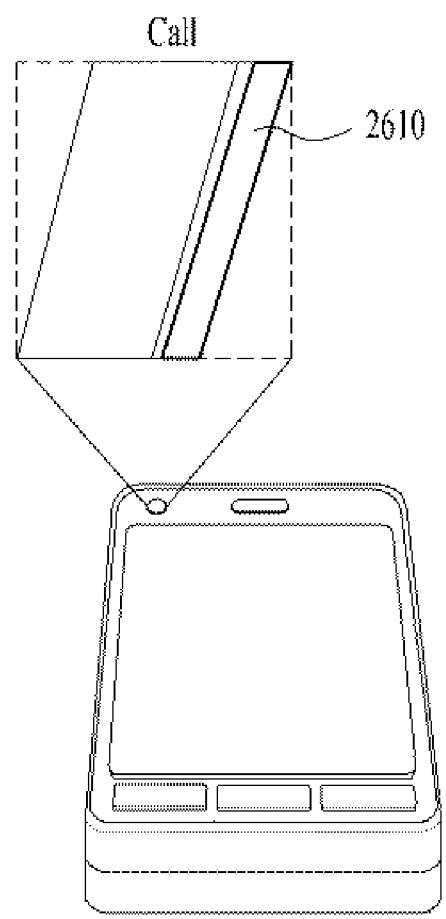
FIG. 26 is a diagram for one example of displaying a received notification signal type information via a size change of a notification holography image according to one embodiment of the present invention.
Figure 26B:
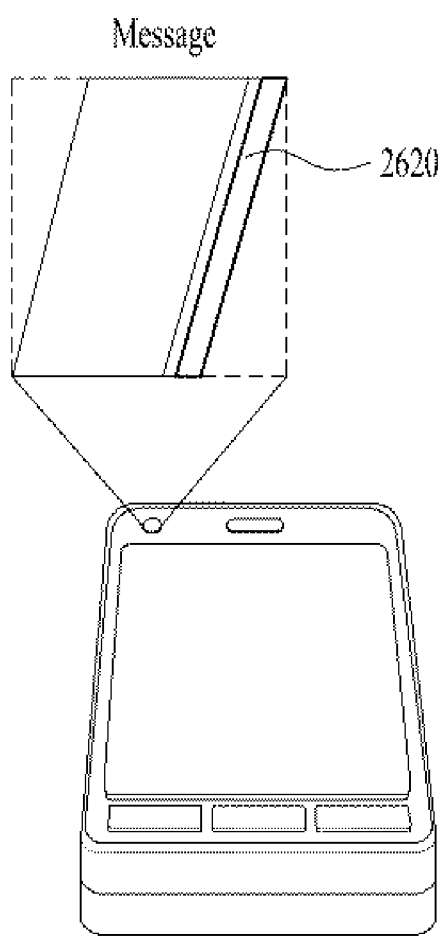
Figure 26C:
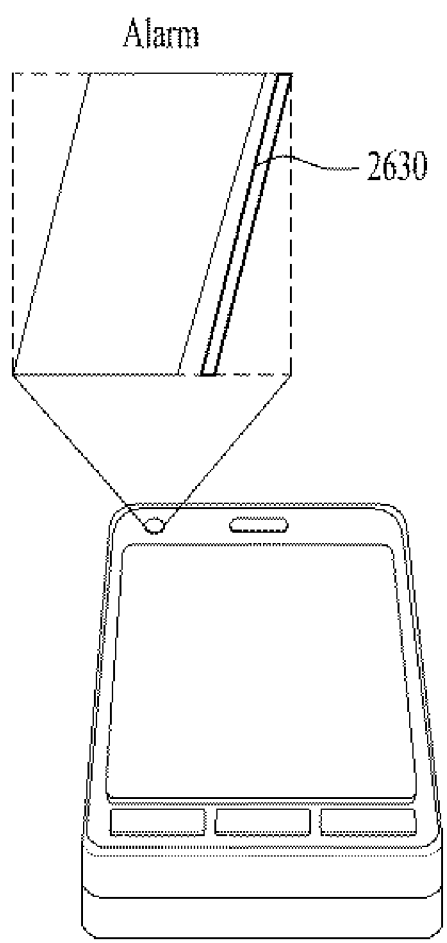

FIGS. 26A to 26C are diagrams for examples of displaying a received notification signal type information via a size change of a partitioned region notification holography image according to one embodiment of the present invention.

Referring to FIGS. 26A to 26C, despite the same partitioned region notification holography image, a 1st size partitioned region notification holography image 2610 shown in FIG. 26A indicates that a call notification signal is received, a 2nd size partitioned region notification holography image 2620 shown in FIG. 26B indicates that a message notification signal is received, and a 3rd size partitioned region notification holography image 2630 shown in FIG. 26C indicates that an email notification signal is received.

Although the partitioned region notification holography images are taken as examples for the description with reference to FIGS. 26A to 26C, it is apparent that the above descriptions may apply to notification holography images of other types.

Meanwhile, it may be able to provide a method of identifying a received notification signal type information in a manner of changing transparency of a displayed notification holography image.

This is described with reference to FIGS. 27A to 27C as follows.

Figure 27A:
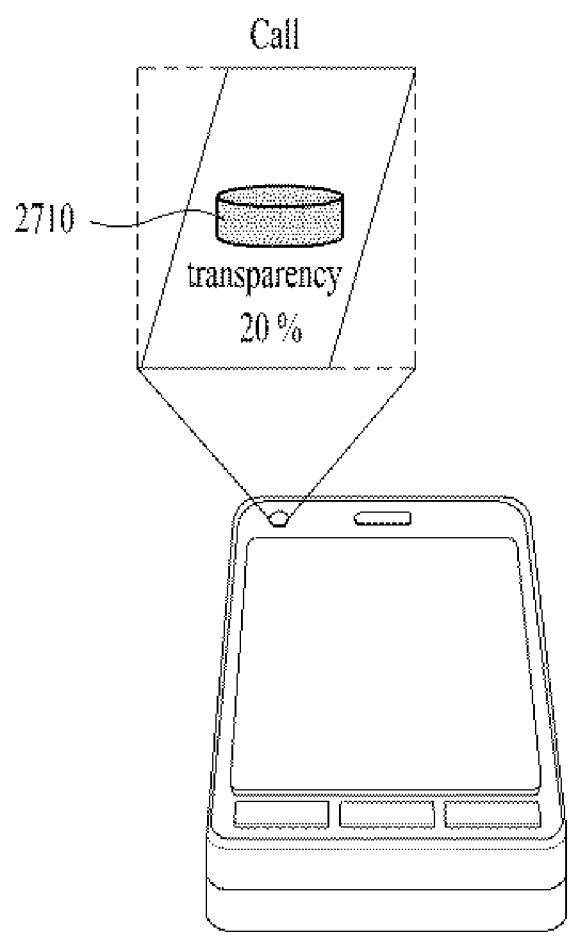
FIG. 27 is a diagram for one example of displaying a received notification signal type information via a transparency change of a notification holography image according to one embodiment of the present invention.
Figure 27B:
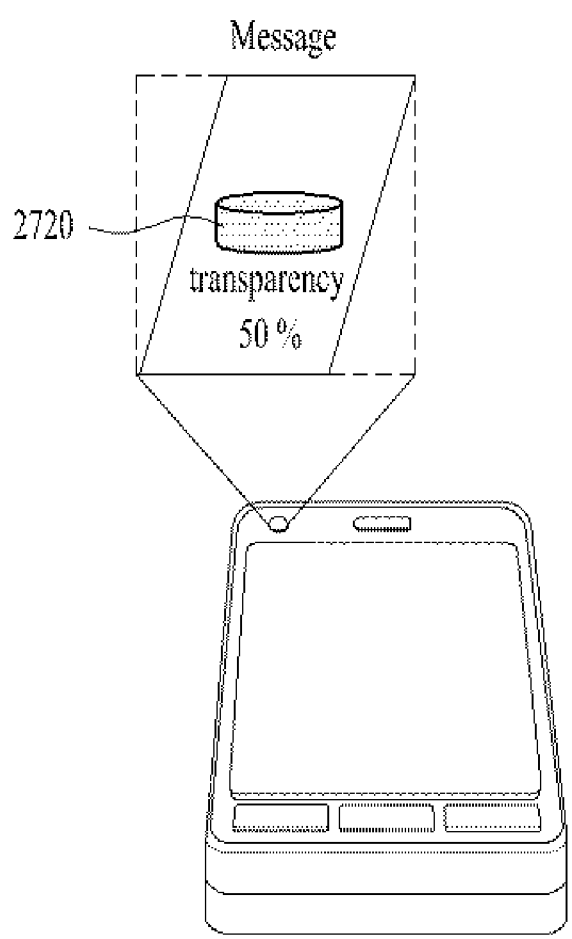
Figure 27C:
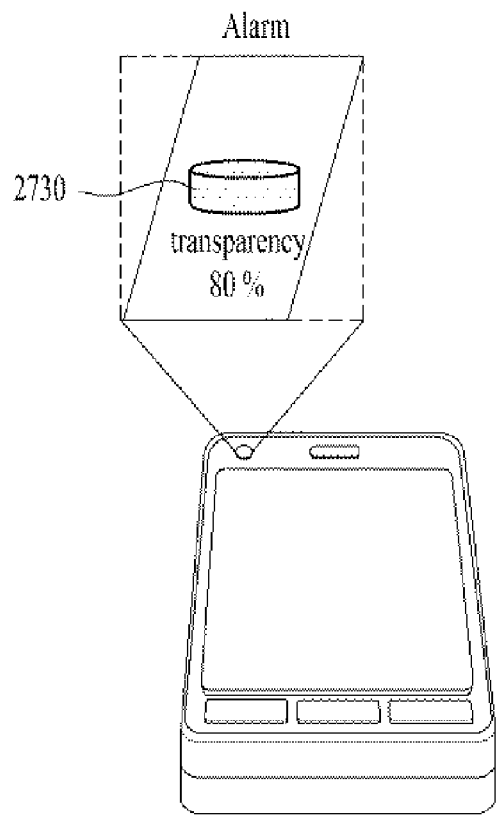

FIGS. 27A to 27C are diagrams for examples of displaying a received notification signal type information via a transparency change of a transparency layer notification holography image according to one embodiment of the present invention.

Referring to FIGS. 27A to 27C, despite the same transparent layer notification holography image, a 1st transparency transparent layer notification holography image 2710 shown in FIG. 27A indicates that a call notification signal is received, a 2nd transparency transparent layer notification holography image 2720 shown in FIG. 27B indicates that a message notification signal is received, and a 3rd transparency transparent layer notification holography image 2730 shown in FIG. 27C indicates that an alarm notification signal is received.

Although the transparent layer notification holography images are taken as examples for the description with reference to FIGS. 27A to 27C, it is apparent that the above descriptions may apply to notification holography images of other types.

Meanwhile, it may be able to provide more various kinds of informations in a manner of changing a displayed notification holography image in accordance with time.

In particular, by changing color, style, type, thickness, number, size, transparency and/or the like of a notification holography image, it may be able to display a re-notification count of a notification holography image, a presence or non-presence of attached file, a duration of a displayed notification holography image, a remaining battery level information and the like.

For instance, a re-notification count of a notification holography image may be represented by a change of notification holography image, a presence or non-presence of attached file may be represented by a size change of a notification holography image, a duration of a displayed notification holography image may be represented by a transparency change of a notification holography image, and a remaining battery level information of a terminal may be represented by a color change of a notification holography image.

This is described with reference to FIGS. 28A to 28D as follows.

FIGS. 28A to 28D are diagrams for examples of changing a displayed notification holography image in accordance with time according to one embodiment of the present invention.

In FIGS. 28A to 28D, assume that a remaining battery level of a terminal is represented via a change of size, number, thickness or transparency of notification holography image.

Figure 28A:
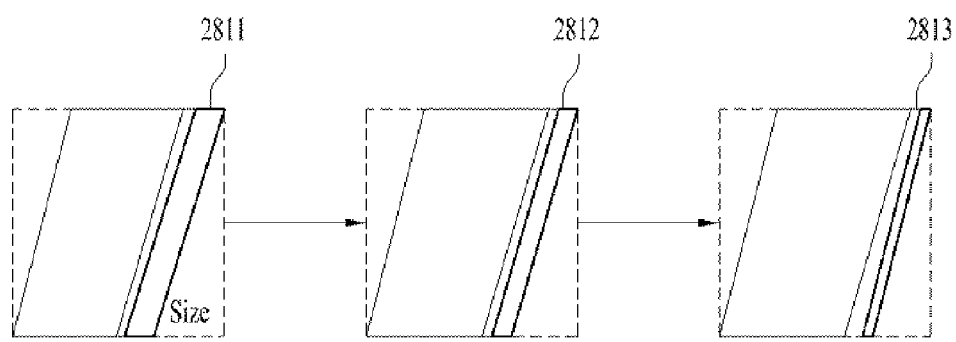
FIG. 28 is a diagram for one example of changing a displayed notification holography image in accordance with time according to one embodiment of the present invention.

Referring to FIG. 28A, a displayed partitioned region notification holography image has an effect of being reduced to a shape '2813' from a shape '2811' via a shape '2812'. Through this effect, a user may be able to easily recognize that a remaining battery level of a terminal is lowered.

Figure 28B:
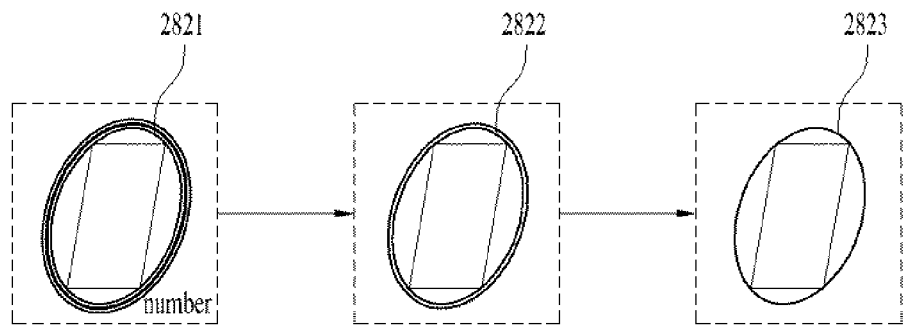

Referring to FIG. 28B, the number of band notification holography image has an effect of decreasing to 1 '2823' from 3 '2821' via 1 '2822'. Through this effect, a user may be able to easily recognize that a remaining battery level of a terminal is lowered.

Figure 28C:
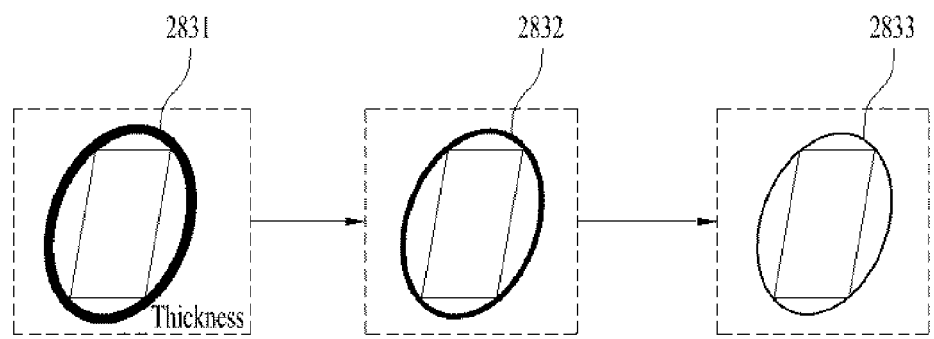

Referring to FIG. 28C, a thickness of a displayed band notification holography image has an effect of decreasing to a shape '2833' from a shape '2831' via a shape '2832'. Through this effect, a user may be able to easily recognize that a remaining battery level of a terminal is lowered.

Figure 28D:
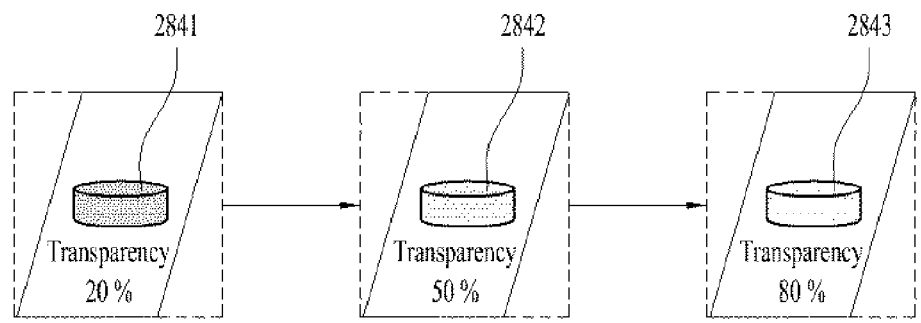

Referring to FIG. 28D, a transparency of a displayed transparent layer notification holography image has an effect of decreasing from a 1st transparency 2841 to a 3rd transparency 2843 via a end transparency 2841. Through this effect, a user may be able to easily recognize that a remaining battery level of a terminal is lowered.

Meanwhile, according to one embodiment of the present invention, in case that a terminal receives a plurality of notification signals, it may be able to provide a method of notifying the reception using a plurality of notification holography images.

Assuming that a band notification holography image is applied, if a plurality of notification signals are received, a method of displaying the reception is described with reference to FIGS. 29A to 29C as follows.

Figure 29A:
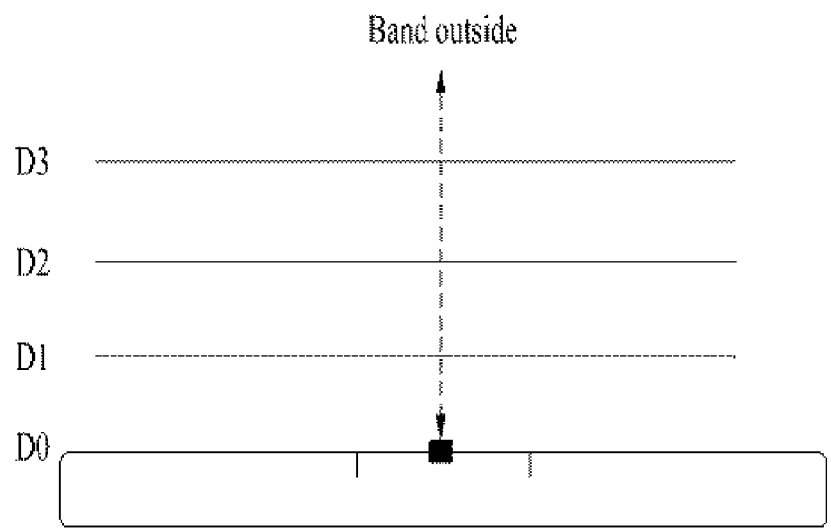
FIG. 29 is a diagram for one example of projecting a notification holography image in case of receiving a plurality of notification signals according to one embodiment of the present invention.
Figure 29B:
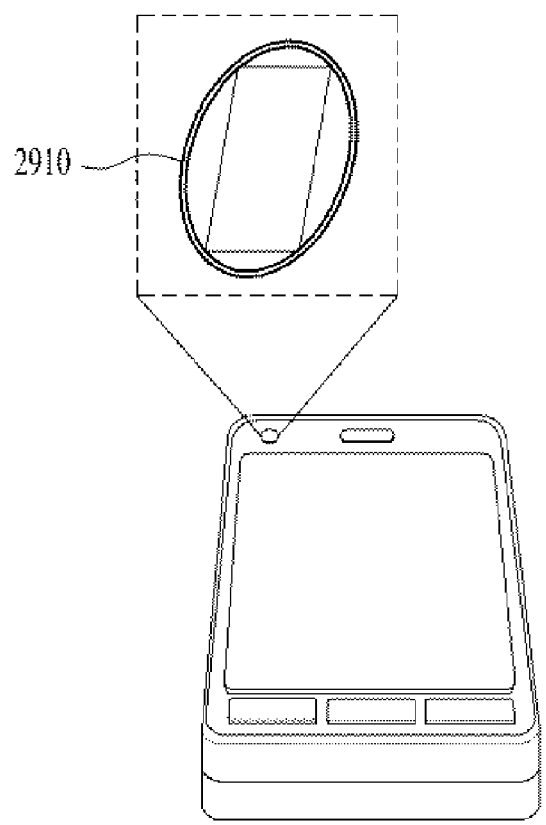
Figure 29C:
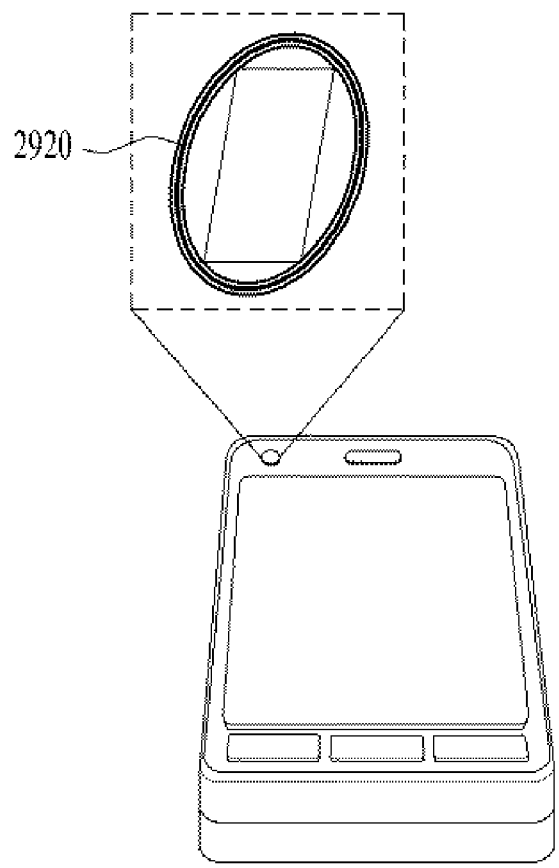

FIGS. 29A to 29C are diagrams for examples of projecting a band notification holography image in case of receiving a plurality of notification signals according to one embodiment of the present invention.

Referring to FIGS. 29A to 29C, the controller 180 sorts a plurality of received notification signals by a prescribed reference and may control a holography module to output a plurality of band notification holography images corresponding to a plurality of the sorted notification signals, respectively.

In doing so, the prescribed reference for the sorting may include one of a category reference, a priority reference, a user setting reference and the like.

First of all, the category reference is to sort a call notification signal, a message notification signal, an email notification signal and the like by category.

Secondly, the priority reference is to sort notification signals by priority designated by a user. For instance, an emergency message may have a priority higher than that of a normal message and a priority may vary in accordance with frequency or the like.

Thirdly, the user setting reference is to enable a user to directly set an order for each received notification signal.

In accordance with the above-mentioned prescribed reference, the controller 180 may control a band notification holography image to be outputted to correspond to each height shown in FIG. 29A. If a holography image is outputted by getting farther from a reference point D0, a band notification holography image is outputted by having a wider range. For instance, a band holography image at D1 has a size greater than that of a band holography image at D2. And, a band holography image at D3 is outputted in a manner having a size greater than that of the band holography image at D2.

After two notification signals have been received, if the received notification signals are sorted by priority reference, referring to FIG. 29B, two band notification holography images 2910 are outputted.

After three notification signals have been received, if the received notification signals are sorted by priority reference, referring to FIG. 29C, three band notification holography images 2920 are outputted.

Meanwhile, assuming that a transparent layer notification holography image is applied, if a plurality of notification signals are received, a method of displaying the reception is described with reference to FIGS. 30A to 30C as follows.

Figure 30A:
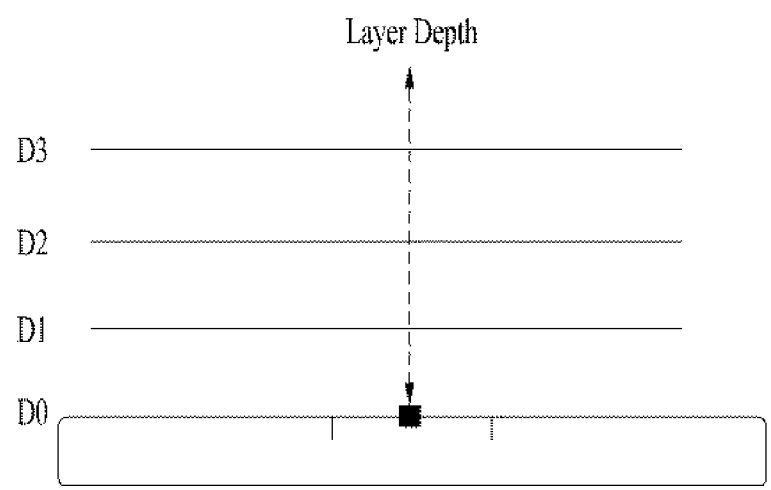
FIG. 30 is a diagram for another example of projecting a notification holography image in case of receiving a plurality of notification signals according to one embodiment of the present invention.
Figure 30B:
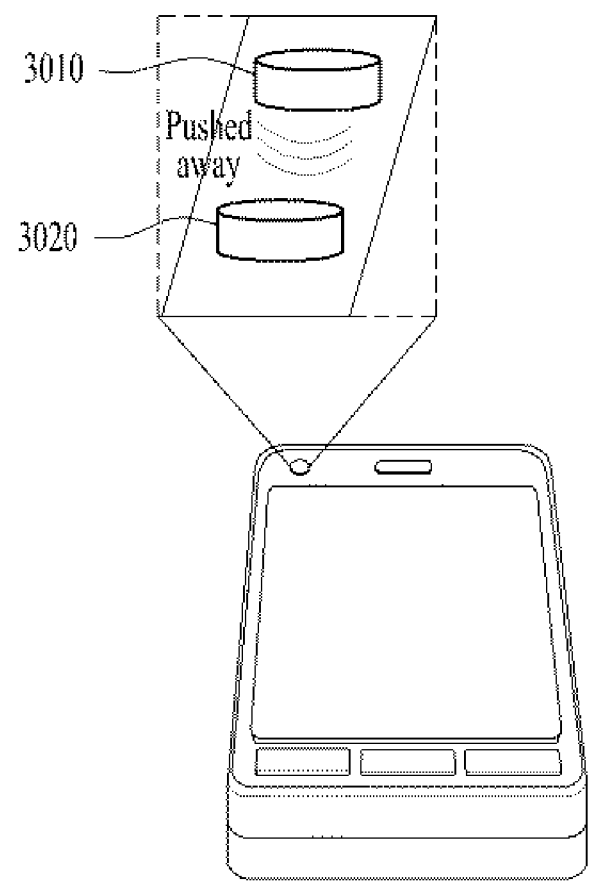
Figure 30C:
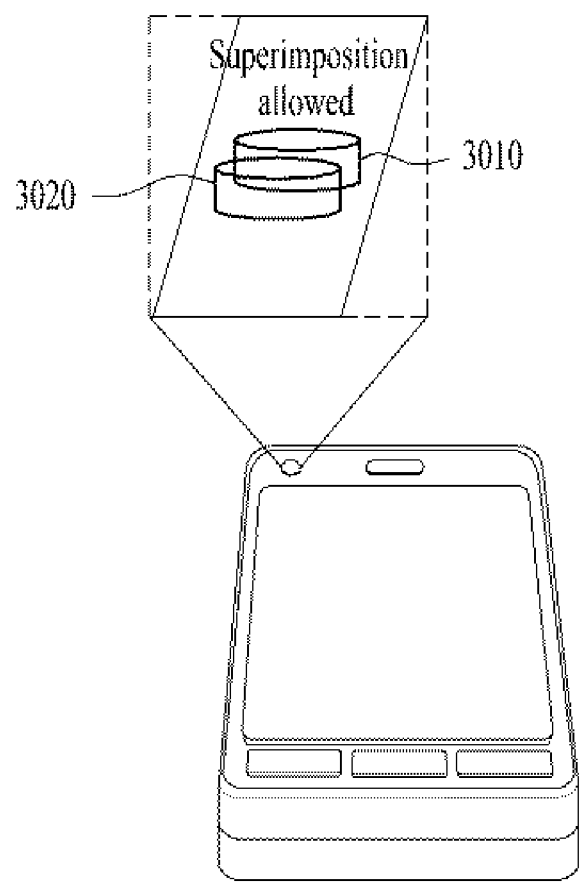

FIGS. 30A to 30C are diagrams for examples of projecting a transparent layer notification holography image in case of receiving a plurality of notification signals according to one embodiment of the present invention.

Referring to FIGS. 30A to 30C, the controller 180 sorts a plurality of received notification signals by a prescribed reference and may control a holography module to output a plurality of transparent layer notification holography images corresponding to a plurality of the sorted notification signals, respectively. In doing so, as mentioned in the above description, the prescribed reference for the sorting may include one of a category reference, a priority reference, a user setting reference and the like.

In accordance with the above-mentioned prescribed reference, the controller 180 may control a transparent layer notification holography image to be outputted to correspond to each height shown in FIG. 30A. If a holography image is outputted by getting farther from a reference point D0, a transparent layer notification holography image is outputted by having a wider range. For instance, a transparent layer holography image at D1 has a size greater than that of a transparent layer holography image at D2. And, a transparent layer holography image at D3 is outputted in a manner having a size greater than that of the transparent layer holography image at D2.

In doing so, a plurality of the transparent layer notification holography images may be allowed to be superimposed on one another or may not.

After two notification signals have been received, the received notification signals are sorted by priority reference. If the superimposition is not allowed, referring to FIG. 30B, a 1st transparent layer holography image 3010 and a 2nd transparent layer holography image 3020 may be displayed in a manner of being spaced apart from each other by a threshold distance.

After two notification signals have been received, the received notification signals are sorted by priority reference. If the superimposition is allowed, referring to FIG. 30C, a 1st transparent layer holography image 3010 and a 2nd transparent layer holography image 3020 may be displayed in a manner of being superimposed on one another.

Figure 30D:
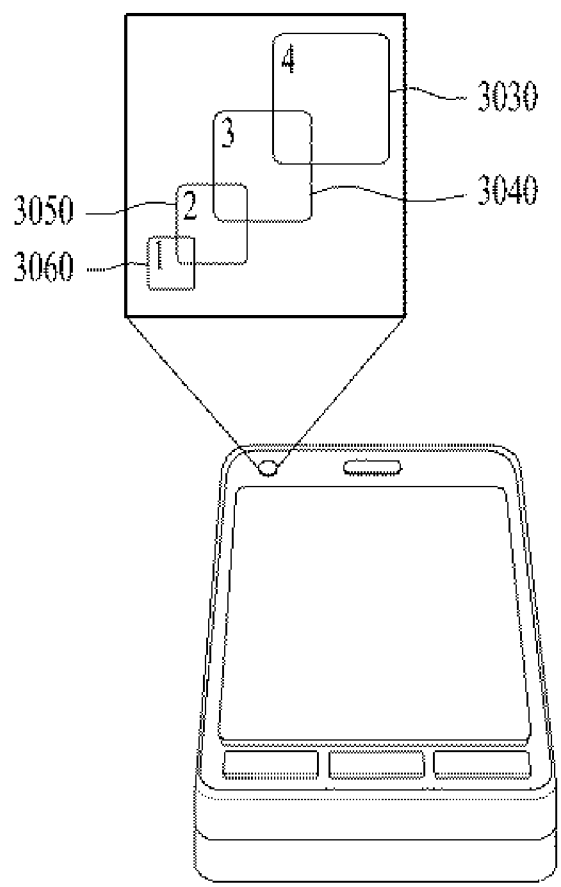

As mentioned in the above description with reference to FIG. 30C, in case that superimposition between transparent layer holography images is allowed, referring to FIG. 30D, a plurality of transparent layer holography images 3030, 3040, 3050 and 3060 may be displayed.

Meanwhile, assuming that a partitioned region notification holography image is applied, if a plurality of notification signals are received, a method of displaying the reception is described with reference to FIGS. 31A to 31C as follows.

Figure 31A:
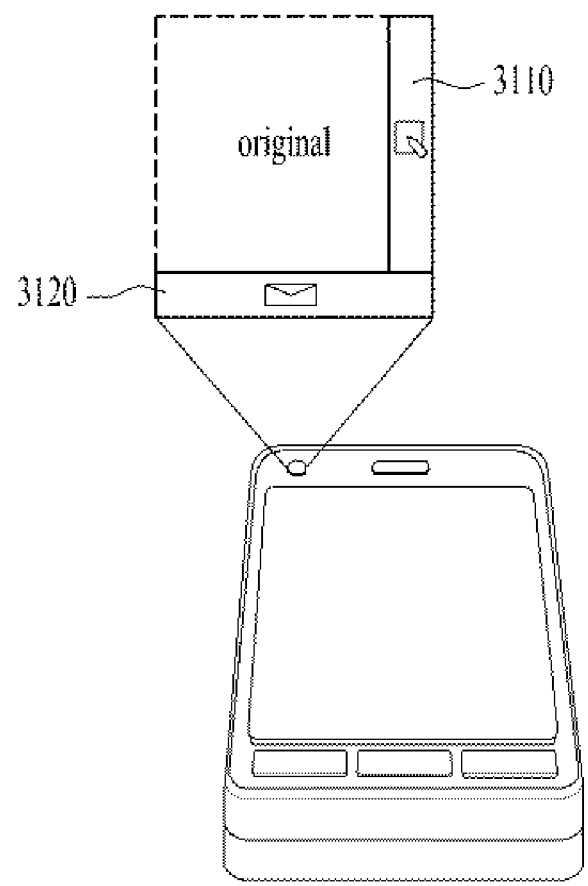
FIG. 31 is a diagram for further example of projecting a notification holography image in case of receiving a plurality of notification signals according to one embodiment of the present invention.
Figure 31B:
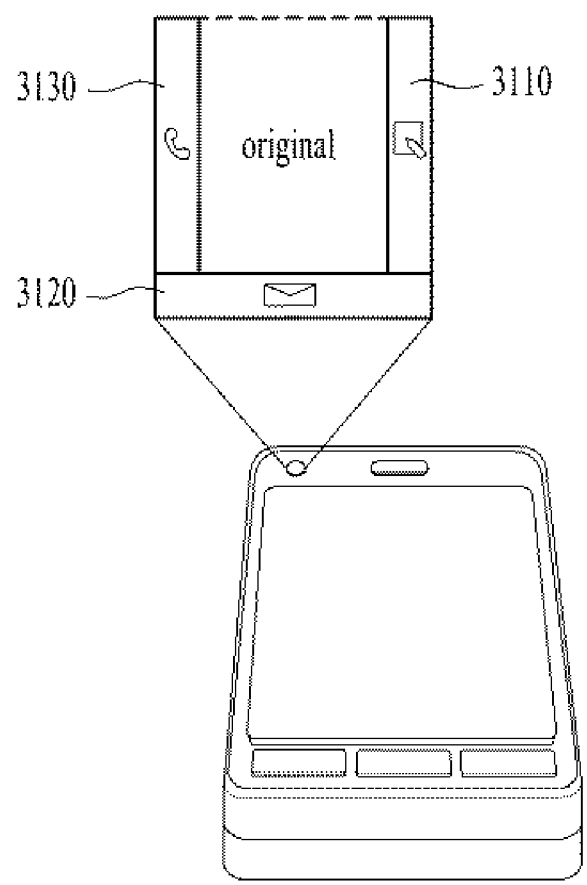
Figure 31C:
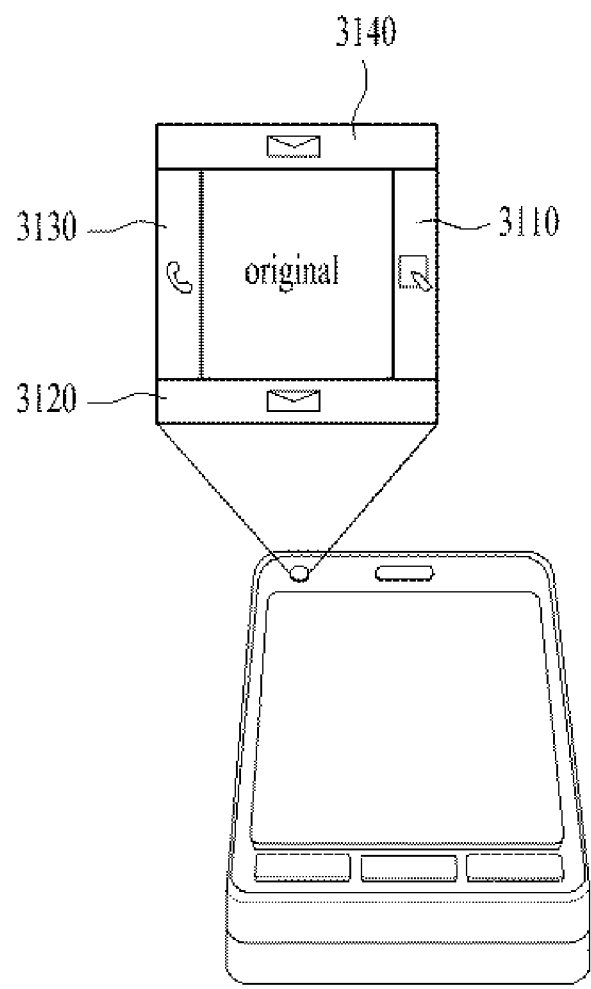

FIGS. 31A to 31C are diagrams for examples of projecting a partitioned region notification holography image in case of receiving a plurality of notification signals according to one embodiment of the present invention.

Referring to FIGS. 31A to 31C, the controller 180 sorts a plurality of received notification signals by a prescribed reference and may control a holography module to output a plurality of partitioned region notification holography images corresponding to a plurality of the sorted notification signals, respectively. In doing so, as mentioned in the above description, the prescribed reference for the sorting may include one of a category reference, a priority reference, a user setting reference and the like.

In case of the partitioned region notification holography image, a user may be able to designate a region to display. For instance, in case that 4 notification signals are received, a user may be able to set partitioned region notification holography images to be displayed on top, right, left and bottom end portions, respectively.

Referring to FIG. 31A, assume a case that two notification signals are received. In doing so, the controller controls a 1st partitioned region notification holography image 3110 to be displayed on a 1st region and also controls a 2nd partitioned region notification holography image 3120 to be displayed on a 2nd region.

Referring to FIG. 31B, assume a case that three notification signals are received. In doing so, the controller controls a 1st partitioned region notification holography image 3110 to be displayed on a 1st region, controls a 2nd partitioned region notification holography image 3120 to be displayed on a 2nd region, and controls a 3rd partitioned region notification holography image 3130 to be displayed on a 3rd region.

Referring to FIG. 31C, assume a case that four notification signals are received. In doing so, the controller controls a 1st partitioned region notification holography image 3110 to be displayed on a 1st region, controls a 2nd partitioned region notification holography image 3120 to be displayed on a 2nd region, controls a 3rd partitioned region notification holography image 3130 to be displayed on a 3rd region, and controls a 4th partitioned region notification holography image 3140 to be displayed on a 4th region.

In doing so, positions of a plurality of the partitioned region notification holography images are randomly displayed. And, it is apparent that the displayed position may be changeable in accordance with a prescribed reference.

The above descriptions relate to a case of receiving a preset notification signal in the course of projecting a holography image.

In the following description, a case of receiving a preset notification signal in the course of non-projecting a holography image is explained in detail with reference to FIGS. 32 to 34.

Figure 32:
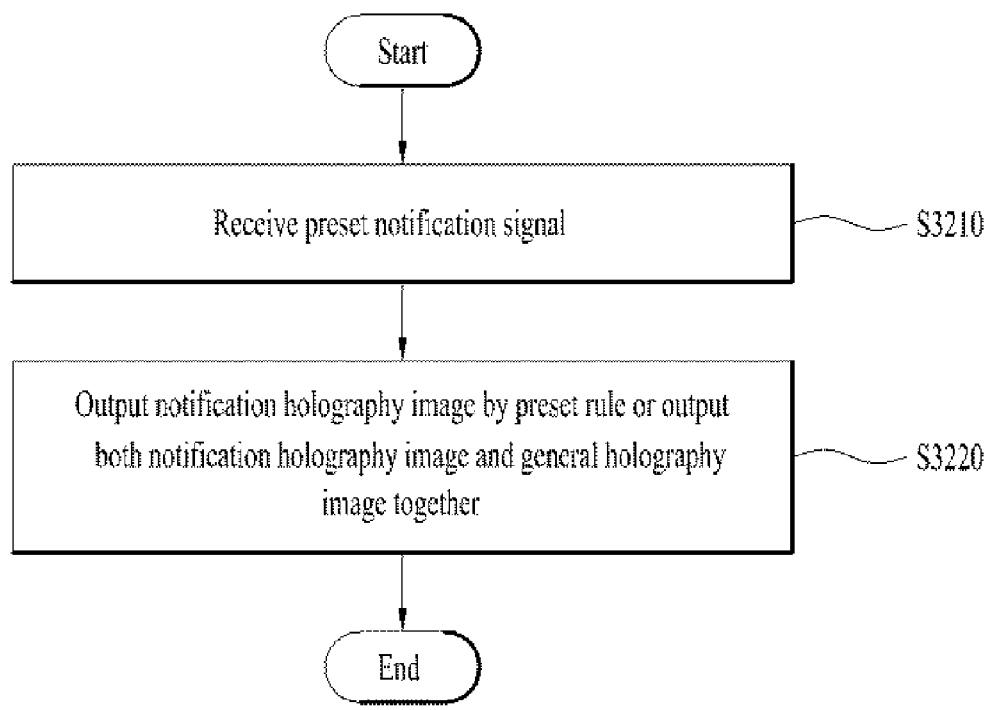
FIG. 32 is a flowchart for one example of projecting a notification holography image in case of receiving a preset notification signal in the course of non-projection of a holography image according to one embodiment of the present invention.

FIG. 32 is a flowchart for one example of projecting a notification holography image in case of receiving a preset notification signal in the course of non-projection of a holography image according to one embodiment of the present invention.

Referring to FIG. 32, the mobile terminal 100 may receive a preset notification signal in the course of non-projection of a holography image [S3210].

In this case, as mentioned in the foregoing description, the notification signal may include one of a call notification signal, a message notification signal, an email notification signal, an alarm notification signal, a calendar notification signal, a reminder notification signal, a battery notification signal and the like.

If the preset notification signal is received, a notification holography image may be outputted or both a notification holography image and a general holography image may be outputted together, by a preset rule under the control of the controller 180 [S3220].

In particular, a under the control of the controller 180 corresponding to a received notification signal or both a general holography image and the notification holography image may be outputted.

In the following description, a case of outputting a notification holography image only and a case of outputting a general holography image and a notification holography image together are separately explained in detail.

First of all, a case of outputting a general holography image and a notification holography image together is described in detail with reference to FIG. 33.

Figure 33:
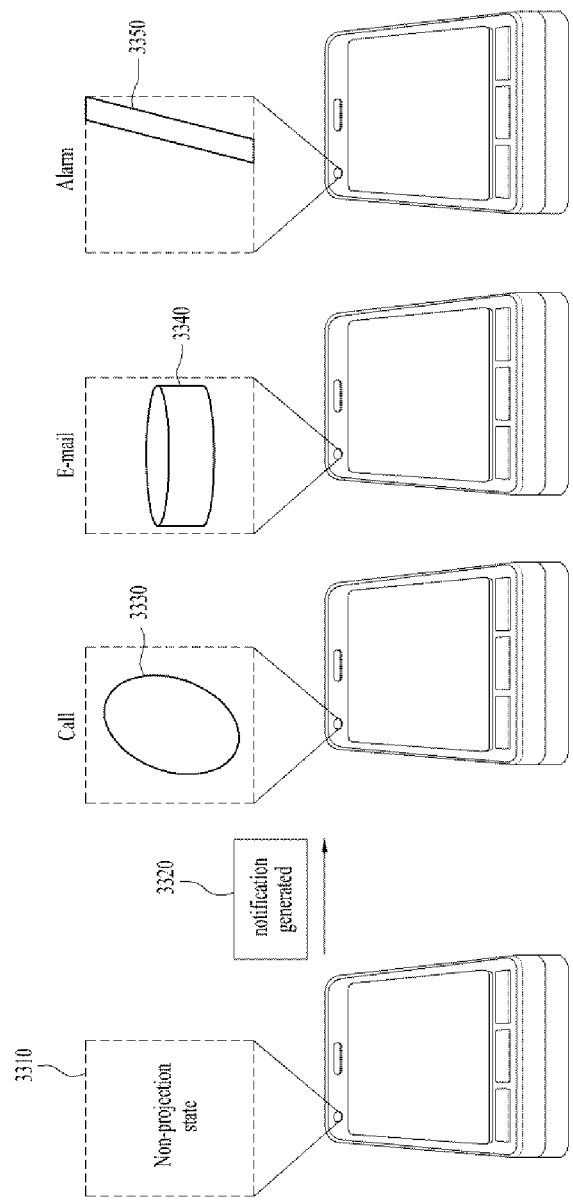
FIG. 33 is a diagram for one example of projecting a notification holography image in case of receiving a notification signal according to one embodiment of the present invention.

FIG. 33 is a diagram for one example of projecting a notification holography image in case of receiving a notification signal according to one embodiment of the present invention.

Referring to FIG. 33, in case that a plurality of notification holography images exist, they may be displayed to correspond to a plurality of notification signals, respectively.

In FIG. 33, assume that a call notification signal, an email notification signal and an alarm notification signal are designated to correspond to a band notification holography image, a transparent layer notification holography image and a partitioned region notification holography image, respectively.

First of all, a mobile terminal may receive a notification signal 3320 in a state 3310 of non-projecting a holography image.

In particular, if the received notification signal is a call notification signal, a band notification holography image 3330 is outputted. Hence, a user may conveniently recognize that the call notification signal is received using the outputted band notification holography image 3330.

Alternatively, if the received notification signal is an email notification signal, a transparent layer notification holography image 3340 is outputted. Hence, a user may conveniently recognize that the email notification signal is received using the outputted transparent layer notification holography image 3340.

Alternatively, if the received notification signal is an alarm notification signal, a partitioned region notification holography image 3350 is outputted. Hence, a user may conveniently recognize that the alarm notification signal is received using the outputted partitioned region notification holography image 3350.

In the following description, a case of outputting a general holography image and a notification holography image together is explained in detail with reference to FIG. 34.

Figure 34:
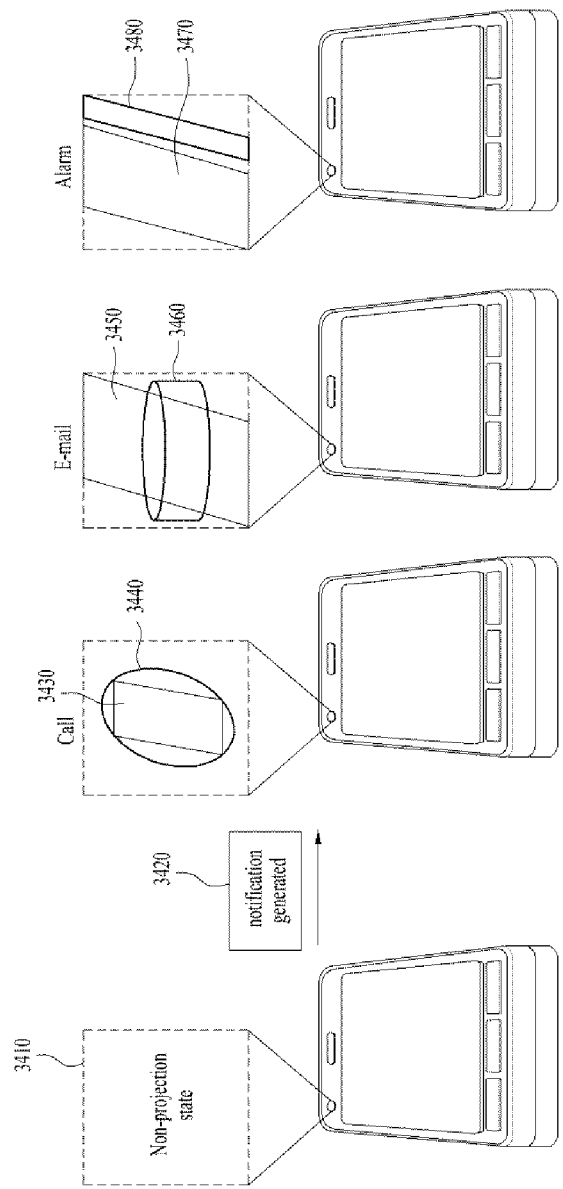
FIG. 34 is a diagram for one example of projecting a general holography image and a notification holography image together in case of receiving a notification signal according to one embodiment of the present invention.

FIG. 34 is a diagram for one example of projecting a general holography image and a notification holography image together in case of receiving a notification signal according to one embodiment of the present invention.

Referring to FIG. 34, a mobile terminal may receive a notification signal 3420 in a state 3410 of non-projecting a holography image.

In particular, if the received notification signal is a call notification signal, a screen currently displayed on a display unit is outputted as a general holography image 3430 and a band notification holography image 3440 is outputted as well. Hence, a user may conveniently recognize that the call notification signal is received using the outputted band notification holography image 3440 and may check the currently displayed screen as the holography image 3430.

Alternatively, if the received notification signal is an email notification signal, a screen currently displayed on a display unit is outputted as a general holography image 3450 and a transparent layer notification holography image 3460 is outputted as well. Hence, a user may conveniently recognize that the email notification signal is received using the outputted transparent layer notification holography image 3460 and may check the currently displayed screen as the holography image 3450.

Alternatively, if the received notification signal is an alarm notification signal, a screen currently displayed on a display unit is outputted as a general holography image 3470 and a partitioned region notification holography image 3480 is outputted as well. Hence, a user may conveniently recognize that the alarm notification signal is received using the outputted partitioned region notification holography image 3480 and may check the currently displayed screen as the holography image 3470.

Meanwhile, in case that a preset notification signal is received in the course of non-projection of a holography image, various methods for the case of receiving a preset notification signal in the course of projection of a holography image may apply.

In particular, as mentioned in the foregoing description, a received notification signal type information may be displayed through a notification holography image, a received notification signal content information may be displayed through a notification holography image, or both of the type information and the content information may be displayed together through a notification holography image.

As mentioned in the foregoing description, it may be able to provide a method of identifying a received notification signal type information in a manner of changing color, style, type, thickness, size, transparency and the like of a notification holography image.

As mentioned in the foregoing description, it may be able to provide more various informations to a user in a manner of changing a displayed notification holography image in accordance with time.

As mentioned in the foregoing description, in case that a plurality of notification signals are received by a terminal, it may be able to apply a method of notifying a plurality of the received notification signals through a plurality of notification holography images, respectively.

Meanwhile, a method for a user to designate a notification signal and a notification holography image is explained in detail with reference to FIG. 35 as follows.

Figure 35:
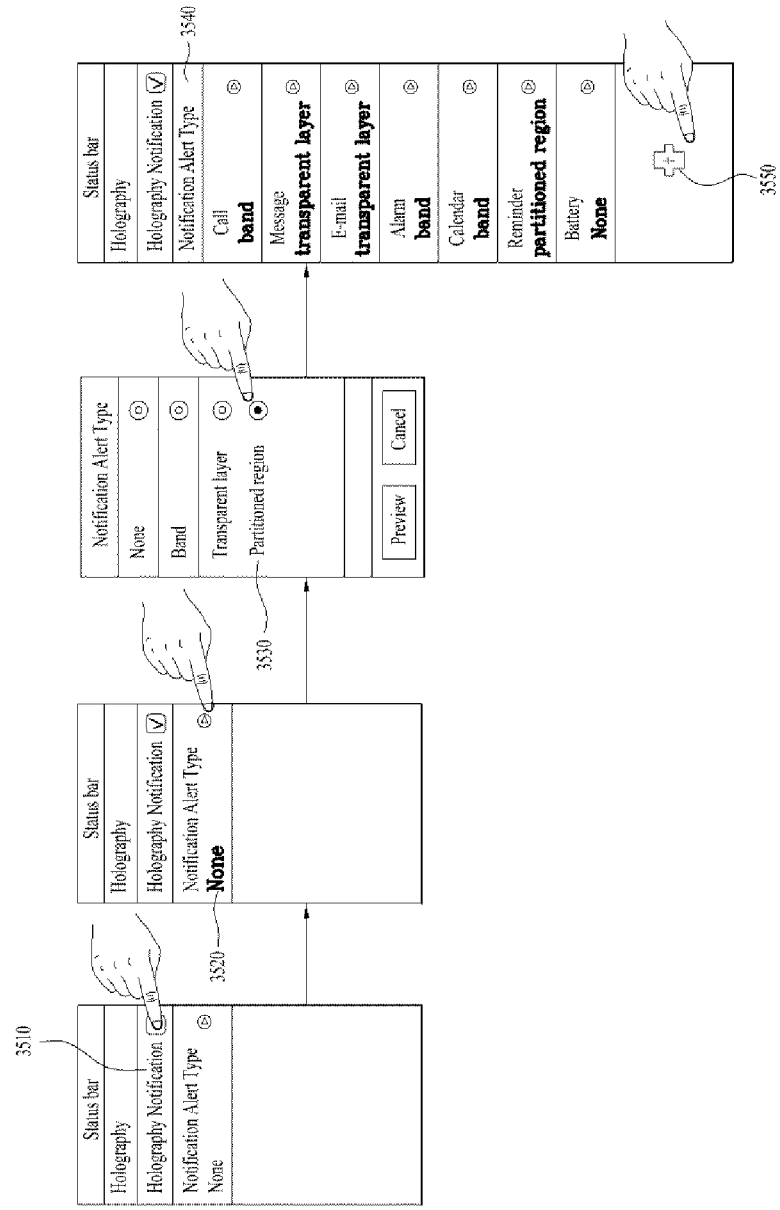
FIG. 35 is a diagram for one example of a menu for setting a notification signal and a notification holography image according to one embodiment of the present invention.

FIG. 35 is a diagram for one example of a menu for setting a notification signal and a notification holography image according to one embodiment of the present invention.

Referring to FIG. 35, a user may activate a notification holography image setting menu 3510 by a prescribed key manipulation or a preset menu manipulation.

In doing so, the user may select a notification holography image type menu 3520 from the activated notification holography image setting menu 3510. If the notification holography image type menu 3520 is selected, a band notification holography image, a transparent layer notification holography image and a partitioned region notification holography image may be displayed as user-selectable notification holography images.

Subsequently, the user may select the partitioned region notification holography image 3530 from the displayed notification holography image types.

The controller 180 may display a menu 3540 for setting a notification holography image to correspond to each notification signal. Through this menu 3540, a user may set a notification holography image corresponding to each notification signal.

And, the user selects an add menu 3550 and may be then able to add a type of a notification signal or a notification holography image.

Meanwhile, according to the present invention, the above-described methods can be implemented in a program recorded medium as computer-readable codes. Computer-readable media include ROM, RAM, CD-ROM, magnetic tapes, floppy discs, optical data storage devices, and the like for example and also include carrier-wave type implementations (e.g., transmission via Internet).

The aforementioned embodiments for a mobile terminal including a holography module configured to output a holography image are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention may be applicable to such a system as a terminal, implemented as a multimedia player provided with composite functions such as photographing of photos or videos, playback of music or video files, game play, broadcast reception and the like for example. In particular the present invention may be applicable to a wireless mobile communication apparatus used for a cellular system.

The invention claimed is:

1. A mobile terminal comprising:
   a controller;
   a holography storing medium configured to record an interference pattern generated by interference of light;
   a holography output module configured to output a first holography image attributed to diffraction between light applied to the holography storing medium and the interference pattern under the control of the controller; and
   a sensing unit configured to detect a plurality of notification signals,
   wherein if the sensing unit detects at least one of a plurality of the notification signals while outputting the first holography image, the controller controls the first holography image to be deformed and a second holography image to be output together with the deformed first holography image to indicate that the at least one notification signal is detected.

2. The mobile terminal of claim 1, wherein the controller controls the first holography image to pause while being output and also controls the second holography image to be output together with the pausing first holography image.

3. The mobile terminal of claim 1, wherein the plurality of the notification signals comprise a call notification signal, a message notification signal, an email notification signal, an alarm notification signal, a calendar notification signal, a reminder notification signal, and a battery notification signal.

4. The mobile terminal of claim 1, wherein the controller controls the first holography image to be output by being included in at least one partial region of the second holography image or by the second holography image being adjacent to an outline region of the first holography image, and
   wherein the second holography image comprises a closed curve shape implemented with a combination of at least one of a straight line, a line bent at a prescribed angle, a branch line and a curved line.

5. The mobile terminal of claim 1, wherein the holography output module changes at least one of a propagating direction and a vibrating direction of a light generated from the holography output module, and
   wherein the controller controls the holography module to apply a 3D (3-dimensional) depth to the second holography image and to output the 3D depth given second holography image as a 3D holography stereoscopic image of a stereoscopic type.

6. The mobile terminal of claim 1, wherein the controller partitions a whole region output as a holography image via the holography output module into partitioned regions at a prescribed ratio and controls the first holography image and the second holography image to be output to the partitioned regions, respectively.

7. The mobile terminal of claim 1, wherein if at least one of a plurality of preset cancellation trigger events occurs, the controller controls the second holography image not to be output.

8. The mobile terminal of claim 1, wherein the controller controls a type information of the detected at least one notification signal and at least one partial content information of the detected at least one notification signal to be output by being included in the second holography image.

9. The mobile terminal of claim 1, wherein the controller changes and outputs at least one of a color, style, type, thickness, number, size and transparency of the second holography image in accordance with time.

10. The mobile terminal of claim 1, wherein the controller controls a type of the detected at least one notification signal to be identified by changing at least one of a color, style, type, thickness, number, size and transparency of the second holography image.

11. The mobile terminal of claim 1, wherein if at least two of the plurality of the notification signals are detected by the sensing unit, the controller controls at least two second holography images to be output to correspond to the detected at least two notification signals, respectively.

12. The mobile terminal of claim 1, wherein the deformation of the first holography image is reducing a size of the first holography image at a prescribed ratio.

13. The mobile terminal of claim 12, wherein the second holography image is output by banding an outline of the reduced first holography image.

14. The mobile terminal of claim 1, wherein the deformation of the first holography image is applying a depth to the first holography image.

15. The mobile terminal of claim 14, wherein the second holography image is superimposed on the first holography image with a transparent layer.

16. A method of controlling a mobile terminal, the method comprising the steps of:
   outputting a first holography image from a holography output module;
   detecting at least one of a plurality of notification signals by a sensing unit while outputting the first holography image;
   deforming the output first holography image; and
   outputting a second holography image together with the deformed first holography image to indicate that the at least one notification signal is detected.

17. The method of one of claim 16, wherein a type of the detected at least one notification signal is identified by changing at least one of a color, style, type, thickness, number, size and transparency of the second holography image.

* * * * *